(12) United States Patent
Rekimoto

(10) Patent No.: US 7,069,516 B2
(45) Date of Patent: Jun. 27, 2006

(54) INFORMATION INPUT/OUTPUT SYSTEM AND INFORMATION INPUT/OUTPUT METHOD

(75) Inventor: Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 602 days.

(21) Appl. No.: 09/739,952

(22) Filed: Dec. 18, 2000

(65) Prior Publication Data

US 2001/0044858 A1 Nov. 22, 2001

(30) Foreign Application Priority Data

Dec. 21, 1999 (JP) ............................... P11-362038

(51) Int. Cl.
*G06F 3/00* (2006.01)
(52) U.S. Cl. ..................... 715/757; 715/852
(58) Field of Classification Search ........ 345/182–184, 345/769, 757, 783, 805, 806, 831; 715/552, 715/530, 757, 783, 805, 802, 850, 852
See application file for complete search history.

(56) References Cited

U.S. PATENT DOCUMENTS

| | | | | |
|---|---|---|---|---|
| 4,835,372 A | * | 5/1989 | Gombrich et al. ........... 235/375 |
| 5,297,061 A | * | 3/1994 | Dementhon et al. ......... 345/180 |
| 5,334,822 A | * | 8/1994 | Sanford ........................ 705/28 |
| 5,528,263 A | * | 6/1996 | Platzker et al. .............. 345/156 |
| 5,838,326 A | * | 11/1998 | Card et al. .................... 345/775 |
| 5,917,490 A | * | 6/1999 | Kuzunuki et al. ........... 345/775 |
| 6,025,844 A | * | 2/2000 | Parsons ........................ 345/805 |
| 6,215,498 B1 | * | 4/2001 | Filo et al. .................... 345/419 |
| 6,389,182 B1 | | 5/2002 | Ihara et al. |
| 6,560,565 B1 | * | 5/2003 | Roy et al. .................... 702/188 |
| 6,650,776 B1 | | 11/2003 | Ihara et al. |

OTHER PUBLICATIONS

Pierre Wellner ("The Digital Desk Calculator," Proceedings of ACM Symposium on User Interface Software and Technology (UIST '91), Nov. 11-13, 1991).*

* cited by examiner

*Primary Examiner*—Weilun Lo
*Assistant Examiner*—Truc T. Chuong
(74) *Attorney, Agent, or Firm*—Bell, Boyd & Lloyd LLC

(57) ABSTRACT

A digital object is manipulated by way of a physical object. As a digital space on a computer is deeply fused with a physical real space, it becomes possible to input user commands not only by way of native user input devices such as a mouse and a keyboard but also various physical objects that are scattered in the real world and draw out a digital object by way of a physical object. As a result, computers can be operated in a more intuitive and easy way and become attractive to the users.

33 Claims, 46 Drawing Sheets

INFORMATION INPUT/OUTPUT SYSTEM AND INFORMATION INPUT/OUTPUT METHOD

BACKGROUND OF THE INVENTION

1. Field of the Invention

This invention relates to a proposal of a user interface environment adapted to one or more than one users operating objects relative to computers and inputting commands and data to computers. More particularly, the present invention relates to a proposal of a user interface environment where users can operate objects relative to computers and input commands and data to computers in a highly intuitive and easily understandable way.

Still more particularly, the present invention relates to a proposal of a user interface environment where operations interconnecting a plurality of computers are expressed in a highly intuitive and easily understandable way. Above all, the present invention relates to a proposal of a user interface environment in an information space produced by extending disk top display screen images native to computers to the real world to fuse digital spaces of the computers and the physical real, in which user interface environment operations of individual users and concerted operations of a plurality of users are expressed in a highly intuitive and easily understandable way.

2. Related Background Art

As a result of technological innovations in recent years, compact general purpose computer systems in the form of work stations and personal computers (PCs) with high added values and enhanced functional features have been developed and marketed at low prices. Such computer systems are almost ubiquitous in various research institutions including colleges and universities, commercial firms and offices and ordinary homes where people spend their daily lives.

One of the recent trends in the field of computer technology is down-sizing of computers. Particularly, compact and lightweight portable computers (mobile computers) have become very popular owing to the recent development of semiconductor technology that has made very small LSI (large scale integration) chips commercially available and boosted the processing capacity of computer processors.

Portable computers include so-called "notebook computers" and "PDAs (personal digital assistants)" that refer to palm top size computers. Notebook computers have a so-called cram-shell structure where a lid that carries an LCD (liquid crystal display) on the inner surface thereof is swingably linked by a hinge device to a computer main body that carries a keyboard on top.

Portable computers are adapted to operate in a mobile environment and drive one or more than one computer systems that may also be mobile. As a result of the advent of such lightweight portable computers, computers are almost ubiquitous nowadays in daily home lives as well as in business scenes where they take significant roles for supporting businesses. For instance, these days most people attend conferences and business presentations with their notebook computers.

There have been remarkable improvements in terms of computing resources including data processing capabilities of CPUs (central processing units) and hard disk capacities. They are by no means less power than desk-top computers. For instance, notebook computers are normally provided with a hard disk whose storage capacity (several to tens of several giga bits) is sufficient for storing all the documented data that a person normally possesses including the data on the presentations made by the possessor of the computer. Therefore, the person who are making a business presentation can draw out any necessary data from the hard disk so that he or she may distribute them to and share them with the attendants of the presentation and exchange them with date of some of the attendants. Thus, it is no longer necessary to copy part of the data stored in the hard disk to a floppy disk or vice versa.

Most computer systems provide the user with an interactive processing environment so that the computer system operates in response to the command issued to it by the user and the outcome of the processing operation is displayed on the display screen of the system. Currently, there is occurring a shift from the character-based user input environment or "the CIU (character user interface) environment" such as DOS (disk operating system) shell screen to the graphic-based user input environment or "the GIU (graphic user interface) environment". In the GUI environment, a disk top unit simulating a computer system and numerous icons are provided for the display screen.

In the case of a disk top type computer provided with a GUI, all resource objects to be handled in the computer system including files are expressed by icons. The user can intuitively issue commands by directly operating icons on the display screen that represent respectively programs, data, holders and devices by means of a mouse and other I/O devices (with motions such as click, drag and drop, etc.). Therefore, the user is no longer required to memorize specific commands and learn how to handle them. Nor he or she is required to learn how to operate the keys of the keyboard for issuing commands, which is normally a very cumbersome task.

Another of the recent trends in the field of computer technology is interconnection. Computers may be interconnected typically by way of local interfaces such as serial ports and parallel ports or by way of network interface cards (NICs) so that they may be connected to each other by way of one or more than one telecommunication networks. From the viewpoint of interconnection of computers, telecommunication networks include LANs (local area networks) provided on single sites, WANs (wide area networks) realized by connecting LANs by way of dedicated lines and the internet which is a global telecommunication network realized by connecting various networks.

Interconnection of computers provides advantages including that information and computer resources are shared by a number of computer users, that information is delivered and disseminated highly efficiently and that a plurality of computers can be driven in a cooperative and concerted manner to carry out a common mission. For instance, an operation of processing a digital object can be carried out highly efficiently when a plurality of computers are made to cooperate in an intensive way.

Particularly, in recent years, the user can link his or her computer easily to a telecommunication network as a result of the advent of proximity telecommunication systems such as wireless LAN that is a wireless version of Ethernet and blue tooth [1]. The computers and peripheral devices (e.g., printers) installed in a building can mostly be connected to a telecommunication network so that they may be shared for operation by a plurality of users. Additionally, computer users can carry their own computers to any place they want and link them to a telecommunication network without difficulty.

In a distributed computing environment, the computers connected to a network are in a "transparent" state and they can be operated by means of an application program regardless if it is stored in a local storage disk or in a remote disk. In other words, the user is no longer required to know the locations of resource objects such as programs and data because they can be exchanged seamlessly among computers.

The user can link his or her computer to a telecommunication network without any difficulty. However, if the user wants to specify a particular computer or peripheral device (target) to which data are to be transferred by way of the network, he or she has to know its ID (or its address) if it is located just in front of the user. In other words, even in a transparent and distributed computing environment, user operations are rather indirect and the related computers are not cooperative so that the user cannot act intuitively.

For example, if the user want to transfer an object between two or more than two computers in a currently available GUI environment, he or she is required to display a list of the devices linked to the network on an explorer screen and find out the icons simulating the respective computers before proceeding to a "drag and drop" operation.

A technique for solving the user operation problem may be the use of a real world-oriented user interface, which represents the technology for expanding the information space that is defined by the scope of the user operation from the "digital space" produced on a display screen of a computer to the space of the real world in a continues way. With such a real world-oriented interface, the display screen of the computer may be expanded to the surface of the disk on which the computer is placed and also to the surface of the walls of the room where the computer is located. In other words, the information space of the user expands beyond the limit of the digital space of the stand-alone computer to the entire room so that digital objects of the digital space of the computer and physical objects of the real world can be handled in an integrated manner.

For instance, "pick-and-drop[2]" is an expansion of user operation "drag-and-drop" that is reliably being utilized in the GUI environment and represents the technology of advanced interactions for mapping the transfer of objects such as data among a plurality of computers into an intuitive motion in the real world.

With the "pick-and-drop" technique, seamless "pick-and-drop" operations can be realized as a result of cooperation of a plurality of disk top computers. For example, when an object is dragged by operating the user input device that may be a track ball or a stick of a disk top computer to move the pointer in the display screen beyond an edge thereof, the drag operation may be succeeded to the display screen of the adjacently located disk top computer so that the pointer of the latter display screen appears, dragging the object.

On the other hand, the pointer in the display screen of the former disk top computer disappears, while dragging the object. This operation of the pointer of the former disk top computer picking up an object (digital object) is referred to as "pick" while the operation of causing the pointer of the latter disk top computer to appear in order to continuously drag the object is referred to as "drop". Thus, the entity of the object (e.g., a data file) is transferred behind the screen between the two computers by way of the network. In other words, the succeeded drag operation accompanies a movement of the entity of the object. FIG. 1 schematically illustrate an "pick-and-drop" operation of an digital object of adjacently located computers.

As for "pick-and-drop" operations, refer to Japanese Patent Application Laid-Open Publication No. 11-53236 whose assignee is the applicant of the present patent application, specifically passages [0052] through [0059] and FIGS. 6 through 9 of the above patent document.

On the other hand, the Japanese Patent Application Laid-Open Publication No. 11-316461 that has been assigned to the applicant of the present patent application describes an information input/output system that expands the user's work space, or the disk top, that may be represented by a GUI into the real world and provides a real-world-oriented user interface with which the user can issue commands to the computer in an intuitive and ease-to-understand fashion.

The information input/output system as described in the above patent document can provide an information space, which is a user's work space, by dynamically combining an environment type computer group arranged in the real space including computers of the table type and those of the wall type and a portable type computer group including computers that users can carry with.

A camera-based object recognition system may be used for such an information input/output system. Then, an image of a computer display screen may be projected on a wall surface by means of a projector. Then, both the projected image, which is an object in the local space of the computer, and an object in the real world (which, for example, exists on a table) can be recognized on the basis of the image picked up by the camera and the movements of the objects can be traced.

In such an information environment, tables and walls in a conference room or a presentation room are computerized and may three-dimensionally expand a portable computer to provide a large work space (an expanded desk top display) to the user. Then, objects (such as documents, cards, vide tapes) in the real world may be identified typically by means of "marker recognition" so that information may be exchanged between them.

Additionally, the user can easily incorporate the portable computer he or she brings in into an information space where a number of computers are installed so that the portable computer may be made to cooperate with the other computers in a concerted manner.

Thus, the user can handle information by three-dimensionally making use of the positional relationship of various objects in the real world without paying attention to the addresses and the IDs of the individual objects including devices by using direct handling techniques that are not limited to the closed work spaces of single computers.

In an information space as disclosed in the above patent document, the user can use a technique of "hyperdragging" [3], with which he or she continue an operation of dragging an object in the digital space of a computer display in the real world. For example, the user can continue an operation of dragging a cursor by means of a mouse on the surface where the computer display is placed (see FIG. 2) and then further to a wall of the room (see FIG. 3). In other words, the entire room where the computer is placed can be used as part of the computer display to handle objects.

With the technique of "hyperdragging", the user can interactively operate an object only by intuitively recognizing the physical position in the real world that may include the positional relationship between the object and the computer (e.g., "the object is located at a side of the computer"). Additionally, while the user is operating an object at the front end, processing operations may be proceeding in the background among the related computers (e.g., network transfer operations) to move entities of digital objects such as document files.

Furthermore, with the technique of "hyperdragging", it is possible for the user to move data in the real world simply if he or she knows how to use a mouse ("drag and drop") and the physical location of the target device (e.g., "the device on the table"). For example, when moving and exchanging digital objects between two adjacently located portable computers by using the "hyperdragging" technique (see FIG. 4), the user does not need to know how to set up a network environment to connect the computers nor the address of the target device.

With an information input/output system as disclosed in the above patent document, a physical real space can be linked to a logical space (digital space) in a computer to establish a relationship between a computer data and a physical object. For instance, a document holder may be attached to a physical object such as a VCR tape cartridge placed on a table (see FIGS. 14 through 14 of the above patent document).

Additionally, computer peripheral devices such as printers, displays and scanners can be made to support the "hyperdragging" feature. For instance, an operation of printing out a digital object can be started by hyperdragging and dropping it onto a printer that is installed in an information space.

It will become possible to issue user commands to a computer not only by way of native user input devices such as a mouse and/or a keyboard but also by way of various physical objects located dispersedly in the real world if a physical real space and a digital space in a computer can be fused further. It will also become possible to draw out a digital object by way of a physical object. Then, operating computers will become much more intuitive, easily understandable and attractive to the user.

BRIEF SUMMARY OF THE INVENTION

In view of the above circumstances, it is therefore an object of the present invention to provide an excellent user interface environment where the work space of a computer can be expanded into the real world and the user can input commands and data to computers in a highly intuitive and easily understandable way.

Another object of the present invention is to provide an excellent user interface environment where a physical real space and a logical space (digital space) of a computer can be effectively linked.

Still another object of the present invention is to provide an excellent user interface environment where a physical real space and a logical space (digital space) of a computer can be closely linked so that a digital object can be handled by way of a physical object in the real world.

A further object of the present invention is to provide an excellent user interface environment where a physical real space and a digital space of a computer are thoroughly fused so that the user can input user commands not only by means user input devices such as a mouse and/or a keyboard but also by way of various physical objects located dispersedly in the real world so as to make it possible to draw out a digital object by way of a physical object.

In the first aspect of the present invention, the above objects and other objects of the invention are achieved by providing an information input/output system to be used for user operations relating to an object in an information space realized by expanding a digital space of a computer into the real world, said system comprising:

one or more than one operation surfaces arranged in said information space;

a display means for displaying an image on said operation surfaces;

an imaging means for picking up an image of said operation surfaces;

an environment type computer stationarily arranged in said information space; and one or more than one physical objects mounted on said operation surfaces and containing a visually identifiable visual marker on the surface thereof;

said environmental type computer being adapted to execute;

a processing operation of recognizing the identification information and the position information of each of said physical objects in said visual marker;

a processing operation of recognizing the digital object dropped to a site on the surface of each of said physical objects; and a processing operation of forming link information for linking the digital object to the dropped site on the surface for each of said physical objects.

Preferably, at least one of said physical objects is a portable computer capable of being moved in said information space and exchanging digital objects with other computers.

Preferably, said environment type computer can install the portable computer in the information space by recognizing the identification information and the position information in the visual marker applied to said portable computer.

Preferably, said environment type computer can expand a mouse/cursor operation on the installed portable computer onto said operation surfaces. Then, as a result, the physical real world and the digital space of the computer will be deeply fused in the information space.

Preferably, said imaging means can identify the position pointed by an optical pointer adapted to point a specific position by irradiating a beam of light with a predetermined wavelength. The optical pointer may be a laser pointer adapted to irradiate a red spot of light with a predetermined wavelength range. With such an arrangement, the user can indicate any site in the information space in terms of a coordinate system not only by means of a mouse/cursor operation on the portable computer of his or her own but also by means of the optical pointer. Thus, for example, the user can point a site on the disk top display of the computer as expanded to the surface of the table carrying it and the surfaces of the surrounding walls directly by means of the optical pointer to remarkably improve the operability of the object and therefore intuitively comprehend the operation without difficulty.

Preferably, said environment type computer executes a processing operation of calling the linked digital object and/or displaying the digital object to the user in response to a user operation applied to the site of forming the link information on the surface of each of the physical objects on the basis of the image picked up by said imaging means. A user operation as used herein refers to the application of a user operation using a mouse and/or a cursor or an optical pointer to a predetermined site on the site of the physical object. The user can refer to the digital object from the predetermined site of the physical object as if he or she were drawing out a linked page from the anchor on a Web page on a display screen.

In the second aspect of the invention, there is provided an information input/output system to be used for user operations relating to an object in an information space realized by expanding a digital space of a computer into the real world, said system comprising:

one or more than one operation surfaces arranged in said information space;

a display means for displaying an image on said operation surfaces;

an imaging means for picking up an image of said operation surfaces;

an environment type computer stationarily arranged in said information space;

one or more than one physical objects mounted on said operation surfaces and containing a visually identifiable visual marker on the surface thereof; and a portable ID recognition device adapted to recognize/identify the visual marker on the surface of each of said physical objects.

Preferably, said environmental type computer is adapted to execute;

a processing operation of receiving the identification information of the source object and that of the destination object from said ID recognition device; and a processing operation of applying an action specified on the basis of the combination of the type of the source object and that of the destination object.

For instance, the ID recognition device can read the identification information of a desired document as source object and the identification information of a printer to be used for printing the document as destination object and transmit them to the environment type computer. If such is the case, the environment type computer can execute a specific action of printing the document of the source object by means of the printer of the destination object.

In the third aspect of the invention, there is provided an information input/output system to be used for user operations relating to an object in an information space realized by expanding a digital space of a computer into the real world, said system comprising:

one or more than one operation surfaces arranged in said information space;

a display means for displaying an image on said operation surfaces;

an imaging means for picking up an image of said operation surfaces;

an environment type computer stationarily arranged in said information space; and one or more than one physical objects mounted on said operation surfaces and containing a visually identifiable visual marker on the surface thereof;

at least one of said physical objects being a virtual camera having a virtual imaging direction as specified by the position information contained in the visual marker.

Preferably, said environmental type computer is adapted to execute on the basis of the image picked up by said imaging means;

a processing operation of recognizing/identifying said virtual camera and identifying the position information and the virtual imaging direction;

a processing operation of generating a virtual picked up image according to the position information and the virtual imaging direction; and a processing operation of displaying the virtual picked up image to the user.

A "virtual picked up image" can be automatically generated by applying the techniques of three-dimensional computer graphics on the basis of the information for drawing each of the physical objects in the area covered by the imaging means. A virtual picked up image refers to a three-dimensional landscape or scene picked up by a virtual camera. The three-dimensional scene to be picked up can be shifted by changing the camera position.

In the fourth aspect of the invention, there is provided an information input/output system to be used for user operations relating to an object in an information space realized by expanding a digital space of a computer into the real world, said system comprising:

one or more than one operation surfaces arranged in said information space;

a display means for displaying an image on said operation surfaces;

an imaging means for picking up an image of said operation surfaces;

an environment type computer stationarily arranged in said information space;

one or more than one physical objects mounted on said operation surfaces and containing a visually identifiable visual marker on the surface thereof; and an optical pointer adapted to point a specific position by irradiating a beam of light with a predetermined wavelength;

said imaging means being capable of identifying the position pointed by said optical pointer. The optical pointer as used herein refers to a laser pointer adapted to irradiate a red spot of light with a predetermined wavelength range.

Then, the environment type computer can execute on the basis of the image picked up by said imaging means;

a processing operation of recognizing the user operation on said operation surfaces, using said optical pointer; and a processing operation of controlling the display of the digital object by said display means according to the result of the recognition.

In the fifth aspect of the invention, there is provided an information input/output system to be used for user operations relating to an object in an information space realized by expanding a digital space of a computer into the real world, said system comprising:

one or more than one operation surfaces arranged in said information space;

a display means for displaying an image on said operation surfaces;

an imaging means for picking up an image of said operation surfaces;

an environment type computer stationarily arranged in said information space; and one or more than one portable computers capable of exchanging digital objects with other computers;

said portable computers being capable of retrieving a three-dimensional model and/or generating a three-dimensional model thereon;

said environment type computer being adapted to execute;

a processing operation of generating an image to be projected on said operation surfaces on the basis of the information for drawing a three-dimensional model in response to the application of the user operation of taking out the three-dimensional model from one of said portable computers to said operation surfaces, and a processing operation of controlling a display of the projected image generated by said display means.

Thus, in the fifth aspect of the invention, a three-dimensional object that intrinsically exists only in a digital space of a computer can be drawn out into the real world and displayed. Therefore, the user can display information on the disk top on the disk top display of the computer as expanded to the real world with a sense of reality.

In the sixth aspect of the invention, there is provided an information input/output system to be used for user operations relating to an object in an information space realized by expanding a digital space of a computer into the real world, said system comprising:

one or more than one operation surfaces arranged in said information space;

a display means for displaying an image on said operation surfaces;

an imaging means for picking up an image of said operation surfaces;

an environment type computer stationarily arranged in said information space;

one or more than one portable computers capable of exchanging digital objects with other computers;

one or more than one physical objects mounted on said operation surfaces and containing a visually identifiable visual marker on the surface thereof; and a portable ID recognition device adapted to recognize the visual marker on the surface of each of said physical objects and being capable of holding or releasing the recognized identification information.

With such an arrangement, said environment type computer executes;

a processing operation of obtaining a digital object corresponding to the held identification information in response to the holding operation of said ID recognition device; and a processing operation of transferring a digital object corresponding to the held identification information to a nearby physical object in response to the releasing operation of said ID recognition device. In other words, in an information space of the information input/output system in the sixth aspect of the invention, a digital object that intrinsically exists only in a digital space of a computer can be sent out or received by way of the physical real world.

In the seventh aspect of the invention, there is provided an information input/output system to be used for user operations relating to an object in an information space realized by expanding a digital space of a computer into the real world, said system comprising:

one or more than one operation surfaces arranged in said information space;

a display means for displaying an image on said operation surfaces;

an imaging means for picking up an image of said operation surfaces;

an environment type computer stationarily arranged in said information space;

one or more than one portable computers capable of exchanging digital objects with other computers; and one or more than one physical objects mounted on said operation surfaces and containing a visually identifiable visual marker on the surface thereof;

said environment type computer being adapted to allow mouse/cursor operations on said portable computers to extend to said operation surfaces and display a rubber band as visual feedback according to the area on said operation surfaces as defined by means of said mouse/cursor.

Thus, in the information space in the seventh aspect of the invention, a "rubber band" is given to the user as visual feedback. As a result, the operability of objects is improved and the real world and a digital space can be linked more effectively.

Preferably, said environment type computer is adapted to pick up an image of the area defined by the rubber band by means of said imaging means and take the picked up image in said information space as digital object. For example, a picked up image of a printed matter (e.g., a document or a name card) placed on a table in the information space can be taken into a digital space of a computer as digital object. It may be needless to say that such a digital object can be transferred to another computer.

Preferably, another object can apply a process or a method it possesses to the rubber-banded original digital object in response to an action of said original object of being dropped on said another object.

Said another object may be a physical object possessing a process or a method for printing a document. Thus, a technique of direct interaction of issuing a printing job can be realized by dropping the digital object representing a document onto the physical object.

Alternatively, said another object may be a name card possessing a process or a method for mailing a document to the mail address corresponding to the name on it. Thus, a technique of direct interaction of mailing a document is realized by dropping the digital object representing a document onto the physical object.

In the eighth aspect of the invention, there is provided an information input/output system to be used for user operations relating to an object in an information space realized by expanding a digital space of a computer into the real world, said information space having one or more than one operation surfaces arranged in said information space, a display means for displaying an image on said operation surfaces, an imaging means for picking up an image of said operation surfaces, an environment type computer stationarily arranged in said information space and one or more than one physical objects mounted on said operation surfaces and containing a visually identifiable visual marker on the surface thereof, said system comprising:

a step of firstly recognizing the identification information and the position information of each of said physical objects from the visual marker;

a step of secondly recognizing the digital object dropped to a site on the surface of each of said physical objects; and a step of forming link information for linking the digital object to the dropped site on the surface for each of said physical objects.

Preferably, at least one of said physical objects is a portable computer capable of being moved in said information space and exchanging digital objects with other computers and said environment type computer can expand a mouse/cursor operation on the installed portable computer onto said operation surfaces in said second recognition step.

Preferably, said imaging means can identify the position pointed by an optical pointer adapted to point a specific position by irradiating a beam of light with a predetermined wavelength and the user can indicate any site in the information space in terms of a coordinate system not only by means of a mouse/cursor operation on the portable computer of his or her own but also by means of the optical pointer in said second recognition step.

Preferably, said information input/output system further comprises a step of calling the linked digital object and/or displaying the digital object to the user in response to a user operation applied to the site of forming the link information on the surface of each of the physical objects.

In the ninth aspect of the invention, there is provided an information input/output system to be used for user operations relating to an object in an information space realized by expanding a digital space of a computer into the real world, said system having one or more than one operation surfaces arranged in said information space, a display means for displaying an image on said operation surfaces, an imaging means for picking up an image of said operation surfaces, an environment type computer stationarily arranged in said information space, one or more than one physical objects mounted on said operation surfaces and containing a visually identifiable visual marker on the surface thereof and a portable ID recognition device adapted to recognize/identify the visual marker on the surface of each of said physical objects, said system comprising:

a step of receiving the identification information of the source object and that of the destination object from said ID recognition device; and a step of applying an action specified on the basis of the combination of the type of the source object and that of the destination object.

In the tenth aspect of the invention, there is provided an information input/output system to be used for user operations relating to an object in an information space realized by expanding a digital space of a computer into the real world, said system having one or more than one operation surfaces arranged in said information space, a display means for displaying an image on said operation surfaces, an imaging means for picking up an image of said operation surfaces, an environment type computer stationarily arranged in said information space and one or more than one physical objects mounted on said operation surfaces and containing a visually identifiable visual marker on the surface thereof, at least one of said physical objects being a virtual camera having a virtual imaging direction as specified by the position information contained in the visual marker, said system comprising:

a step of recognizing/identifying said virtual camera and identifying the position information and the virtual imaging direction;

a step of generating a virtual picked up image according to the position information and the virtual imaging direction; and a step of displaying the virtual picked up image to the user.

In the eleventh aspect of the invention, there is provided an information input/output system to be used for user operations relating to an object in an information space realized by expanding a digital space of a computer into the real world, said system having one or more than one operation surfaces arranged in said information space, a display means for displaying an image on said operation surfaces, an imaging means for picking up an image of said operation surfaces, an environment type computer stationarily arranged in said information space, one or more than one physical objects mounted on said operation surfaces and containing a visually identifiable visual marker on the surface thereof and an optical pointer adapted to point a specific position by irradiating a beam of light with a predetermined wavelength, said imaging means being capable of identifying the position pointed by said optical pointer, said system comprising:

a step of recognizing the user operation on said operation surfaces, using said optical pointer; and a step of controlling the display of the digital object by said display means according to the result of the recognition.

In the twelfth aspect of the invention, there is provided an information input/output system to be used for user operations relating to an object in an information space realized by expanding a digital space of a computer into the real world, said system having one or more than one operation surfaces arranged in said information space, a display means for displaying an image on said operation surfaces, an imaging means for picking up an image of said operation surfaces, an environment type computer stationarily arranged in said information space and one or more than one portable computers capable of exchanging digital objects with other computers, said portable computers being capable of retrieving a three-dimensional model and/or generating a three-dimensional model thereon, said system comprising:

a step of generating an image to be projected on said operation surfaces on the basis of the information for drawing a three-dimensional model in response to the application of the user operation of taking out the three-dimensional model from one of said portable computers to said operation surfaces; and a step of controlling the display of said generated and projected image of said display means.

In the thirteenth aspect of the invention, there is provided an information input/output system to be used for user operations relating to an object in an information space realized by expanding a digital space of a computer into the real world, said system having one or more than one operation surfaces arranged in said information space, a display means for displaying an image on said operation surfaces, an imaging means for picking up an image of said operation surfaces, an environment type computer stationarily arranged in said information space and one or more than one portable computers capable of exchanging digital objects with other computers, one or more than one physical objects mounted on said operation surfaces and containing a visually identifiable visual marker on the surface thereof and a portable ID recognition device adapted to recognize the visual marker on the surface of each of said physical objects and being capable of holding or releasing the recognized identification information, said system comprising:

a step of obtaining a digital object corresponding to the held identification information in response to the holding operation of said ID recognition device; and a step of transferring a digital object corresponding to the held identification information to a nearby physical object in response to the releasing operation of said ID recognition device.

In the fourteenth aspect of the invention, there is provided an information input/output system to be used for user operations relating to an object in an information space realized by expanding a digital space of a computer into the real world, said system having one or more than one operation surfaces arranged in said information space, a display means for displaying an image on said operation surfaces, an imaging means for picking up an image of said operation surfaces, an environment type computer stationarily arranged in said information space, one or more than one portable computers capable of exchanging digital objects with other computers and one or more than one physical objects mounted on said operation surfaces and containing a visually identifiable visual marker on the surface thereof, said system comprising:

a step of allowing mouse/cursor operations on said portable computers to extend to said operation surfaces; and a step of displaying a rubber band as visual feedback according to the scope on said operation surfaces as defined by means of said mouse/cursor.

Preferably, the information input/output system in the fourteenth aspect of the invention further comprises:

a step of picking up an image of the scope defined by the rubber band by means of said imaging means and taking the picked up image in said information space as digital object.

Preferably, the information input/output system in the fourteenth aspect of the invention further comprises:

a step of applying a process or a method possessed by said another object to the rubber-banded original digital object in response to an action of said original object of being dropped on said another object.

Said another object may be a physical object possessing a process or a method for printing a document. Thus, a technique of direct interaction of issuing a printing job can be realized by dropping the digital object representing a document onto the physical object.

Alternatively, said another object may be a name card possessing a process or a method for mailing a document to the mail address corresponding to the name on it. Thus, a technique of direct interaction of mailing a document is realized by dropping the digital object representing a document onto the physical object.

Thus, according to the invention, it is now possible to provide an information space, which is a user's work space, by dynamically combining an environment type computer group arranged in the real space including computers of the table type and those of the wall type and a portable type computer group including computers that users can carry with.

A camera-based object recognition system can be introduced into an information space of an information input/output system according to the invention. Then, an image of a computer display screen may be projected on a wall surface by means of a projector. Then, both the projected image, which is an object in the logical space of the computer, and an object in the real world (which, for example, exists on a table) can be recognized on the basis of the image picked up by the camera and the movements of the objects can be traced.

In such an information environment according to the invention, tables and walls in a conference room or a presentation room are computerized to provide an operational environment adapted to three-dimensionally expand a portable computer to provide a large work space (an expanded desk top display) to the user. Then, objects (printed matters such as name cards, VCR tape cartridges, etc.) in the real world may be identified typically by means of "marker recognition" so that information may be exchanged between them.

Additionally, the user can easily incorporate the portable computer he or she brings in into an information space where a number of computers are installed so that the portable computer may be made to cooperate with the other computers in a concerted manner.

Thus, the user can handle information by three-dimensionally making use of the positional relationship of various objects in the real world without paying attention to the addresses and the IDs of the individual objects including devices by using direct handling techniques that are not limited to the closed work spaces of single computers.

For example, the user can use a technique of "hyperdragging"[3], with which he or she continue an operation of dragging an object in the digital space of a computer display to a plane (a table top or a wall surface) where the computer is placed.

With the technique of "hyperdragging", the user can interactively operate an object only by intuitively recognizing the position in the real world that may include the positional relationship between the object and the computer (e.g., "the object is located at a side of the computer"). Additionally, while the user is operating an object at the front end, processing operations may be proceeding in the background among the related computers (e.g., network transfer operations) to move entities of digital objects such as document files.

Furthermore, according to the invention, a physical real space and a digital space on the computer can be fused and put together more deeply so that they can be handled in a highly concerted way. As a result, it become possible for the user to issue user commands to a computer not only by way of native user input devices such as a mouse and/or a keyboard but also by way of various physical objects located dispersedly in the real world if a physical real space and a digital space in a computer can be fused further. It will also become possible to draw out a digital object by way of a physical object. Then, operating computers will become much more intuitive, easily understandable and attractive to the user.

Thus, according to the invention, there is provided an excellent user interface environment where the work space of a computer can be expanded into the real world and the user can input commands and data to computers in a highly intuitive and easily understandable way.

Additionally, according to the present invention, there is also provided an excellent user interface environment where a physical real space and a logical space (digital space) of a computer can be effectively linked.

Still additionally, according to the present invention, there is also provided an excellent user interface environment where a physical real space and a logical space (digital space) of a computer can be closely linked so that a digital object can be handled by way of a physical object in the real world.

Furthermore, according to the present invention, there is also provided an excellent user interface environment where a physical real space and a digital space of a computer are thoroughly fused so that the user can input user commands not only by means user input devices such as a mouse and/or a keyboard but also by way of various physical objects located dispersedly in the real world so as to make it possible to draw out a digital object by way of a physical object.

The other objects, the characteristic features and the advantages of the present invention will become apparent through the following descriptions made by referring to the accompanying drawing that illustrates preferred embodiments of the invention.

DETAILED DESCRIPTION OF THE INVENTION

According to the invention, an "information space" can be dynamically configured by combining a group of computers including those of the table type and those of the wall type arranged in the real world and a group of portable computers carried by users. In such an information space, tables and walls in conference rooms and presentation rooms can operate to provide an operating environment as realized by three-dimensionally expanding the digital space of each computer into the real world ("extended disk top"). An example of a real space to which the present invention is applicable may be a conference room where one or more than one users can do individual operations or a joint operation.

1. System Environment

An information space produced according to the invention provides an information environment where physical spaces containing tables, walls, articles placed on tables and so on and digital spaces logically produced in computers are mutually linked to establish a close relationship.

Figure 1:
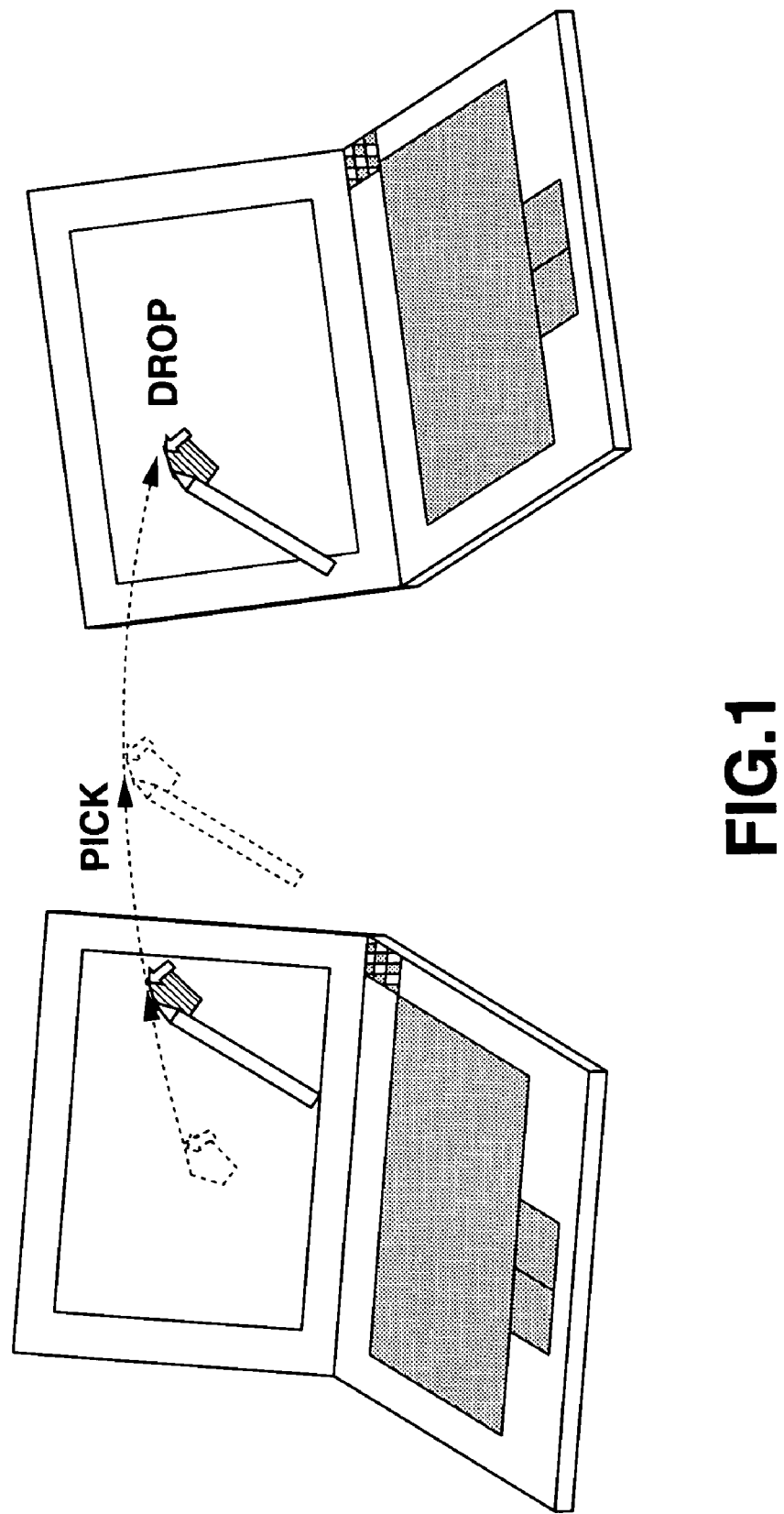
FIG. 1 is a schematic illustration of a pick-and-drop operation and, more specifically, it shows how a GUI operation is succeeded from the display screen of a notebook type computer to that of another computer and a digital object on the former display screen is dropped on the other display screen that are separated from each other in the real space.
Figure 2:
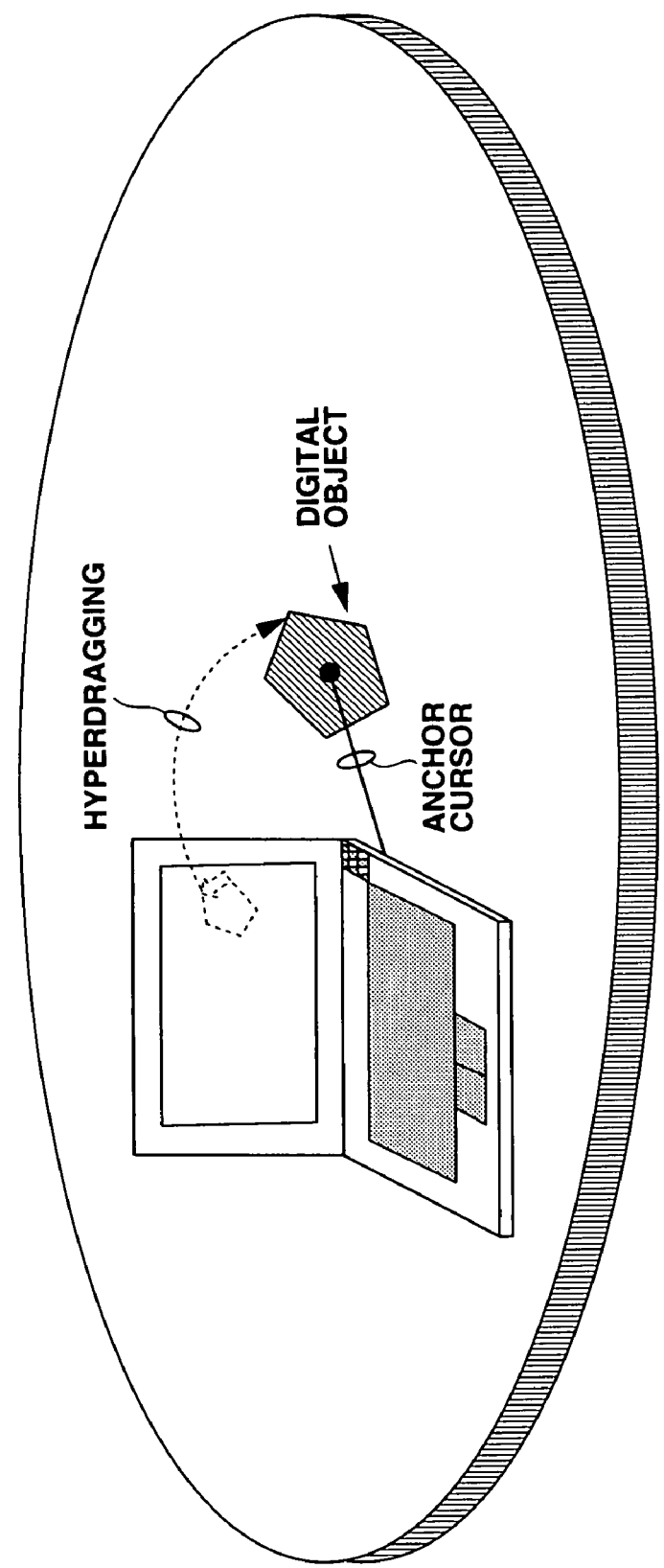
FIG. 2 is a schematic illustration of a hyperdrag operation and, more specifically, it shows how the cursor getting to an edge of the display screen of a computer as a result of the operation of the mouse is moved onto the table carrying the computer.
Figure 3:
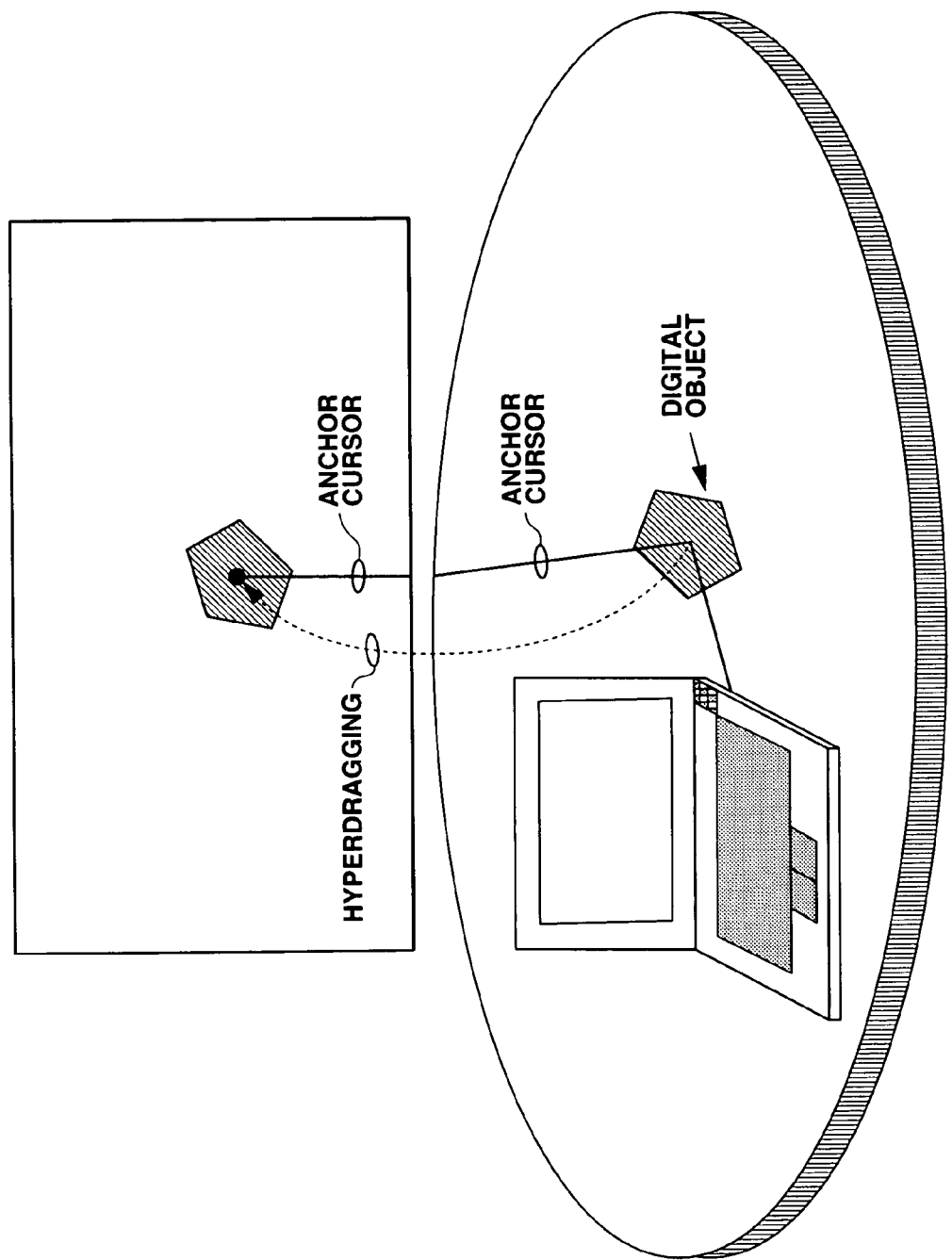
FIG. 3 is a schematic illustration of another hyperdrag operation and, more specifically, it shows how the hyperdrag operation continues from the display screen of a computer onto a wall surface for a digital object.
Figure 4:
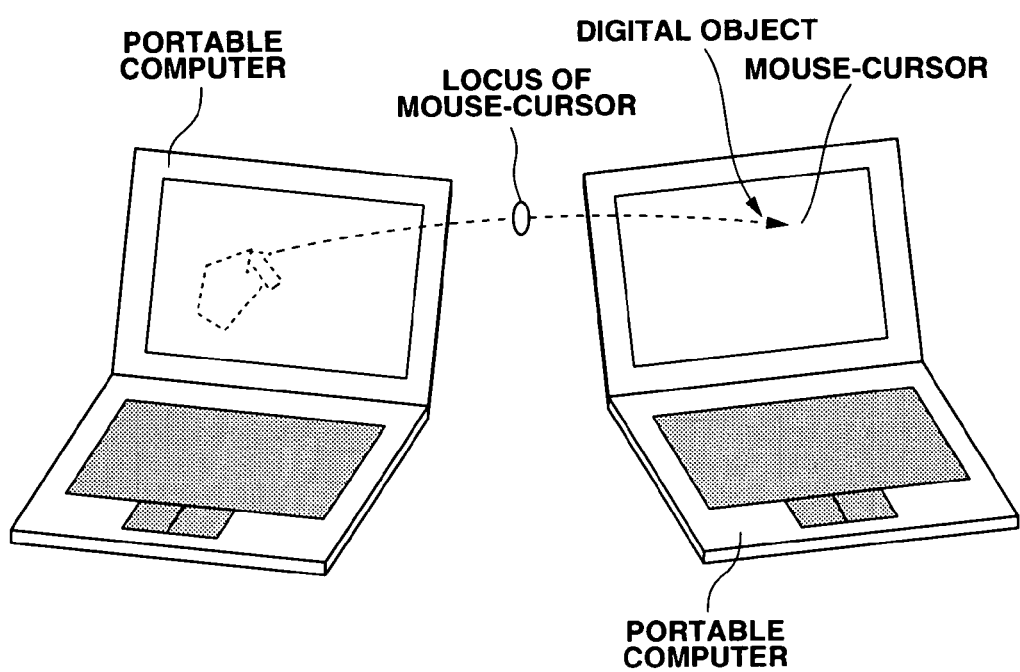
FIG. 4 is a schematic illustration of still another hyperdrag operation proceeding between two or more than two computer screens.
Figure 5:
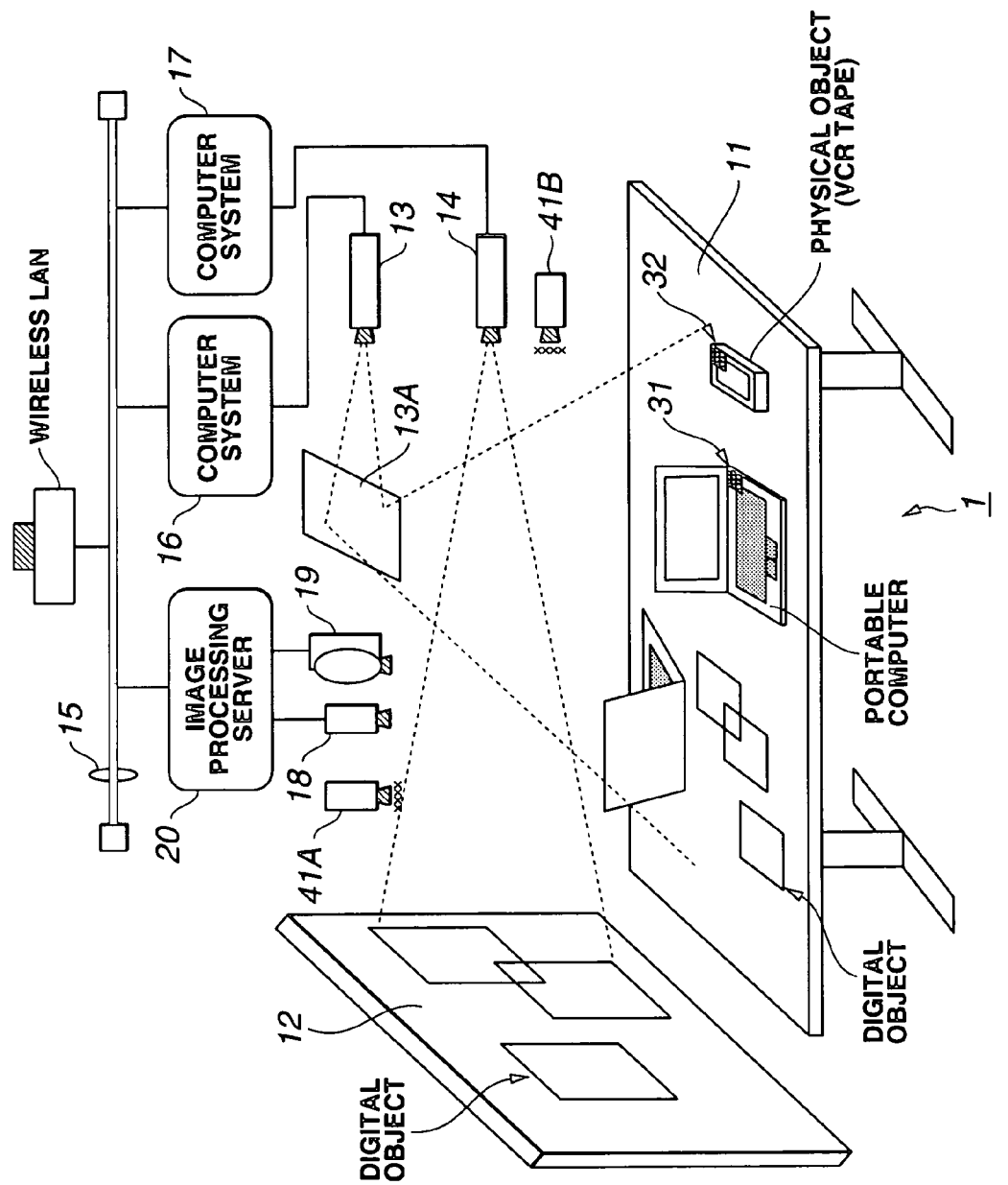
FIG. 5 is a schematic illustration of the configuration of an information space 1 according to the invention.

FIG. 5 is a schematic illustration of the configuration of an information space 1 according to the invention. Referring to FIG. 5, one or more than one LCD (liquid crystal display) projectors 13, 14 are arranged on each of table 11 and wall 12 (but note that the output image of the projector 13 is projected on the table 11 by way of a reflection plane 13A). The projected image of each of the LCD projectors 13, 14 operates as user output unit, or "expanded display", in the information space 1.

What is displayed by each of the LCD projectors 13, 14 is controlled through cooperation of computer systems 16, 17 that are connected to each other. Each of the computer systems may be a system compatible with PC/AT (personal computer/advanced technology) of IBM of the United State or a successor thereof that conforms to the specification of OADG (Open Architecture Developers Group). The computer systems 16, 17 is interconnected via network 15 by means of an NIC (network interface card). Alternatively, they may be interconnected by way of a wireless LAN (local area network).

A fixed camera 18 and a panning/tilting camera 19 are arranged to catch the contents of the digital data displayed on the table 11 and the wall 12 as well as the portable computers and the other physical objects placed on the table 11. The cameras 18/19 may typically be CCDs (charge coupled devices).

The cameras 18/19 operate as user input devices in the information space 1. Image processing server 20 processes the images taken by the cameras and recognizes as images the locations of the digital objects displayed on the table 11 and the wall 12, the user operation to be applied to each of the objects.

Beside the cameras 18/19 that pick up images by using natural light, one or more than one cameras 41A, 41B equipped with respective red filters are also arranged in the information space 1. The red filters used by the cameras 41 are typically so designed as to transmit only output light with a wavelength range close to that of a "laser pointer" provided for presentation purposes. The image processing server 20 can detects the spot indicated by the laser pointer by processing the images taken by the cameras 41 equipped with the red filters. As a result, the user can directly indicate the coordinate values of a remote site on the desk top display expanded into a real space such as the table 11 or the wall 12 by means of the laser pointer.

The image processing server 20 is interconnected with the computer systems 16, 17 for driving and controlling the LCD projectors 13, 14 for display by way of the network 15. Therefore, the user operation in the information space recognized by the image processing server 20 by image recognition is reflected to the projected image to provide an interactive information environment through the expanded display.

The image processing server 20 and the computer systems 16, 17 are "environment type computers" pre-installed in the environment of the information space 1, or the information environment. In the instance of FIG. 5, the environment type computer comprises a plurality of computer systems 16, 17 and 20 interconnected via a network, although it may alternatively comprise a single computer having strong processing capabilities.

Assume that there are also physical objects, digital objects and a data base server (not shown) for registering and controlling the linked relationship established among the objects in the information space 1. The data base server may be a dedicated server machine connected to the network 15 or a server application adapted to operate on one of the computers of the environment type computer.

Users brings in their respective portable computers (as shown) into the information space 1 having the above described configuration and operate individually or cooperatively.

The information space 1 is a composite digital space produced through coordinated operations of one or more than one computers. Each of the table 11 and the wall 12 displays a digital object existing in a digital space. As a result, physical objects and digital objects coexists in the information space 1. Furthermore, users can carry out various user operations (as will be described hereinafter) on digital objects on the table 11 and/or the wall 12. In other words, the work space (desk top display) of each computer is expanded to produce an "expanded display". The inventors of the present invention refer to the table 11 and the wall 12 constituting so many expanded displays as "InfoTable" and "InfoWall" respectively.

Certain prerequisites have to be met before realizing an information space according to the invention.

Firstly, each of the portable computers and the other physical objects has to carry on the surface thereof a visual marker 31 or 32 such as a cyber code[6] that can be visually recognized and identified. The visual marker of the pre-installed environment type computer can be recognized and identified by way of the corresponding images picked up by the cameras 18/19.

Secondly, the dynamically installed portable computers 21, . . . have to be interconnected typically by way of a wireless LAN or some other communication means. In other words, the portable computers can transfer mutually or to and from the environment type computer entities of digital objects (such as document files and digital contents) through interactive operations conducted on any of the expanded displays.

Now, the scheme for recognizing and identifying physical objects (and operating physical objects) in the information space 1 by using the cameras 18/19 will be described.

The cameras 18/19 that are used as sensors for recognizing an object normally show a relationship of tradeoff between the resolution and the field of view. The cameras 18/19 have to have a sufficiently high resolution in order to identify the very minute visual marker attached to a physical object. An image picked up with a high resolution is also useful for preparing a record for the table 11.

However, currently marketed video cameras do not mostly meet the specification for satisfying both the required level of resolution and the view angle for picking up an image of the entire top surface of the table 11. "Digital Desk"[4] is an attempt for solving this problem by using two cameras. The second camera shows a higher resolution than the first camera and is used to pick up a particular part of the table top. The users are requested to place documents in within the field of view of the second camera.

Meanwhile, the inventors of the present invention intended to solve the above tradeoff problem by combining two cameras. The first camera 19 is a motor-controlled video camera (e.g., EVI-D30: trademark, available from Sony Corporation) that can be remotely controlled for panning, tiling and zooming according to the commands input from an external computer system. The first camera 19 can not only pick up an image of the entire table 11 but also part thereof by zooming in to that part with a high level of resolution (max. 120 dpi). Normally, the direction of the head of the panning/tilting camera 19 is periodically shifted to scan the entire top surface of the table 11. For instance, the top surface of the table 11 may be divided into 6×6 blocks and the panning/tilting camera 19 may be so controlled as to regularly visit (shoot) all the 36 blocks. The inventors of the present invention calls this camera operation as "Desksat" by parodying Landsat (land-satellite). The time required for the camera 19 to visit all the blocks is about 30 seconds including the time necessary for controlling the camera and processing the obtained images.

Figure 6:
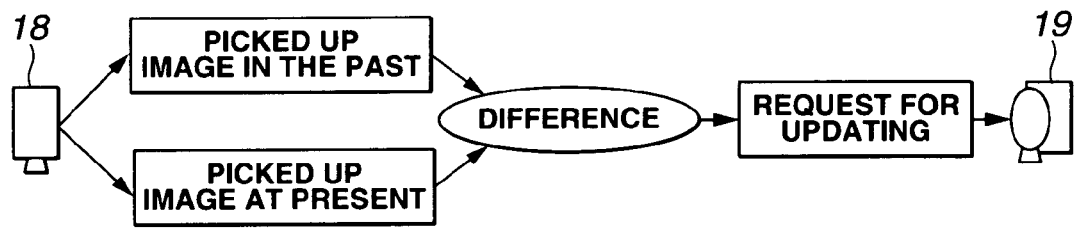
FIG. 6 is a schematic illustration of the arrangement for detecting the change on the table 11 by using a fixed camera 18 and a panning/tilting camera 19.

On the other hand, the second camera 18 is a fixed camera for observing the entire top surface of the table 11. The camera 18 analyses any change on the table 11 on the basis of the difference, if any, between an image picked up by it in the past and the image currently being picked up by it. Then, its determines in which blocks of the 36 blocks the change took place and transmits an event of "area changed" to the panning/tilting camera 19 (see FIG. 6). The panning/tilting camera 19, on its part, instantaneously researches the "area changed", using the event information so that it can update the image picked up by it.

In order to make the detecting operation of the fixed camera 18 to be unaffected by fluctuations in the projected image, a predetermined threshold has to be used for the detection of the difference.

In this embodiment, empirical laws are utilized to a certain extent in order to determine the sequence of operation of detecting the "area changed". Human beings are normally apt to use a table from the outer periphery toward the inside of the table top so that objects located in the inside of the table top are liable to change. In other words, the inside of the table top has priority relative to the outer periphery. Therefore, when the fixed camera 18 catches a change in a plurality of blocks at a time, the panning/tilting camera 19 scrutinizes the changed blocks from the inside toward the outside.

With this technique of object recognition, using two cameras, if the user puts an object on the table 11 or moves an object on the table, such an event can be recognized by the environment type computer 20 in several seconds. While, this response time may not necessarily be sufficient for continuous real time object tracing such as "Illuminating Light"[5], it will be enough in an information environment for detecting an intermitting motion.

Now, the scheme used by the environment type computer for recognizing the visual marker of an object on the basis of the images picked up by the cameras will be described.

All the physical objects including the portable computers installed in the information space 1 carry respective visually recognizable visual markers attached to them. An example of such visual marker may be cybercodes[6], with which up to $2^{24}$ objects can be identified on the basis of combinations of arrangements of printed patterns (note, however, that this embodiment utilizes a code arrangement system that is slightly different from the one described in reference document [6]). According to the above described Desksat architecture, the panning/tilting camera 19 can recognize a two-dimensional marker of the size of 2 cm×2 cm placed on the table.

Figure 7:
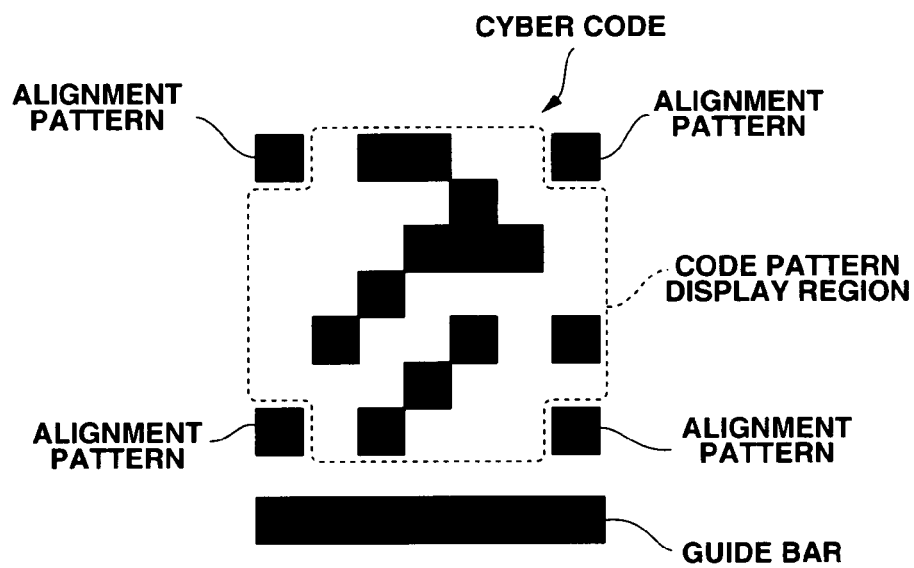
FIG. 7 is a schematic illustration of a cybercode, showing its configuration.

A cybercode is a type of two-dimensional bar code and comprises "a guide bar region" for showing the location of the cybercode and a "code pattern region" for showing a two-dimensional code pattern as shown in FIG. 7. The code pattern region contains cells arranged to form an n×m matrix (7×7 in FIG. 7), each cell being either a white cell or a black cell to form a binary system. Note that black cells are always arranged at the four corners of the code pattern region to make them operate not as information carriers but as registration cells. A cybercode can be used to identify a total of $2^{24}$ objects by changing the arrangement of the printed cells.

The procedure of recognizing a cybercode comprises:

(1) a step of binarizing the picked up image thereof;

(2) a step of finding guide bar candidates from the binarized image;

(3) a step of detecting the corner cells on the basis of the position and the direction of the guide bar; and (4) a step of decoding the bit map pattern of the image in response to the detection of the guide bar and the corner cells.

Then, the ID information and the positional information contained in the code can be recovered by carrying out an error bit check operation to make sure that the picked up image contains a correct cyber code. Any distortions that may be generated in the code as a result of inclination of the camera and/or the object can be compensated on the basis of the positions of the corner cells.

Visual markers including cybercodes can be utilized not only to obtain identification information on physical objects but also to recognize the locations and the directions of the physical objects carrying markers. For instance, when the user is operating a portable computer for hyperdragging in the information space 1, the cursor position on the table 11 is computed on the basis of the current position and the direction of the visual marker attached to the portable computer and reflected to the image projected by the LCD projector 13.

If a physical object having a surface area greater than a predetermined level such as a pamphlet is attached with a visual marker, a coordinate system may be defined on the surface area by using the visual marker as origin. Then, for example, it is possible to bury link information for the physical object and/or some other objects at a position of coordinates (x, y) on the pamphlet (as will be described in greater detail hereinafter).

Since visual markers are provided as printed matters, they do not substantially involve any cost. Visual markers can be used in a number of different modes that are not available to any other identification systems. For instance, it is possible to use Post-it containing a visual marker. A digital object (e.g., voice note or photographic image) attached to the identification information of a visual marker is transferred as Post-it moves.

Now, transfer of object, or transfer of information, in the information space 1 will be discussed below.

In the case of the information space 1 of this embodiment, when an object is manipulated interactively by using techniques such as hyperdragging in the real world, a data/file that is an entity of the object is transferred from a device (computer) to some other appropriate device (computer).

Since a visual marker containing identification information is attached to each of the physical objects arranged in the information space 1 of this embodiment, the position of each of them can be identified and the information on the relative positions of any two objects can also be identified from the images taken by the cameras 18/19.

The motion system is described in Java (an object-oriented programming language developed by Sun Microsystem in the U.S.) so that a transfer of an object can be realized by utilizing the object transfer feature, the object alignment protocol and the remote method invocation (RMI) of Java.

Objects that are movable in the information space 1 of this embodiment include texts, images, URLs (uniform resource locators), sounds and moving pictures.

2. Information Environment

Now, some of the characteristic aspect of the information environment provided in the information space 1 of this embodiment will be described below.

2-1. Link of an Environment Type Computer and Portable Computers

In the information environment provided in the information space as shown in FIG. 5, the stationary "environment type computer" installed in a real space, which may be a conference room, is linked to one or more than one "portable computers" brought in by some of the attendants of a conference.

Each portable computer owned by a user is provided with a user interface that operates perfectly by itself. Therefore, if the portable computer is linked to the environment type computer, it is desirable that the existing user interface is not totally replaced but extended to interactively link the portable computer to the environment type computer and the other portable computers in the information space 1.

For instance, as a portable computer is simply placed on the table of the conference room, the entire top surface of the table 11 and/or a wall 12 becomes available as virtual expanded display for the portable computer.

If a plurality of users place their respective portable computers on the same table 11, the entire top surface of the table 11 can be used as common work space for the user group.

Figure 8:
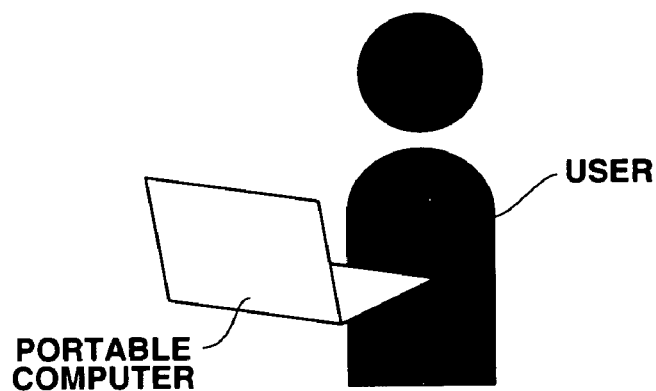
FIG. 8 is a schematic illustration of the process of expanding a user's portable computer by means of an environment type computer, where the user is operating on his or her own portable computer.
Figure 9:
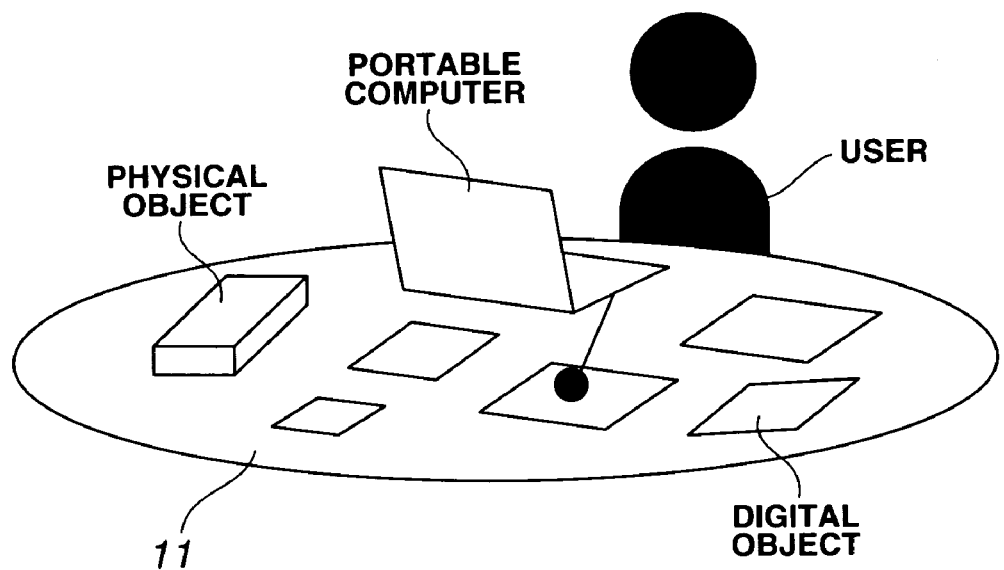
FIG. 9 is a schematic illustration of the process of expanding a user's portable computer by means of an environment type computer, where the user is utilizing the top of the table of a conference room (infotable) or a wall surface (infowall) as spatial extension of the display screen of his or her own portable computer.
Figure 10:
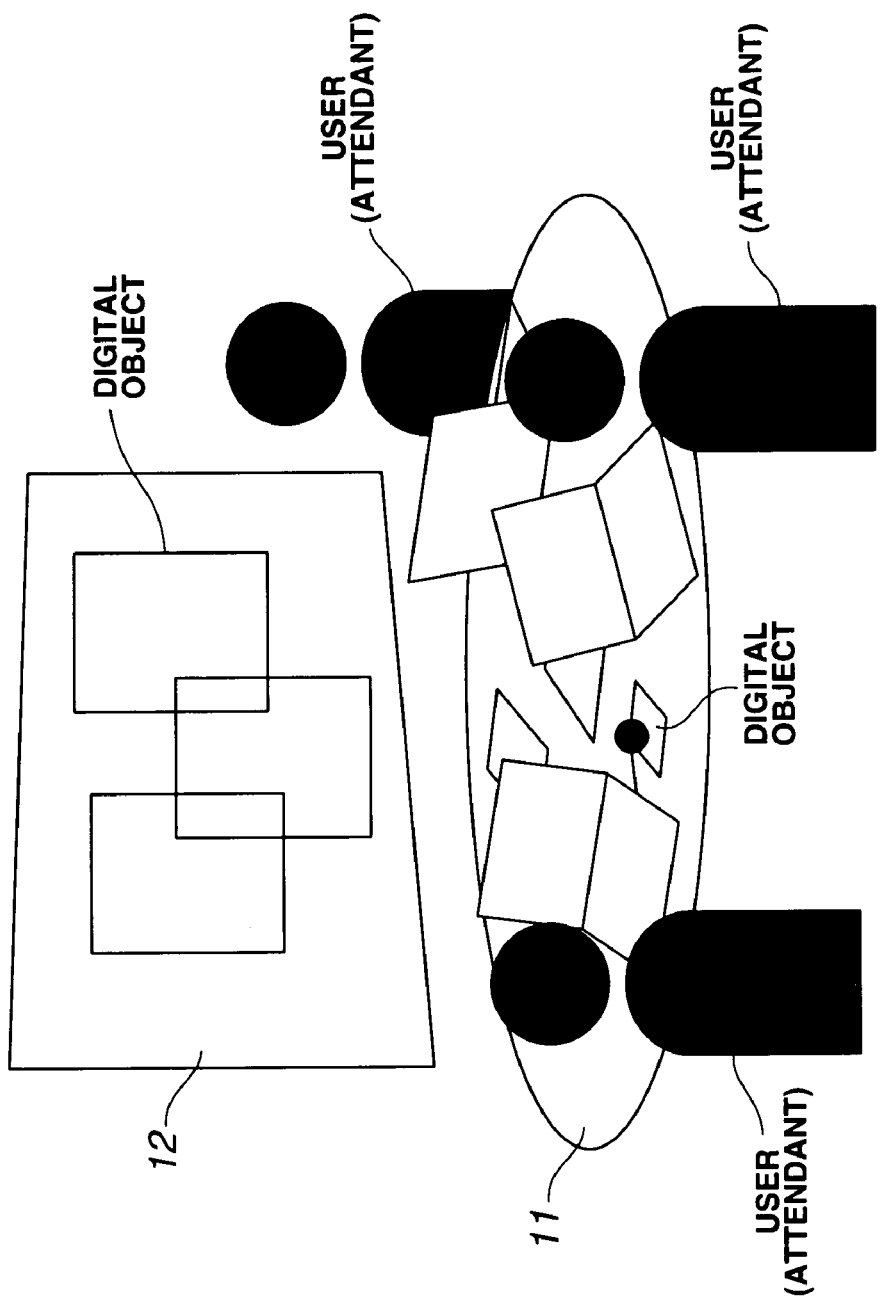
FIG. 10 is a schematic illustration of the process of expanding a user's portable computer by means of an environment type computer, where a plurality of users are cooperating with each other, using expanded displays such as a table top (infotable) and a wall surface (infowall) for a digital object.

FIGS. 8 through 10 schematically illustrate how the portable computer of each user is extended by an environment type computer.

(a) Each user does his or her work on his or her own portable computer (see FIG. 8). The use can drag-and-drop an object by using the mouse/cursor on the conventional GUI (graphical user interface) provided in the stand along environment of the portable computer.

(b) As the user places the portable computer on the table 11 in the information space, the top surface of the table and the wall surface become available as three-dimensional extension of the desktop display of the portable computer.

More specifically, if the user is seated on a chair to face the table 11 and places his or her portable computer on the table 11, the camera 18 shoots the computer. The image processing server 20 recognizes the visual marker 31 attached to the portable computer on the basis of the images picked up by the camera 18 and identifies the owner/user of the portable computer. The image processing server 20 also recognizes the position and the direction of the portable computer.

For instance, the user can hyperdrag the digital object representing an information item such as a document film or a holder from the display screen of the portable computer and place it on the table 11 or the wall 12 (project an image of it by means of the LCD projector 13 or 14 to be more accurate) (see FIG. 9).

The user can also quickly access the information if the digital objects he or she uses frequently are placed near the portable computer.

The digital object projected on the table 11 and/or the wall 12 may be manipulated by means the mouse/cursor of the portable computer and/or a laser pointer, which will be described hereinafter.

(c) If a plurality of users are seated around the same table 11, each of the users can operate on his or her portable computer. Then, the table and the wall 12 become a common work space that can be shared by the user groups. For instance, digital objects may be freely transferred, viewed, exchanged and/or distributed by way of the expanded display formed by the top surface of the table 11 and the surface of the wall 12 (see FIG. 10).

In short, the user can move the digital object or the application window he or she is using on the computer onto the expanded display formed by the table 11 and the wall 12 and produce a wider logical work space around the computer he or she brought in.

In the information space of this embodiment, the concept of the techniques for interactive operation, or direct manipulation, developed for GUIs (graphical user interfaces) can be introduced onto the expanded display that is developed in the real world. More specifically, a digital object can be manipulated on the expanded display formed by the table 11 and the wall 12 by using operations adapted to ordinary GUIs such as pointing, dragging and menu selection by way of the user input devices that the portable computer is equipped with including the track ball, the touch pad and the keyboard.

Figure 11:
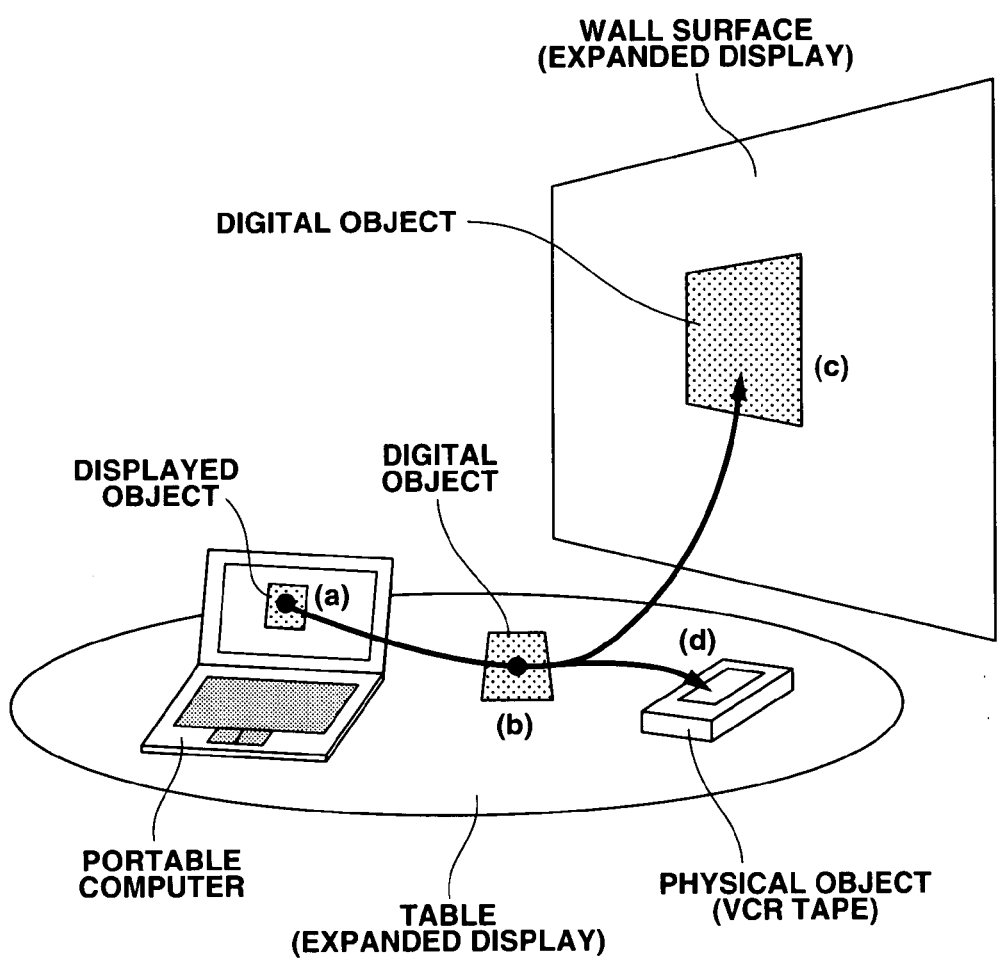
FIG. 11 is a schematic illustration of a drag-and-drop operation to be conducted on the display screen of a computer and developed to an expanded display outside the disk top.

FIG. 11 schematically illustrate a user operation conducted on the expanded display that is provided in the information space 1.

(a) The user drags a digital object on the computer display according to the ordinary GUI procedure, using a pointing device.

(b) If the dragging operation is continued when the cursor gets to the peripheral edge of the display screen, the cursor jumps from the display screen onto the table 11 (to be more accurate, an image of the cursor is projected on the surface of the table 11 by a projector). At this time, the entity of the digital object (e.g., the corresponding document file or holder) is transferred from the portable computer to the environment type computer.

(c) The user can further continue the dragging operation to move the digital object out of the top surface of the table 11 to, for example, the surface of the wall 12.

If an information carrier such as a calendar is found on the surface of the wall 12, the object can be moved and attached to the calendar (the information possessed by the object is linked to the calendar to be more accurate).

(d) The user also can drop a digital object on a real physical object such as a VCR tape cartridge placed on the table. Such an action of dropping a physical object provides an effect of linking the real object to a digital or virtual object.

When manipulating an object as shown in FIG. 11, it is sufficient for the user only to pay attention to the positional relationship of the objects on the table including the computers and the other physical objects. With the information environment of this embodiment, there is provided a feature of an integrated spatial metaphor for handling information.

Therefore, the user can handle any of the digital objects stored in the portable computer, those appeared on the expanded display formed by the table 11 and the wall 12 and those formed and linked to one or more than one physical objects on the table in an intuitive and seamless way.

As described above by referring to FIG. 11, if the user want to transfer data stored in the portable computer to the expanded display including the table 11, he or she is simply required to drag the digital object from the computer display screen onto the table through the peripheral boundary of the computer. As the mouse/cursor gets to the peripheral edge of the computer display screen, the cursor automatically moves from the computer display screen onto the table. It may be needless to say that a digital object can be attached, or linked, to a physical object placed on the table simply by dragging-and dropping the digital object onto the table.

The techniques for interactive operation, or direct manipulation, developed for GUIs are used in place of the interactive techniques such as hand gesture recognition in this embodiment because notebook computers are provided integrally with interactive devices that are equipped with a sufficient number of application programs. By using the interactive devices provided in ordinary computers, the computer user can interactively manipulate a digital object on the table 11 or the wall 12 without modifying the mode of user interface that the user is accustomed to.

Recently, most notebook computers are equipped with an audio input/output device. Therefore, it is possible to use an interactive technique of generating a voice while working on the expanded display.

Still additionally, it is also possible to use input devices such as a microphone and a camera provided in the portable computer as means for preparing a voice memo.

2-2. Three-dimensional Continuity of Information Handling

Three-dimensional continuity of information handling is realized in the information environment provided in the information space as shown in FIG. 5.

Assume an environment where various information devices including computers are dynamically added. Then, it is an excessively heavy and cumbersome work for the user to accurately grasp the network addresses and the names of the devices. On the other hand, in a closed work space such as a conference room, most of the devices in the room are directly visible to the user unlike the case of ordinary remote telecommunication. Therefore, it should be possible to recognize the object to be manipulated in the real world and directly handle information without using indirect/semiotic concepts such as addresses.

In the information space 1 of this embodiment, devices can be specified in an intuitive and direct way on the basis of their three-dimensional positional relationship in the real world by using expressions such as "from the right computer to the left computer" and "left screen" so that it is no longer necessary to use indirect specifying expressions such as "Transfer a file from computer ABC to computer DEF." and "Send the slide data to projector C.".

In the information space 1 of this embodiment, a physical operation to be conducted by the user such as "placing a computer on the table" or "brining the PDA closer to the black board" is reflected to the connected network and, if necessary, the corresponding digital object is transferred between the related devices.

2-3. Link to Physical Objects in the Real World

Most physical objects that are handled in daily lives are not digital objects that exist only in logical spaces of computers but non-electronic and non-digital objects existing in the real world (e.g., printed documents and VCR tape cartridges). Therefore, it is desirable to taking in such physical objects as part of information environment.

In the information environment provided in an information space 1 as shown in FIG. 5, a physical real space and a digital space in a computer are closed fused to each other and a relationship of lining the physical object in the real world and the data base object can be effectively established by observing the above described principle of "three-dimensional continuity". As a result, the word load of the user relating to object handling can be greatly reduced.

For example, an operation of selecting a three-dimensional model from a photograph printed on a pamphlet, digitizing it and taking it onto the top surface of the table 11 (expanded display) or into a portable computer and an operation of bringing related slide data into the conference room with other conference data can be carried out easily and smoothly.

It is also possible to register the information for linking an individual item printed on a pamphlet to a digital object. If the pamphlet is that of marketing furniture, the information linking the photograph of an item of furniture printed on the pamphlet (or the string of characters representing the model number of the item) to the three-dimensional model of the item can be buried there. Still additionally, it is also possible to draw out the digital object linked to a specific item on the pamphlet simply by carrying out a mouse/cursor operation familiar to the user in the GUI environment on the pamphlet. For example, by conducting a drag-and-drop operation on a photograph or a string of characters of an item printed on the pamphlet, the three-dimensional model of the item can be displayed, or projected, to the expanded display that may be the top surface of the nearby table 11.

In such a direct user interface environment where the user cam take out a digital object from the printed pamphlet by using the technique of drag-and-drop, it is no longer necessary for the user to be aware of the coupling relationship (mapping) between the pamphlet and the digital contents.

In this embodiment, the link between a digital object and a physical object in the real world can be realized by the above described camera-based object recognition technique.

For example, each of the physical objects in the real world is attached with a visual marker that can be easily and visually recognized and identified. A typical example a visual marker is a "cybercode" (see FIG. 7). The camera recognition system picks up an image of the visual marker and analyses it to recognize and identify the physical object, its position and its direction and can also draw out the digital object linked to the physical object. Additionally, a new link can be established between a physical object and a digital object by dragging-and-dropping the digital object onto the physical object.

Technologies for linking an object in the real world and electronic information such as digital contents include InfoBinder[7], mediaBlocks[8] and Passage[9]. However, the treatises proposing those technologies describe only the use of icons physically produced for the purpose of moving digital objects and do not provide any of such physical icons with a role or an application in the real world.

To the contrary, in an information space according to the invention, it is possible to establish a link between a digital object and an object having a specific role and a specific application in the real world. For example, physical objects such as document holders, documents, cards and VCR tape cartridges can be coupled to electronic information. For example, a VCR tape cartridge may be carried around with a digital photograph that shows the contents of the VCR tape and is virtually attached to it or the instructions that may become necessary when editing the VCR tape may be attached to the cartridge as digital voice note. It is also possible to attach slide data relating to a conference to a document holder.

The processing procedures for establishing a link between a physical object and a digital object and for referring to the link information on a physical object will be discussed in detail hereinafter.

3. Object Manipulation

Now, the processing procedure for manipulating an object provided in the information space 1 of this embodiment will be described below.

3-1. Installing a Physical Object in the Information Space

In order for a physical object in the real world to be deeply fused to a digital space of a computer and closely linked to a digital object, the position object has to be installed in the information space 1 in advance.

As the user enters into the information space 1 and place the physical object on the table 11, the physical object is installed in the information space 1. The term of "physical object" as used herein may refer to the portable computer of the user him- or herself, a printed matter such as a pamphlet, a VCR tape cartridge or a model camera. In reality, this installing operation follows the processing procedure as described below.

(1) The cameras 18/19 shoot the physical object.

(2) The image processing server 20 recognizes the visual marker 31 attached to the physical object on the basis of the images picked up by the cameras 18/19 and specifically identifies the physical object. If the physical object is a device adapted to accumulate digital objects in it such as a portable computer, the image processing server 20 also identifies the owner of the physical object and establishes a data transfer route between the physical object and the environment type computer typically by connecting it to a network.

(3) The image processing server 20 also recognizes the information on the position and the direction of the physical object on the table 11.

(4) Additionally, it is possible to establish a coordinate system on the surface of the physical object on the basis of the information on the position and the direction contained in the visual marker. For example, if the physical object is a printed matter having a certain surface area such as a pamphlet, a set of coordinate values may be assigned to each printed item on the pamphlet by using the visual marker as the origin of the coordinate system.

Figure 12:
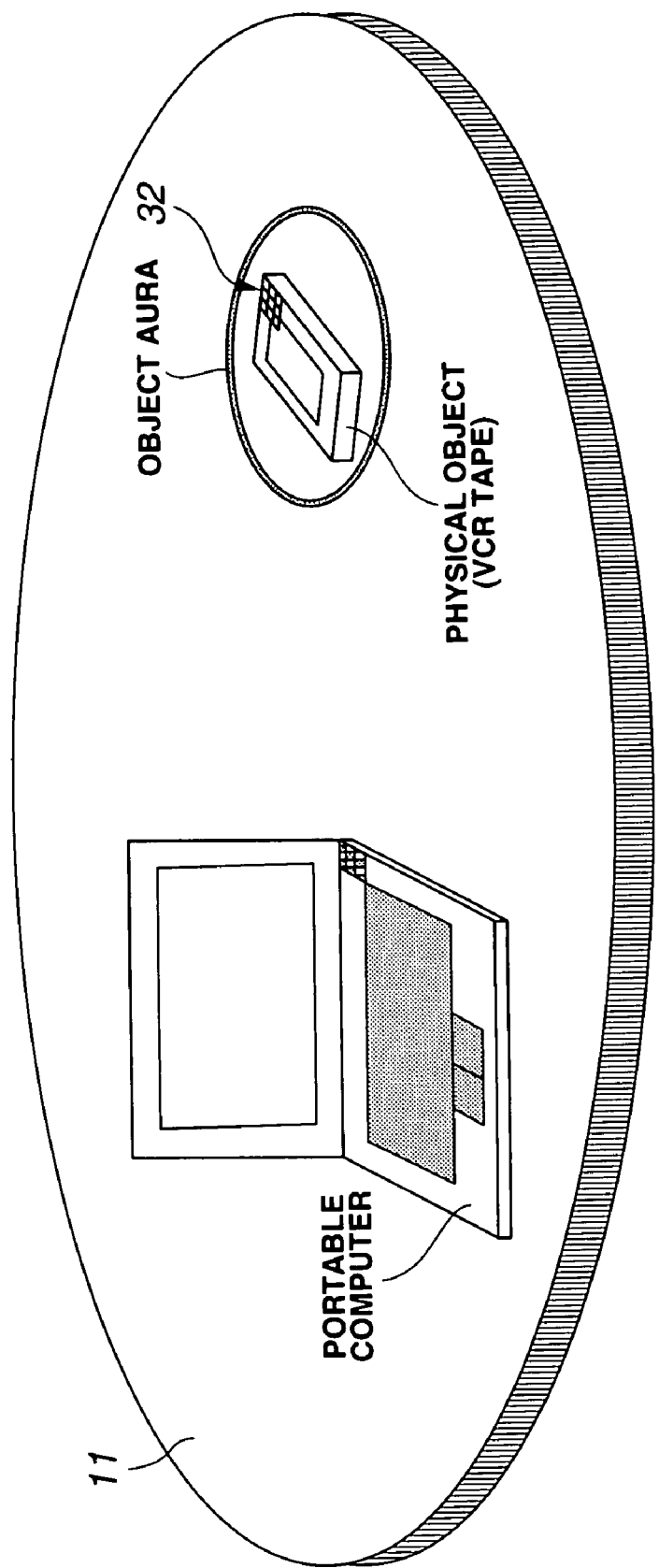
FIG. 12 is a schematic illustration of a physical object (VCR tape) placed on a table 11 and then installed in an information space 1, where a substantially elliptic contour ("object aura") surrounding the physical object is displayed.
Figure 13:
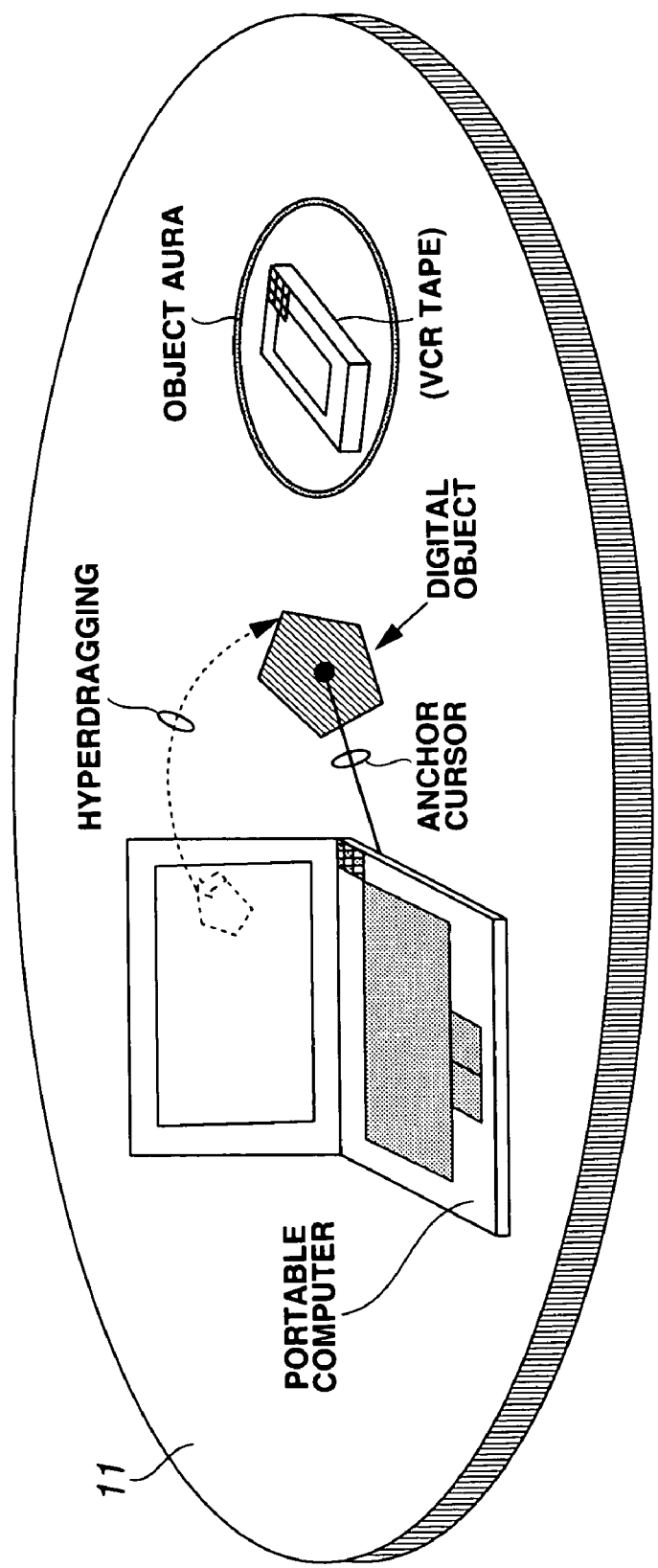
FIG. 13 is a digital object attached to a physical object, where the digital object on a table 11 is hyperdragged toward an object aura.
Figure 14:
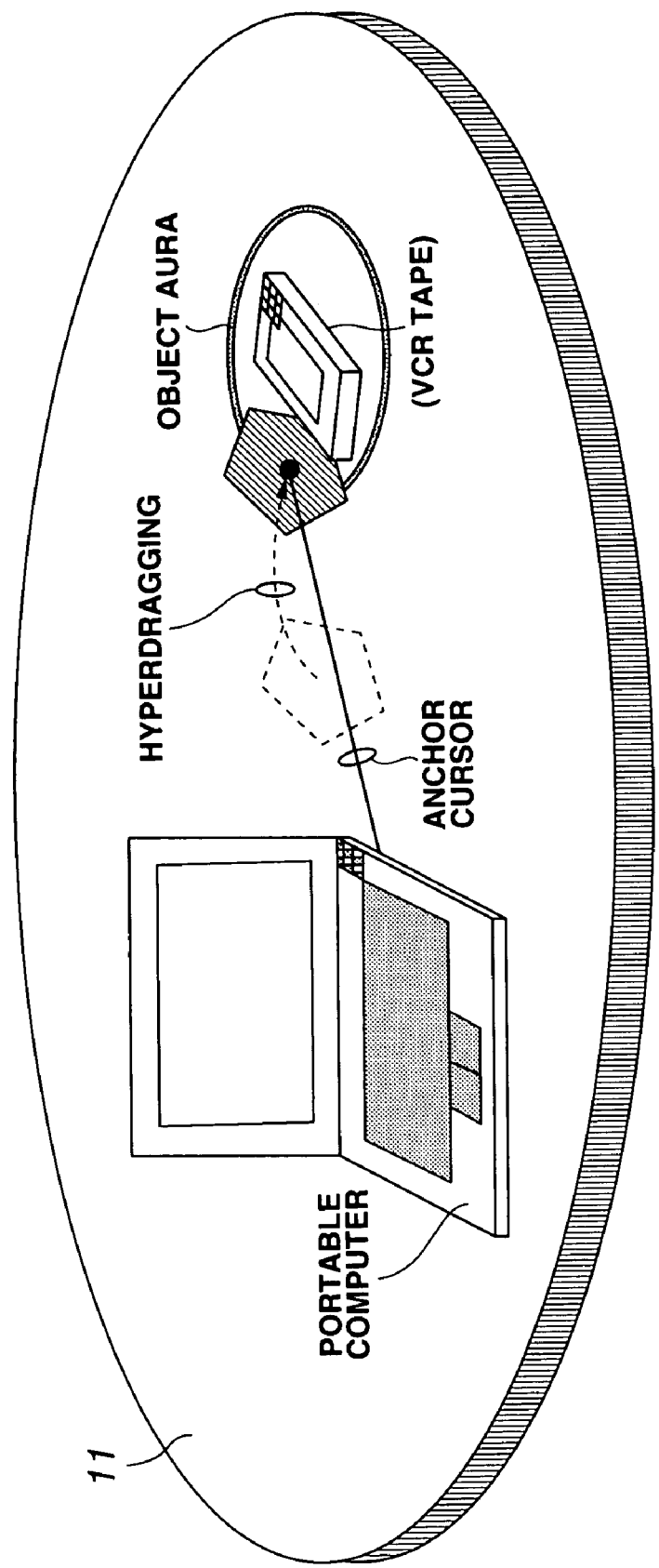
FIG. 14 is a digital object attached to a physical object, where the digital object hyperdragged from the top surface of a table 11 is dropped in an object aura.

As shown in FIG. 12, an object aura may be projected and display for a physical object (a VCR tape cartridge in the case of FIG. 12) in order to visually feed back the existence (or non-existence) of the fact of installing the physical object in the information space 1. An object aura is an elliptic area surrounding the physical object to be treated and defines a data space that the physical object has. Therefore, the user can attach, or link, a digital object to the physical object by hyperdragging the digital object on the table 11 (see FIG. 13) and dropping it in the object aura (see FIG. 14).

3-2. Establishing a Link to a Physical Object and Referring to the Link

It is already described that link information can be registered for each item on the surface of the physical object installed in the information space 1 and the link information of each item can be taken out. Now, the processing procedure for registering link information and the procedure for referring to the registered link information will be discussed below.

Figure 15:
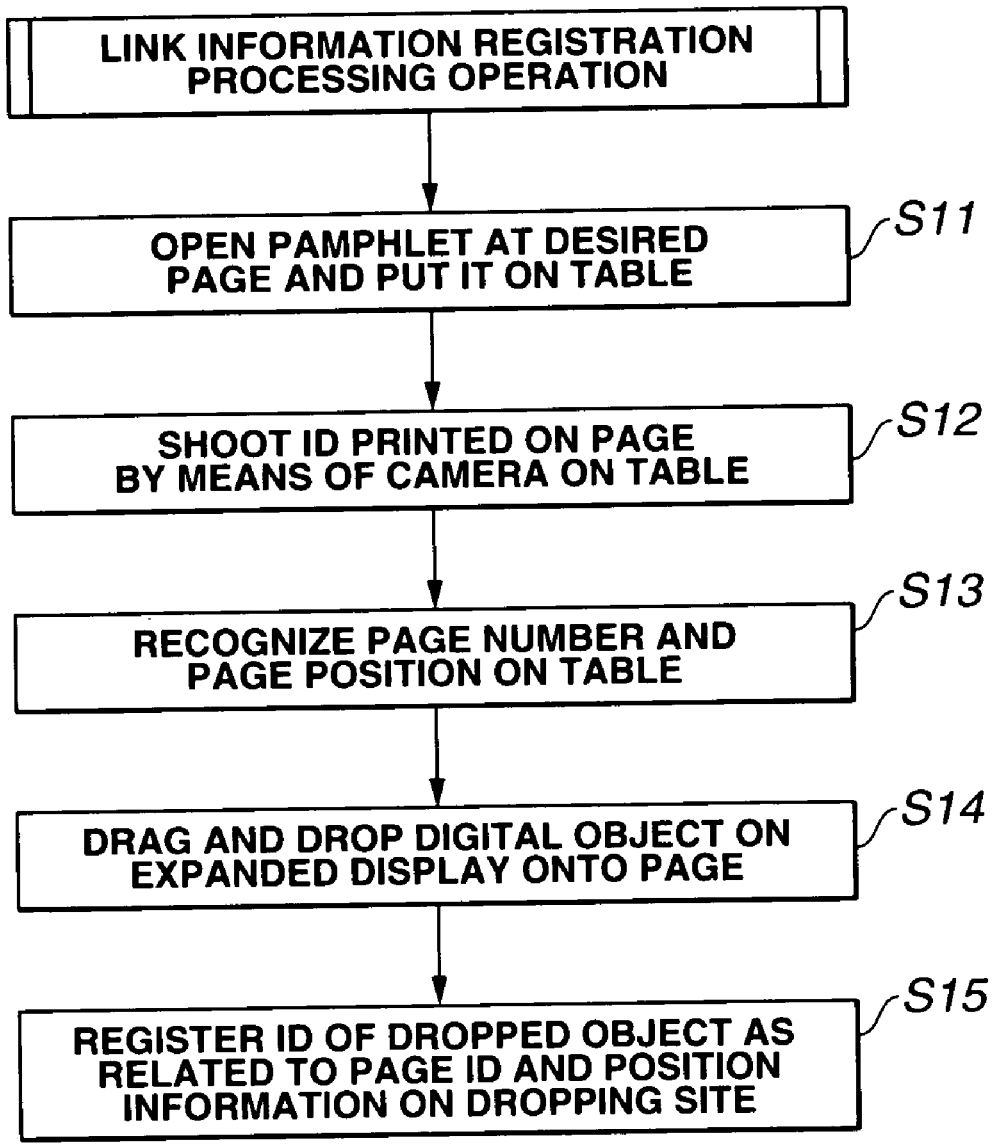
FIG. 15 is a flow chart of the processing operation for registering link information on the surface of a physical object.

FIG. 15 is a flow chart of the processing operation for registering link information on the surface of a physical object. Assume that the physical object is a pamphlet and link information is formed on a predetermined page of the pamphlet. Now the steps of the processing operation will be discussed by referring to the flow chart.

Firstly, the pamphlet is opened at a desired page and placed on the table (Step S11).

Assume that a page identifier or a visual marker showing a page number is attached to each of the pages of the pamphlet. Therefore, as the cameras 18/19 arranged above the tape 11 shoot the opened page (Step S12) and the image processing server 20 recognizes the visual marker, the page number of the exposed page can be identified (Step S13).

As a result of recognizing the page number, the page is installed in the information space 1. Therefore, an object aura surrounding the page is projected and displayed.

Figure 16:
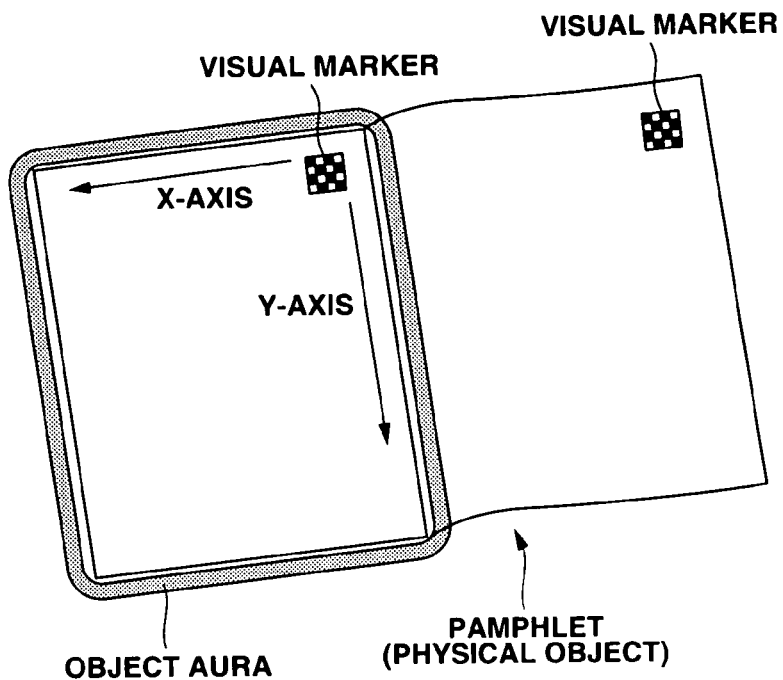
FIG. 16 is a schematic illustration of the processing operation for registering link information on the surface of a physical object, where a page of a pamphlet is installed in an information space 1 and an object aura is projected and displayed.

Additionally, since a visual marker can provide not only identification information but also information on the position and the direction of the physical object, it is possible to provide each spot on the page with coordinates (x, y), using the visual marker as origin of the coordinate system (see FIG. 16).

Figure 17:
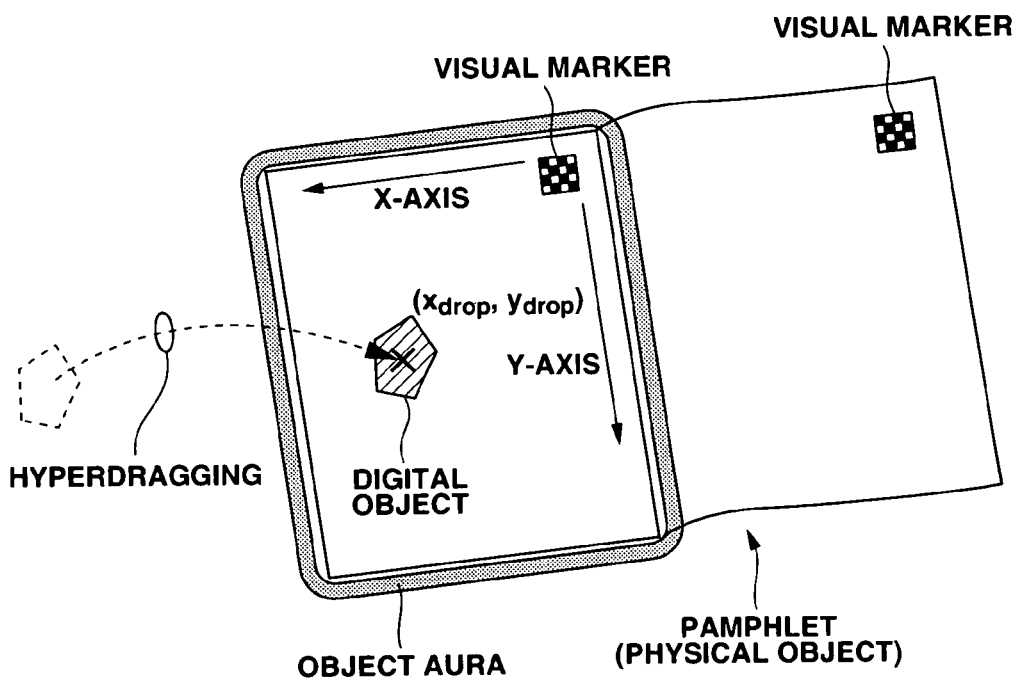
FIG. 17 is a schematic illustration of the processing operation for registering link information on the surface of a physical object, where a digital object is dragged and dropped on a page of a pamphlet.

Then, the user utilizes a hyperdragging operation to drag-and-drop digital objects dispersed on the table 11 and the wall 12 (or digital objects still found on the computer display screen) onto the page (Step S13) (see FIG. 17).

Each of the spots where the digital objects are dropped respectively can be determined in terms of the coordinates (xdrop, ydrop) of the coordinate system using the visual marker as origin.

The environment type computer registers the name of each of the dropped digital objects (which may be the object identifier) in the data base of the computer after linking it to the page identifier (or the page number) and the coordinates (xdrop, ydrop) of the spot where it is dropped (Step S15).

Figure 18:
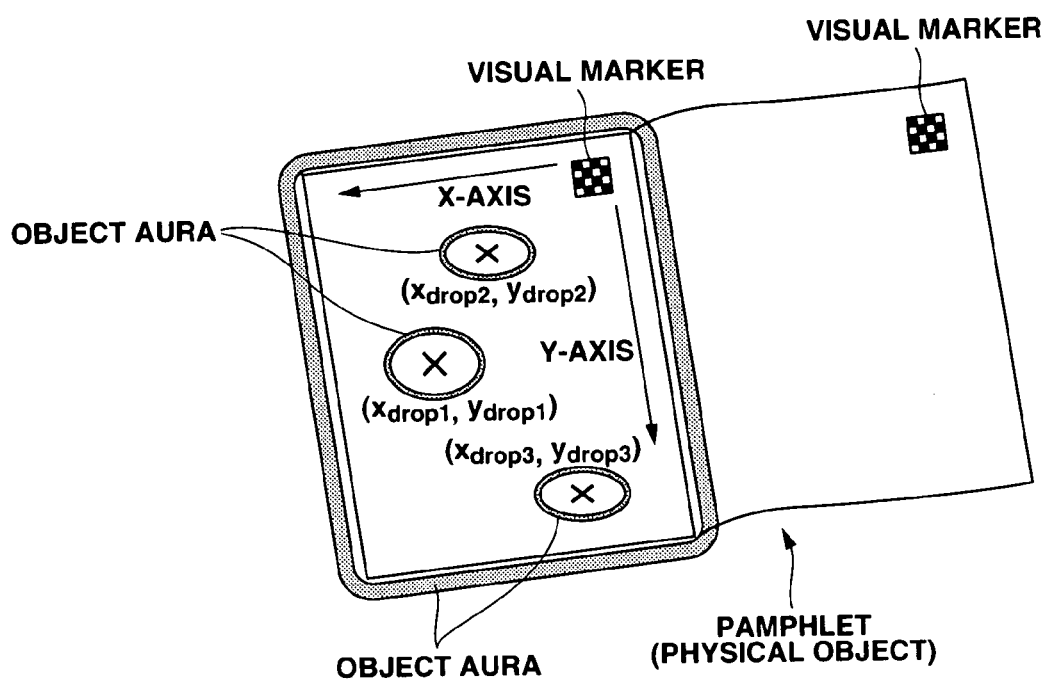
FIG. 18 is a schematic illustration of the processing operation for registering link information on the surface of a physical object, where

As a result of registering each of the digital objects dropped on the page, a link to the dropped spot (xdrop, ydrop) on the page is established. Thereafter, as the page is installed in the information space 1, an object aura is projected and displayed on each of the spots on the page where the link information is buried as visual feedback (see FIG. 18). Additionally, at the time of establishing the link, the data/file that is the entity of each of the digital objects will be transferred appropriately in the background of user operation on the table.

For instance, if a digital object describing a piece of information relating to a particular article of the pamphlet is buried in the site on the page where the article is printed, the information can be accessed easily and quickly whenever the pamphlet is read after that time. A three-dimensional model of a marketed item may be buried in the site where the mode number and a photograph of the item are printed.

Figure 19:
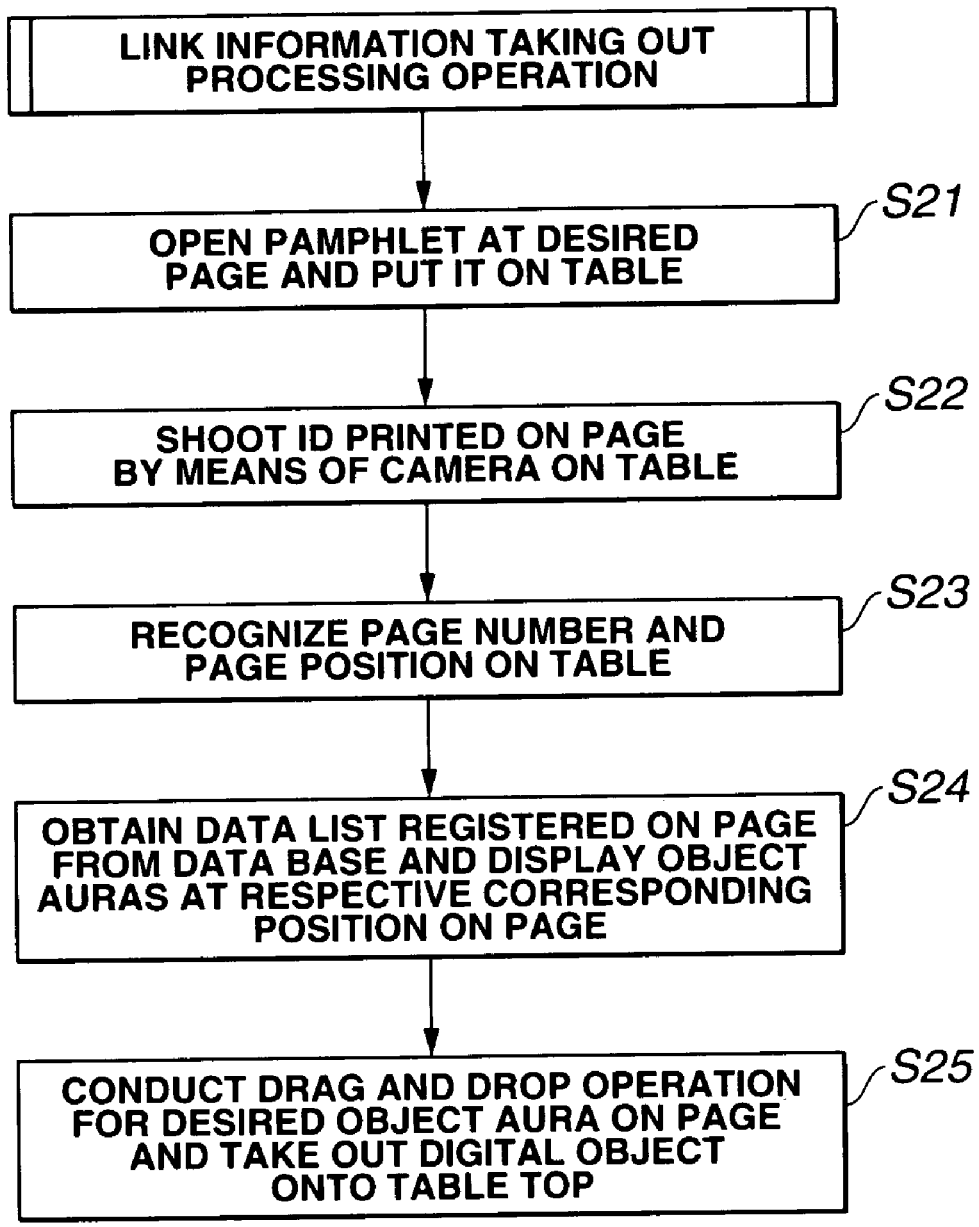
FIG. 19 is a flow chart of the processing operation for taking out link information buried on the surface of a physical object to the real world.

FIG. 19 is a flow chart of the processing operation for taking out link information buried on the surface of a physical object to the real world (so as to be linked and referred to in the real world). Assume that, as described above, the physical object is a pamphlet and link information is formed on a predetermined page of the pamphlet. Now the steps of the processing operation will be discussed by referring to the flow chart.

Firstly, the pamphlet is opened at a desired page and placed on the table (Step S21).

Assume that a page identifier or a visual marker showing a page number is attached to each of the pages of the pamphlet. Therefore, as the cameras 18/19 arranged above the tape 11 shoot the opened page (Step S22) and the image processing server 20 recognizes the visual marker, the page number of the exposed page can be identified (Step S23).

As a result of recognizing the page number, the page is installed in the information space 1. Therefore, an object aura surrounding the page is projected and displayed.

Also assume that the link information that is the data entry including the name of the linked digital object (e.g., the identifier of the object), the page identifier (or the page number) and the coordinates of the spot where the link information is buried is already registered in several data bases. In such a case, at any spot on the page where the link information is buried, the object aura is projected and displayed as visual feedback (Step S24) (see FIG. 18).

Figure 20:
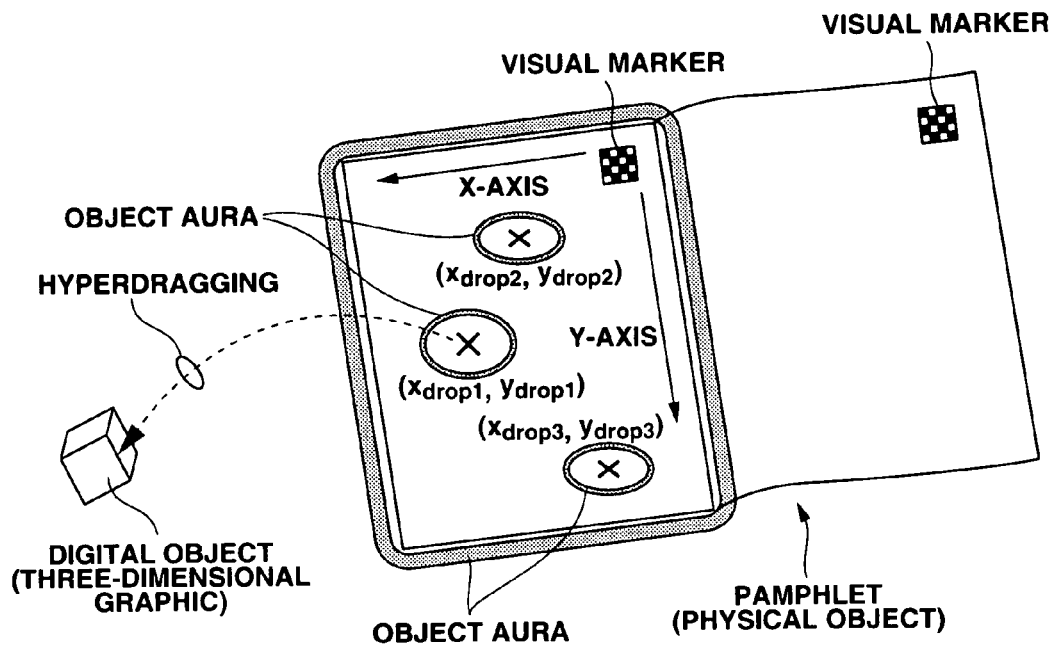
FIG. 20 is a schematic illustration of the processing operation for taking out link information buried on the surface of a physical object to the real world, where a drag-and-drop operation is applied to the object aura on a pamphlet and the link information in the form of a digital object is drawn out onto a table 11.

Then, the user can take out any desired digital object on the page as link information onto the table 11 (project and display it by means of the LCD projector 13 to be more accurate) and see the link information by applying the technique of drag-and-drop to the digital object (Step S25) (see FIG. 20). Additionally, at the time of referring to the link, the data/file that is the entity of each of the digital objects will be transferred appropriately in the background of user operation on the table.

For instance, if a digital object describing a piece of information relating to a particular article of the pamphlet is buried in the site on the page where the article is printed, the information can be accessed easily and quickly whenever the pamphlet is read after that time. If a three-dimensional model of a marketed item is buried as link information in the site where the mode number and a photograph of the item are printed, a realistic three-dimensional graphic of the item can be projected onto the expanded disk top display such as the table 11 or the wall 12 by way of an intuitive operation of directly dragging-and-dropping the photograph of the item that is printed on the page. Therefore, the user can refer to the digital object from a predetermined site on the physical object as if he or she were drawing out the linked page from the anchor on the image of a web page.

It is also possible to handle a physical object such as a pamphlet as hypermedia by burying the link information to a digital object into the surface of the physical object. Thus, the user can feel as if the information were actually buried in a predetermined site on the page and take out the information at any time he or she wants.

3-3. Dragging-and-dropping a Digital Object in the Real World

In the information space 1 of this embodiment, it is possible to drag-and-drop a digital object in the real world as a result of that a digital space in a computer can be deeply fused to the real world.

A digital object can be dragged-and-dropped in the real world typically by means of the technique of "hyperdraging" [3] (as described earlier).

However, another example of drag-and-drop technique will be described below. With this technique, by indicating a specific object (source object) in the real world and throwing it to a desired object (destination object), a processing operation suggested by the destination object can be applied to the source object.

For instance, as a source object that may be a physical document is indicated and thrown to a destination object that may be a printer, an operation of printing the document starts. In the case of the disk top display screen of an ordinary computer, it is possible to issue a job of printing a document file by dragging-and-dropping the document file icon onto the printer icon. Thus, a metaphoric feature similar to a GUI operation can be provided to the real world.

A moving image can be reproduced on a destination object comprising a device for reproducing a moving image such as a television monitor by indicating a physical object such as a VCR tape cartridge storing moving images as source object and throwing it to the destination object. In the case of the disk top display screen of an ordinary computer, it is possible to issue a job of reproducing a moving image by dragging-and-dropping the moving image file icon onto the viewer icon. Thus, a metaphoric feature similar to a GUI operation can be provided to the real world.

Figure 21:
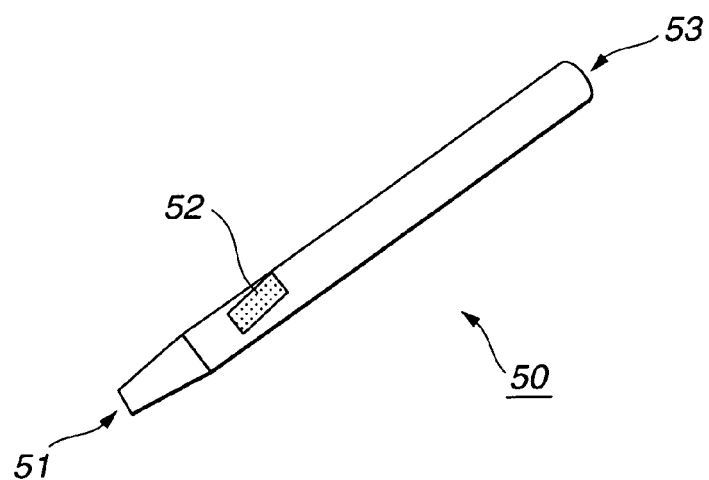
FIG. 21 is a schematic illustration of an ID recognition device 50, showing its appearance.

A handy type ID (visual marker) recognition device 50 as shown in FIG. 21 is installed for the purpose of indicating objects that are found in a dispersed fashion in the real world.

The ID recognition device 50 is preferably small and lightweight so that it can be operated by the user with a single hand. The ID recognition device 50 is provided at the front end thereof with a reading section 51 for reading visual identification information that may be represented by a visual marker. An operation button 52 for urging the user to record the recognized contents of the identification information is arranged on the lateral surface. It may be safe to understand that the button 52 is like the left button of the mouse of a personal computer. Additionally, a wireless data transmitter 53 typically using a radio wave or an infrared beam is arranged at the rear end of the ID recognition device 50.

The recognition system of the ID recognition device 50 may comprise non-limitatively a CCD (charge coupled device), a camera, a bar code reader or an RFTAG reader. The ID recognition device 50 is connected to the environment type computer by way of a wireless LAN or some other telecommunication means so that the outcome of the recognition and the user operation are transferred to the environment type computer.

Figure 22:
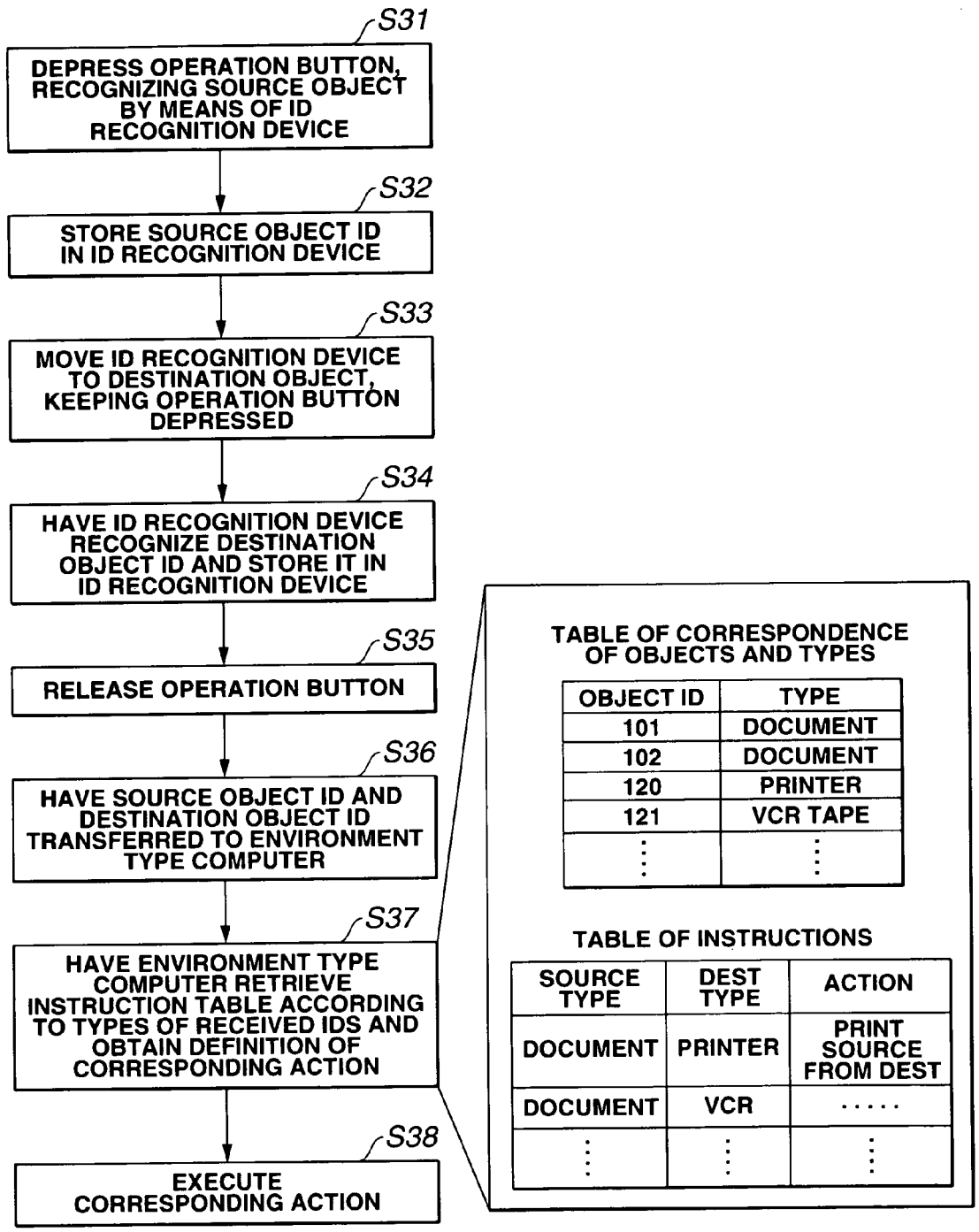
FIG. 22 is a flow chart of the processing operation for dragging-and-dropping an object in the real world by using the ID recognition device 50 of FIG. 21.

FIG. 22 is a flow chart of the processing operation for dragging-and-dropping an object in the real world by using the ID recognition device 50. Now, the processing operation will be described by referring to the flow chart.

Firstly, the user directs the reading section 51 of the ID recognition device 50 to the visual marker of the source object and depresses the operation button 52 (Step S31).

Figure 53:
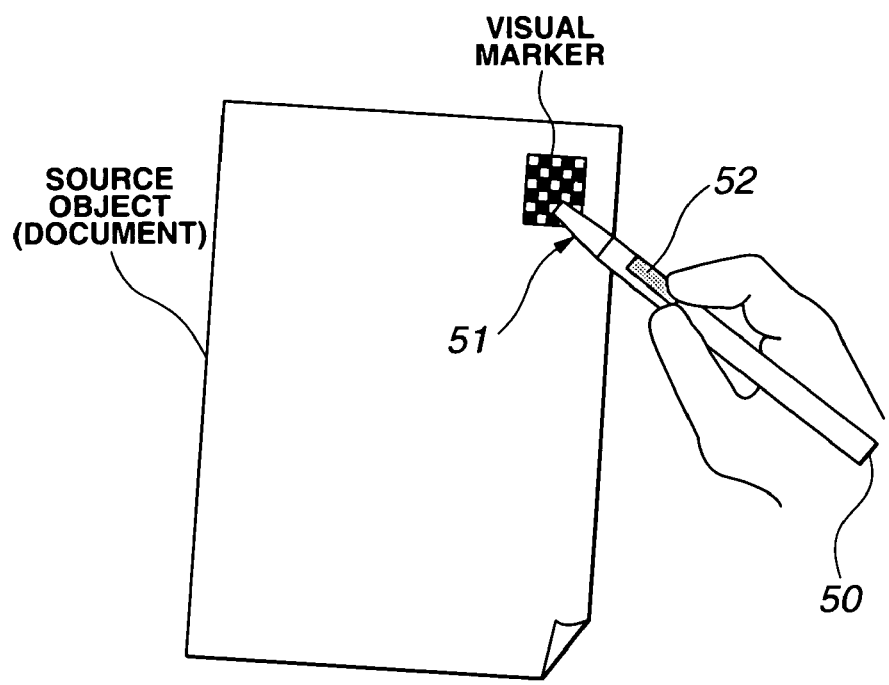
FIG. 53 is a schematic illustration of an operation of reading the visual marker attached to a document to be used as source object by means of an ID recognition device 50.

The ID recognition device ID recognition device 50 shoots the visual marker of the source object, recognizes and identifies the identification information of the source object and stores the obtained information (Step S32). FIG. 53 illustrates how the user reads the visual marker attached to a source object that is a document by means of an ID recognition device 50.

Then, the user directs the reading section 51 to the visual marker of the destination object, keeping the operation button 52 in the depressed state (Step S33).

Figure 54:
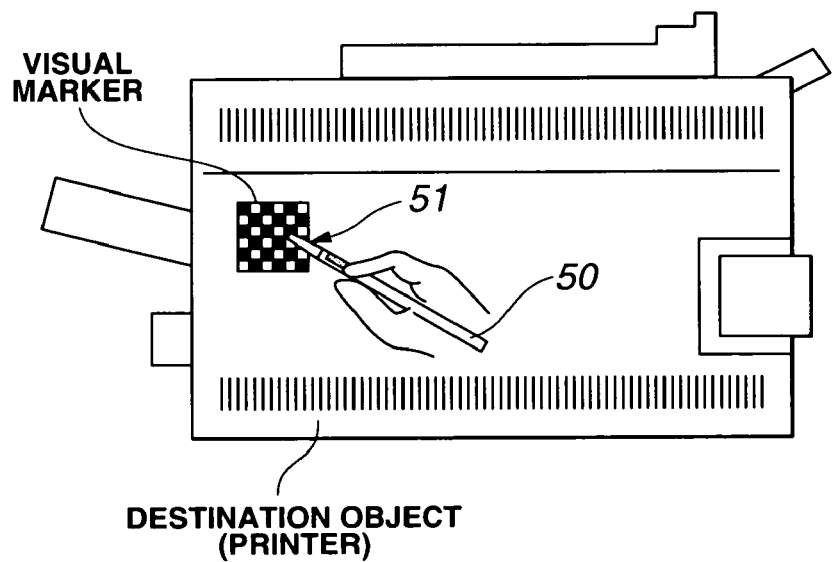
FIG. 54 is a schematic illustration of an operation of reading the visual marker attached to a printer to be used as destination object by means of an ID recognition device 50.

The ID recognition device 50 shoots the visual marker of the destination object, recognizes and identifies the identification information of the destination object and stores the obtained information (Step S34). FIG. 54 illustrates how the user reads the visual marker attached to a destination object that is a printer by means of an ID recognition device 50.

Thereafter, as the user releases the operation button 52 (Step S35), the ID recognition device 50 transfers both the identification information of the source object and that of the destination object it stores to the environment type computer arranged in the information space 1 (Step S36).

The environment type computer is provided with an object-type correspondence table and an instruction table as shown below in order to determine the processing operation that the user intends to execute on the basis of the ID information it receives.

TABLE 1

| object ID | type |
|---|---|
| 101 | document |
| 102 | document |
| 120 | printer |
| 121 | VCR tape |
| . | . |
| . | . |
| . | . |

As shown in Table 1 above, the object-type correspondence table is a table describing the correspondence of each object and its specific type. The left column shows identification information of objects and the right column shows the corresponding types. In the instance of the above table, the objects with identifiers 101 and 102 are both of the document type and the object with identifier 120 is of the printer type.

TABLE 2

| Source Type | Destination Type | Action |
|---|---|---|
| document | printer | Print source from destination. |
| document | VCR | — |
| . | . | . |
| . | . | . |
| . | . | . |

As shown in Table 2 above, the instruction table is a table describing the instructions (to be issued to the destination objects) for the respective actions to be taken depending on the combination of the type of source object and that of destination object. In the instance of the above table, if the type of source object and that of destination object are document and printer respectively, the corresponding action will be "Print source from destination".

Thus, the environment type computer retrieves the ID of the source object and that of the destination object it receives from the object-type correspondence table and identifies the their types. Then, it searches the instruction table and obtain the definition of the act corresponding to the combination of the types (Step S37).

Then, the environment type computer causes the corresponding action to be executed (Step S38).

In short, with the processing procedure of FIG. 22, a virtual drag-and-drop operation can be extended into the real world and applied to a physical object that is a real object existing in the real world. In other words, the above processing procedure makes it possible to provide a metaphoric feature similar to an intuitive GUI operation on the desktop display to the real world.

3-4. Virtual Camera

A "camera" in the real world can generate an image of a physical object existing in the real world.

In the information space 1 of this embodiment, both physical objects that exists in the real world and virtual digital objects (that exist only in a digital space of a computer) are made to coexist in the real world. While a camera in the real world can shoot a physical object, it cannot shoot a digital object.

Therefore, in the embodiment, there is introduced the concept of a "virtual camera" that can shoot a digital object that has jumped out into the real world by means of a direct and interactive technique such as "hyperdragging". A virtual camera can "shoot" a digital object laid on the table 11 from any position and in any direction to provide a three-dimensional scene taken from that position and in that angle.

Figure 23:
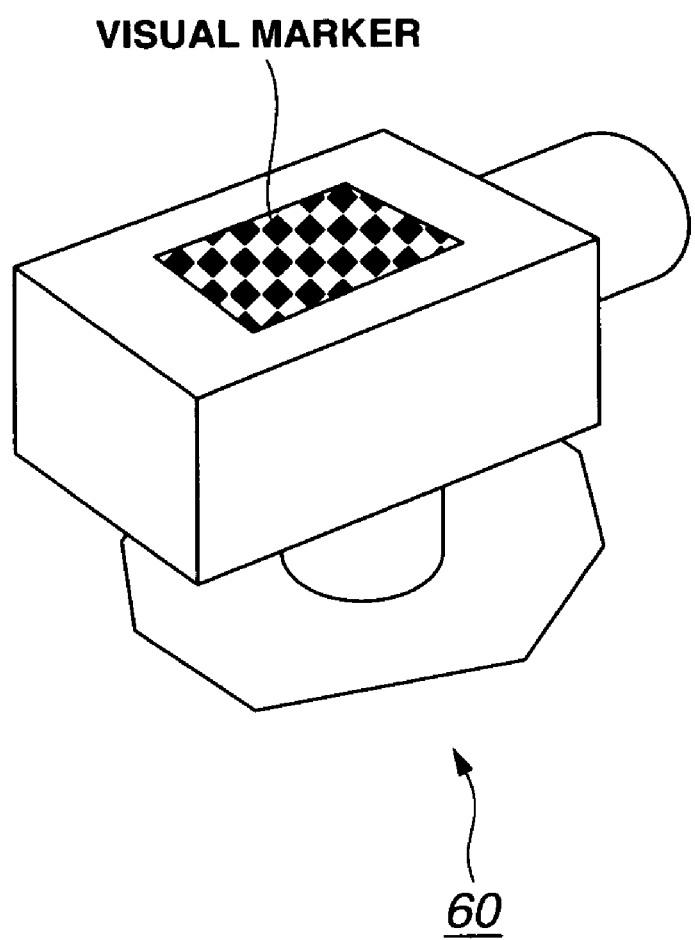
FIG. 23 is a schematic illustration of a model camera 60, showing its appearance.

A virtual camera is not required to have the ability of actually photographing an object and it is sufficient for a virtual camera to be a physical object that is installed in the information space 1 as virtual camera. FIG. 23 shows the appearance of a virtual camera 60. In the instance of FIG. 23, it is a "model camera" having a profile similar to that of a real camera so that it may visually provide a metaphor of photographing. The model camera 60 is provided with a visual marker attached to the top surface thereof so that it may be installed in the information space 1. The model camera 60 has a cylindrical projection mimicking a camera lens unit at the front end. Since the visual marker provides information on the position and the orientation of the object in addition to the identification information thereof (as described earlier), the environment type computer can identify the direction of the camera lens and hence the shooting direction when installing the model camera 60.

Figure 24:
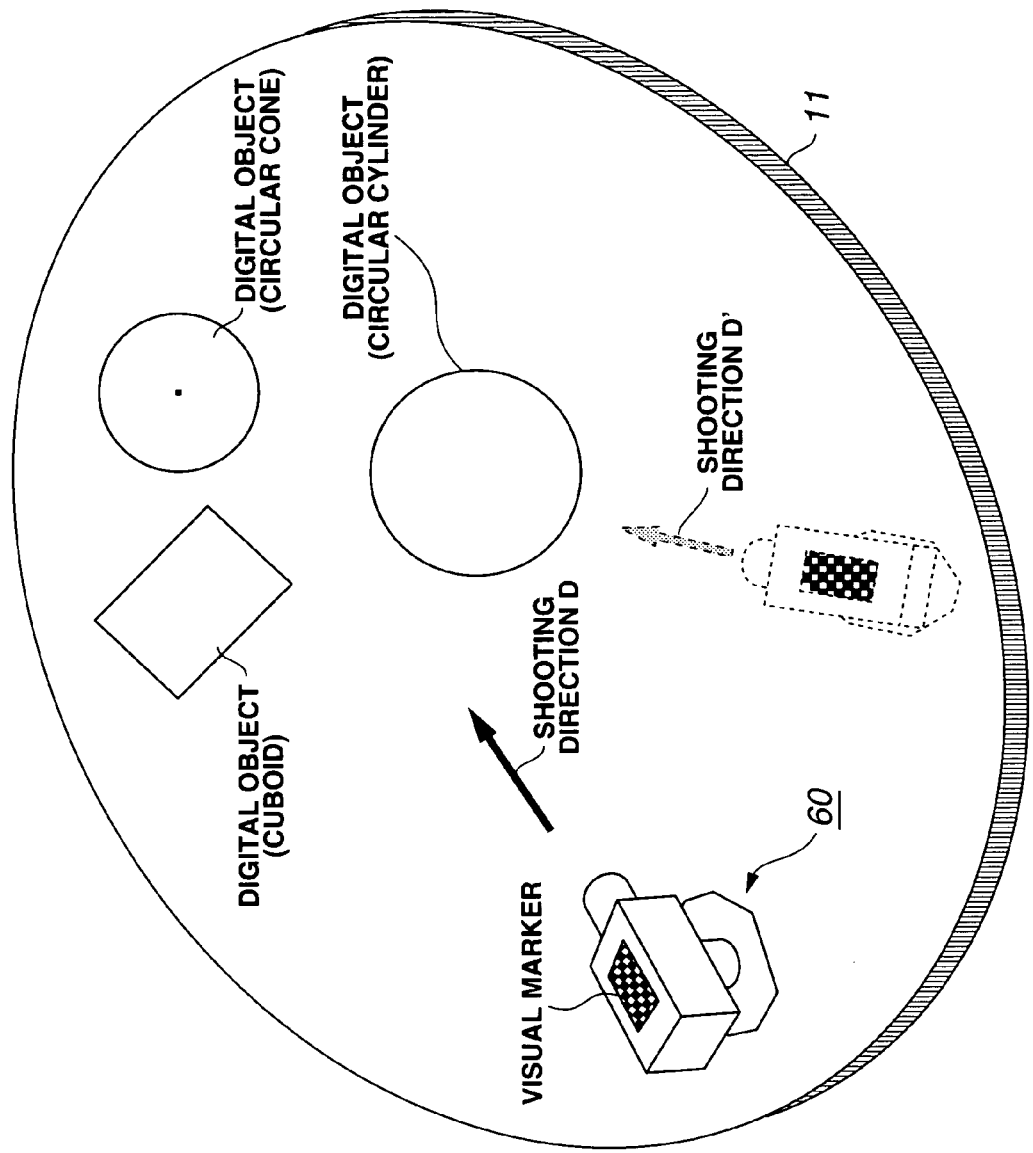
FIG. 24 is a schematic illustration of the model camera 60 of FIG. 23 that is "shooting" a digital object laid on a table 11 from a predetermined position and in a predetermined direction.

FIG. 24 is a schematic illustration of the model camera 60 that is "shooting" a digital object laid on the table 11 from a predetermined position and in a predetermined direction.

In the illustrated instance, a various digital objects having a three-dimensional profile such as circular cylinder, cube and cone are arranged dispersedly on the table 11 that also carries the model camera 60 thereon. The LCD projector 13 (not shown in FIG. 24) projects and displays plan views of these digital objects on the table 11.

As the model camera 60 is placed on the table 11, the cameras 18/19 shoot it. The environment type computer recognizes that the placed physical object is a model camera 60 on the basis of the visual marker attached to the model camera 60 (and hence the model camera 60 is installed in the information space 1). Additionally, the environment type computer identifies that the shooting direction of the model camera 60 is the direction of arrow D on the basis of the on the information on the position and the direction that the visual marker shows.

The environment type computer grasps the information of all the objects arranged in the information space 1. In other words, it controls the information (image information) on the displayed position and the three-dimensional profile of each digital object currently found on the table 11.

Figure 25:
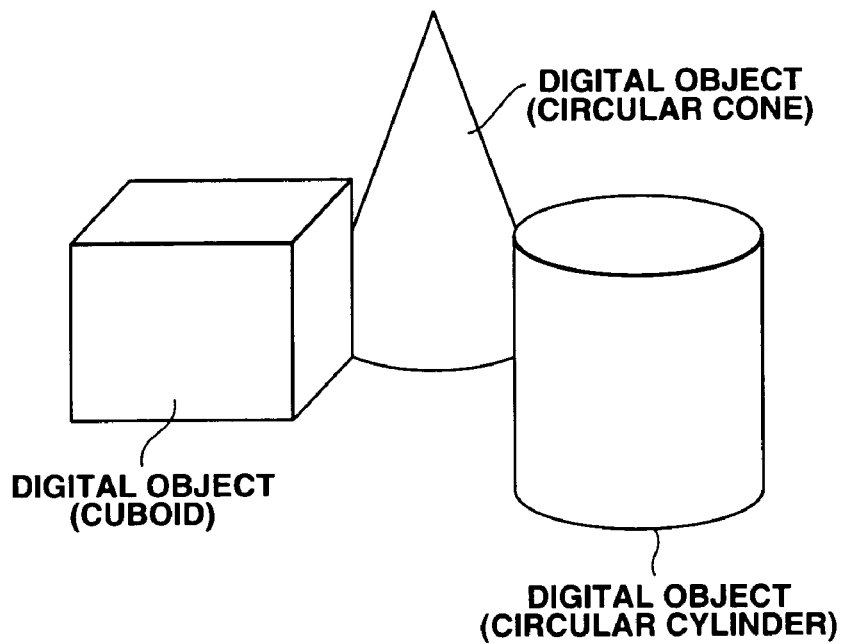
FIG. 25 is a schematic illustration of the image taken by the model camera 60 of FIG. 23 in shooting direction D, said image being generated as a three-dimensional computer graphic image.

Upon recognizing the position and the shooting direction D of the model camera 60, the environment type computer generates an image of the digital objects that will be obtained if they are shot from that position and in that direction by using the recognized information as viewing information and by way of a processing operation for three-dimensional computer graphics. In the instance of FIG. 24, a three-dimensional image as shown in FIG. 25 will be obtained.

The obtained three-dimensional scene can be projected and displayed on a desired place such as the top surface of the table 11 or the surface of the wall 12 by means of the LCD projector 14, for example. Additionally, the information on the obtained image can be transferred to some other computer (e.g., a user computer) by way of the network 15 so that the three-dimensional scene may be displayed on the display screen of the computer.

Figure 26:
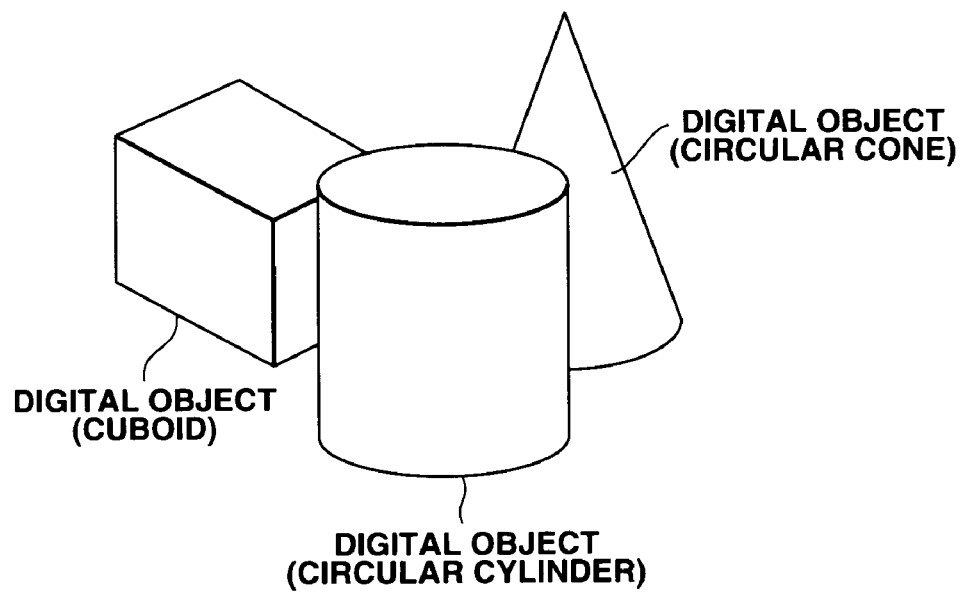
FIG. 26 is a schematic illustration of the image taken by the model camera 60 of FIG. 23 in shooting direction D', said image being generated as a three-dimensional computer graphic image.

If the model camera 60 is moved to the position as indicated by broken lines in FIG. 24, the cameras 18/19 once again shoot it and the model camera 60 is reinstalled at the new position in the information space 1. The environment type camera recognizes the shooting direction D' of the model camera 60 at the new position and generates a new three-dimensional scene as shown in FIG. 26 by using the obtained information as viewing information. The obtained three-dimensional scene can be projected and displayed on a desired place such as the top surface of the table 11 or the surface of the wall 12 and additionally on the display screen of the computer of a user.

Figure 27:
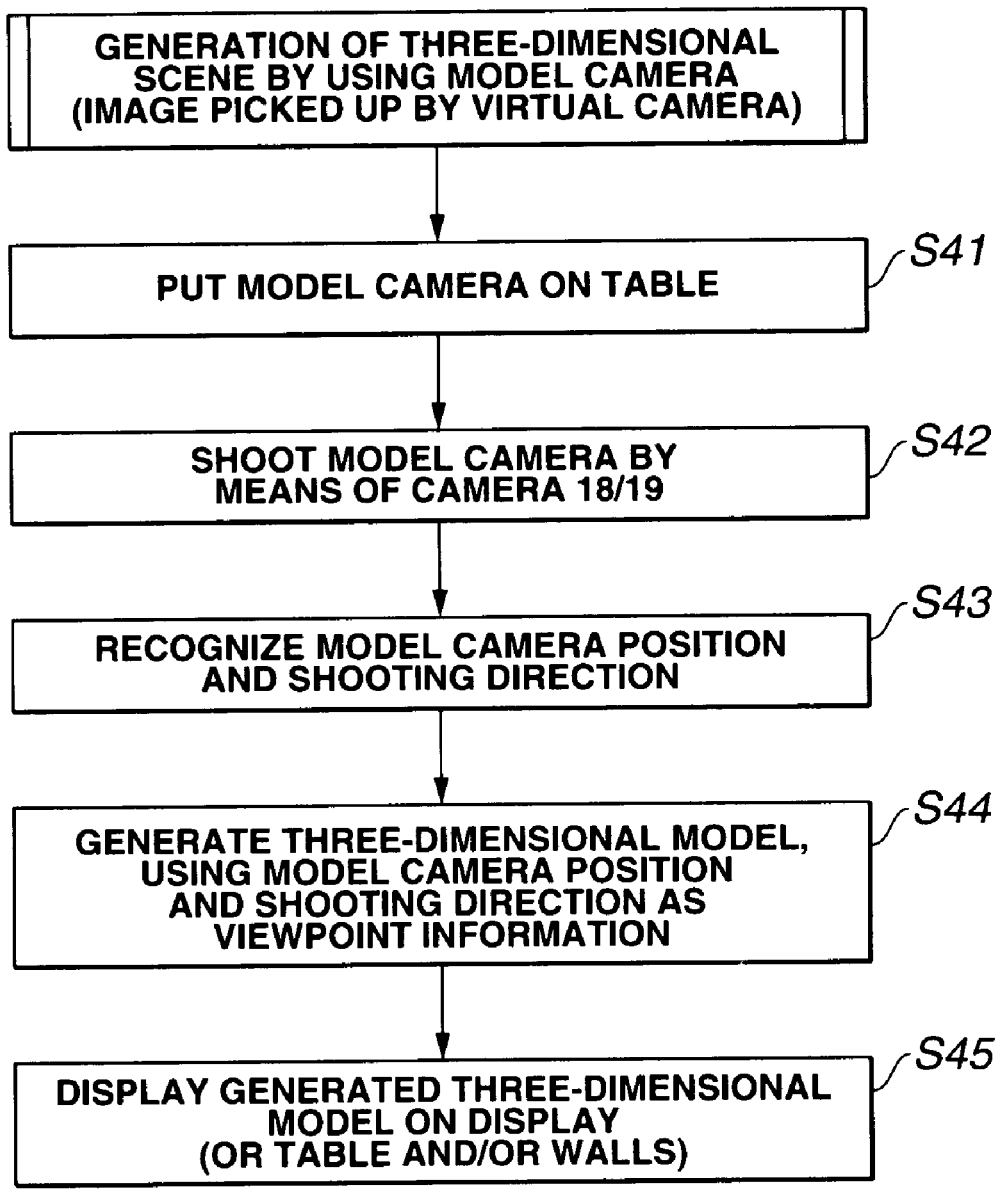
FIG. 27 is a flow chart of the processing operation for imaging by means of a virtual camera.

FIG. 27 is a flow chart of the processing operation for imaging by means of a virtual camera. Now, the processing operation will be described by referring to the flow chart.

Firstly, as the model camera 60 is placed on the table 11 (Step S41), the cameras 18/19 shoot it (Step S42).

The environment type computer recognizes that the placed physical object is a model camera 60 on the basis of the visual marker attached to the model camera 60 (and hence the model camera 60 is installed in the information space 1) (Step S43). Additionally, the environment type computer identifies that the shooting direction of the model camera 60 is the direction of arrow D on the basis of the on the information on the position and the direction that the visual marker shows.

Upon recognizing the position and the shooting direction D of the model camera 60, the environment type computer generates an image of the digital objects that will be obtained if they are shot from that position and in that direction by using the recognized information as viewing information and by way of a processing operation for three-dimensional computer graphics (Step S44).

The obtained three-dimensional scene can be projected and displayed on a desired place such as the top surface of the table 11 or the surface of the wall 12 by means of the LCD projector 14, for example (Step S44). Additionally, the information on the obtained image can be transferred to some other computer (e.g., a user computer) by way of the network 15 so that the three-dimensional scene may be displayed on the display screen of the computer.

3-5. Transfer of a Digital Object Using a Laser Pointer

The mouse/cursor of each user computer can be used as means for indicating the coordinates of a digital object for the purpose of "hyperdragging" or manipulating the digital object in the real world (as described earlier). User input devices referred to as "mouses" are very popular in the computer industry. They are highly effective for indicating the coordinates of any digital object and many computer users are well accustomed to use it. However, since mouses are designed for manipulating an object on the native display screen of the computer, there may be occasions where it is not appropriate for them to move the cursor into a large work space expanded into the real world and indicate a remote object.

Taking the above into consideration, in the embodiment, a laser pointer is used as device for manipulating an object in the real world. A laser pointer is an indicator device originally designed so as to make a lecturer indicate a remote object with ease typically in a lecture room or a conference room.

The inventors of the present invention call the interactive technique of dragging-and-dropping an object in the real world by using a laser pointer as "Pick-and-Beam". A clicking operation for pick-and-beam can be expressed typically by quickly and repeatedly turning on and of the laser.

Figure 28:
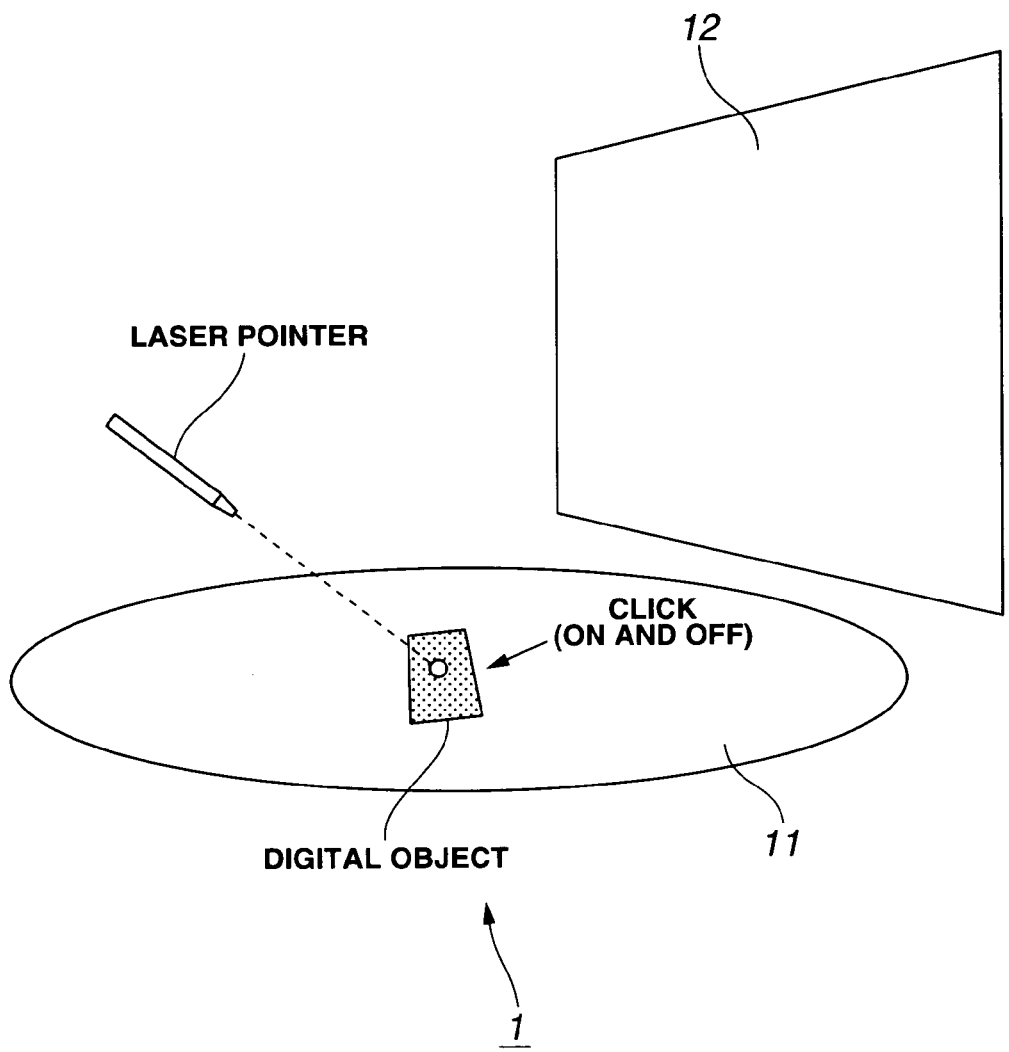
FIG. 28 is a schematic illustration of an operation of handling a digital object in the real world by means of a laser pointer, where the digital object projected and displayed on a table 11 is picked up by the laser pointer.
Figure 29:
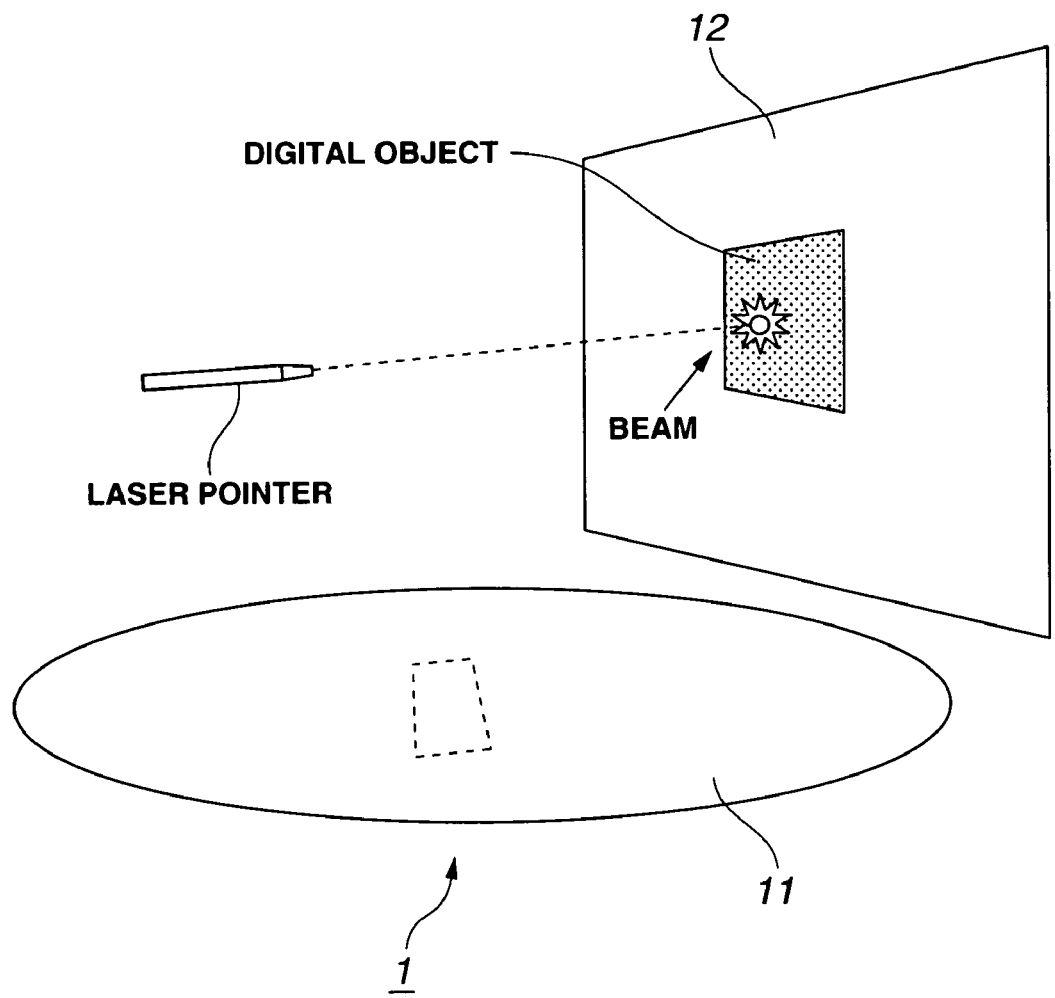
FIG. 29 is a schematic illustration of an operation of handling a digital object in the real world by means of a laser pointer, where the digital object is picked up and moved (beamed) onto a wall surface 12.

For example, the user can move a desired digital object projected and displayed on the table 11 to the wall 12 by clicking the digital object by means of a laser pointer (see FIG. 28) and then indicating the wall 12 also by means of the laser printer (see FIG. 29). Although not illustrated, it may be needless to say that it is also possible to move the object from the wall 12 to the table 11.

In other words, the user will feel as if he of she "picks" up the digital object from the table 11 and beams the wall 12 by means of a device called laser pointer.

As described earlier, "pick-and-drop"[2] is an interactive technique with which the user moves information or an object within his or her reach by means of a pen. On the other hand, with "pick-and-beam", the user can easily move an object to a place remote from him or her.

With an operation of pick-and-beam, it is necessary to recognize the beam spot produced by the laser pointer in addition to physical objects and digital objects existing in the real world. Therefore, one ore more than one cameras 41A, 41B, . . . equipped with respective red filters are installed in the information space 1 of this embodiment in addition to the fixed camera 18 and the tilting/panning camera 19 (as described earlier). The red filters used by the cameras 41 are typically so designed as to transmit only output light with a wavelength range close to that of a "laser pointer" provided for presentation purposes.

Figure 30:
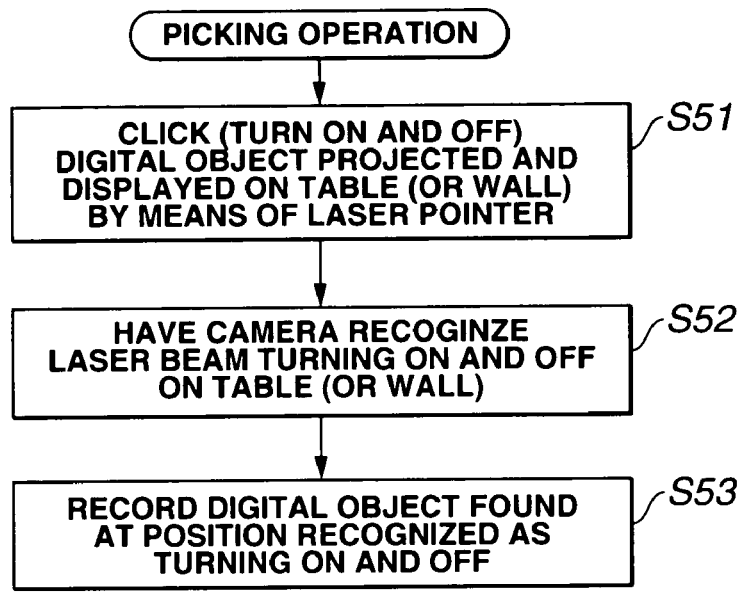
FIG. 30 is a flow chart of the processing operation for picking an object in the real world by means of a laser pointer in a pick-and-beam operation for dragging-and-dropping the object.

FIG. 30 is a flow chart of the processing operation for picking an object in the real world by means of a laser pointer in a pick-and-beam operation for dragging-and-dropping the object. Now, the operation will be described by referring to the flow chart.

Firstly, the intended digital object that exists in the real world and is projected and displayed on the table or the wall 12 is irradiated by the beam of the laser pointer and the latter is turned on and off frequently (Step S51).

The environment type computer recognizes the flashing laser beam on the table or the wall 12 on the basis of the images taken by the cameras 41 equipped with the respective red filters (Step S52) (see FIG. 28).

The environment type computer interprets the flashing laser beam as an operation of clicking the digital object and records the digital object (Step S53). Additionally, at the time of recording the digital object, if necessary, the data/file that is the entity of the digital object will be transferred appropriately from the computer to another computer in the background.

Figure 31:
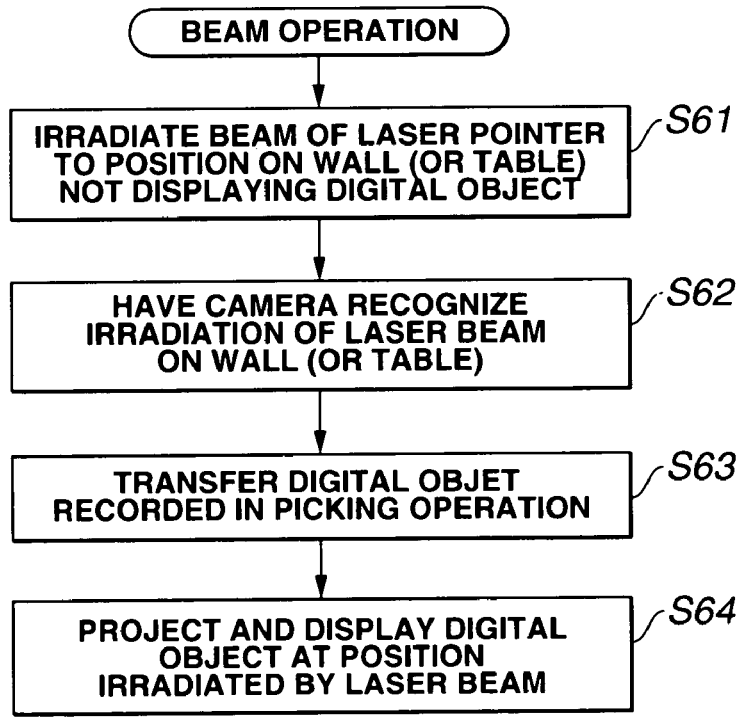
FIG. 31 is a flow chart of the processing operation for beaming an object in the real world by means of a laser pointer in a pick-and-beam operation for dragging-and-dropping the object.

FIG. 31 is a flow chart of the processing operation for beaming the object in the real world by means of the laser pointer in the pick-and-beam operation for dragging-and-dropping the object. Now, the operation will be described by referring to the flow chart.

Firstly, the beam of the laser pointer is made to irradiate a spot on the wall 12 or the table where the digital object is not located or not projected nor displayed in the real world (Step S61).

Then, the cameras 41 provided with red filters recognize the spot on the table 11 or the wall 12 lighted by the laser beam (Step S62).

The environment type computer interprets the flashing laser beam that is lighting a spot where the digital object is not found as an operation of moving or dropping the digital object. Then, it transfers the digital object that is recorded in advance in it during the picking operation to the computer system 16 or 17 that controls the display operation of the LCD projector 13 or 14, whichever appropriate, by way of the network (Step S63).

Upon receiving the digital object, the computer system 16 or 17 projects and displays the digital object to the spot lighted by the laser beam (Step S64) (see FIG. 29).

Figure 32:
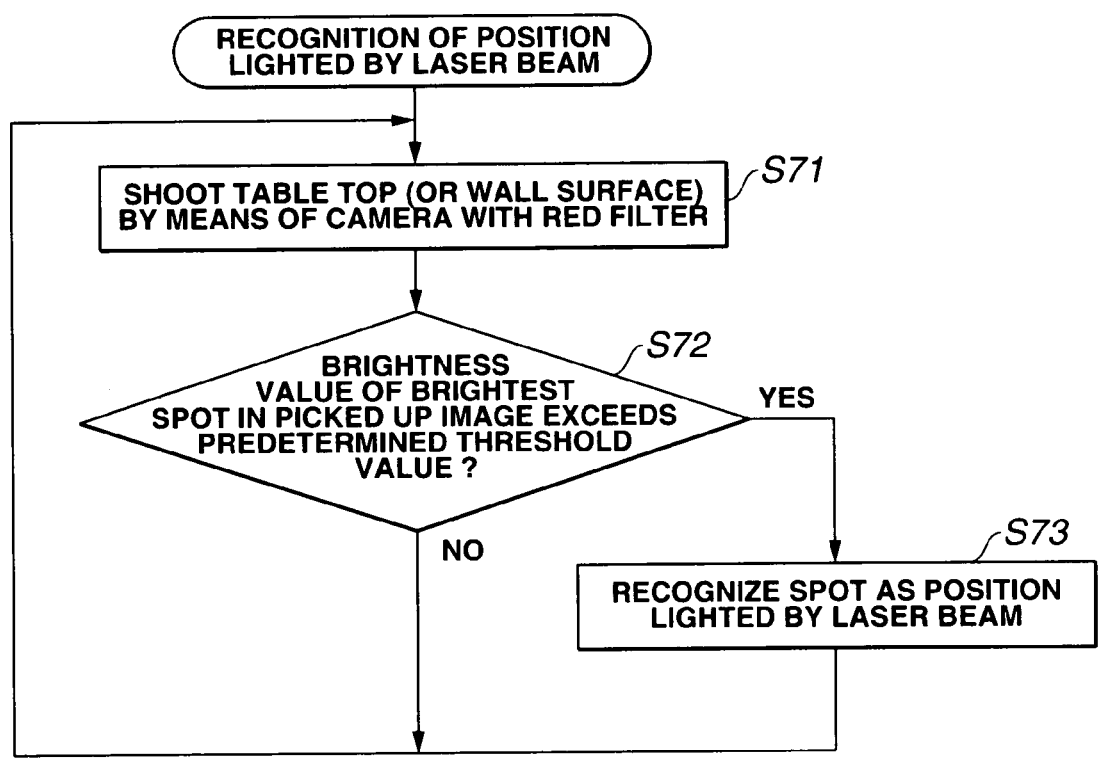
FIG. 32 is a flow chart of the processing operation for recognizing the position indicated by a laser pointer, which is the lighting position of the laser beam.

FIG. 32 is a flow chart of the processing operation for recognizing the position indicated by the laser pointer, which is the lighting position of the laser pointer. Now, the operation will be described by referring to the flow chart.

The cameras 41 provided with the red filters are shooting the real world including the table 11 and the wall 12 (Step S71). The cameras 41 provided with the red filters supply images taken by using light with a wavelength range close to that of output light of the laser pointer.

During the shooting operation of the cameras 41 provided with the red filters, it is determined if the brightness value of the brightest point of the picked up images exceeds a predetermined threshold value or not (Step S72).

If it is found that the brightness value exceeds the threshold value, the brightest point is recognized as the spot irradiated by the laser beam (Step S73). Then, the processing operation returns to Step S71 to standby until the laser pointer is turned on next time.

If, on the other hand, it is found that brightness value of the brightest point does not exceed the threshold value during the shooting operation of the cameras 41 provided with the red filters, it is so determined that the laser pointer is not indicating anything and the processing operation returns to Step S71 to repeat the above steps.

3-6. Other Manipulative Operations to the Digital Object in the Real World

As described above, in the case of the information space 1 of this embodiment, digital objects can be manipulated in the real world as a result of that a physical real space is deeply fused with a digital space in a computer. Additionally, the concept of direct manipulation developed for GUIs (graphical user interfaces) of computers, or digital spaces, is introduced to the operation of manipulating objects in the real world.

Examples of techniques for manipulating objects in the real world based on the concept of direct manipulation other than those described above will be discussed below.

(1) Linking/Referring in the Real World Using a Laser Pointer

As described above, information for linking a digital object onto the surface of a physical object such as a printed pamphlet can be generated (see FIGS. 16 through 18) and link information can be referred to in the real world (see FIG. 20).

In the above described examples, the operation of linking/referring in the real world, which is an operation of taking out a digital object from the surface of a physical object, is carried out by hyperdragging the digital object by means of a coordinate indicating device such as a mouse with which a computer is normally provided as part of the standard specification. On the other hand, a digital object can be manipulated in the real world by means of a laser pointer (see FIGS. 28 and 29).

Figure 33:
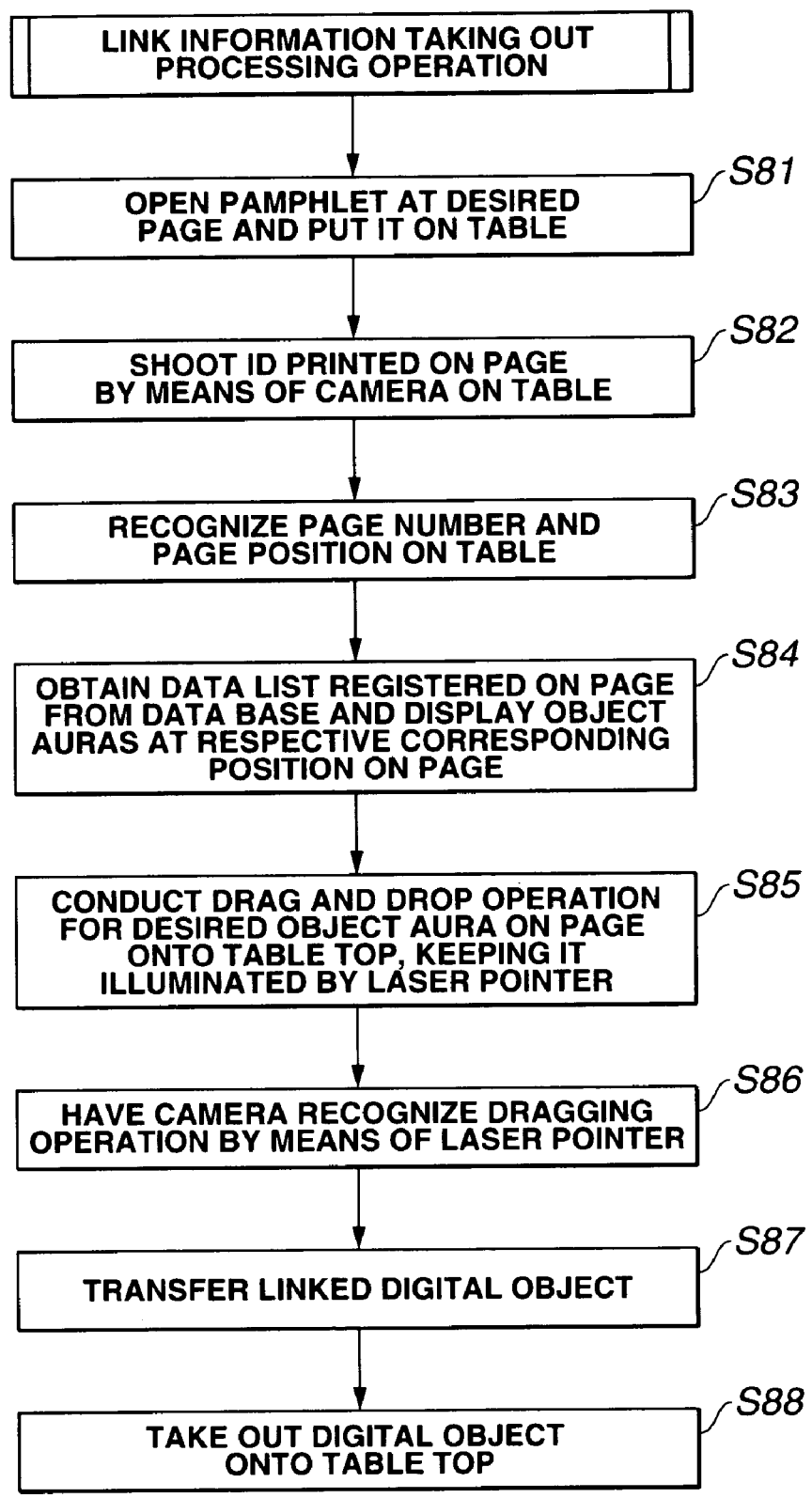
FIG. 33 is a flow chart of the processing operation for linking and referring by using a laser pointer.

The interactive technique of linking/referring using a laser pointer will be described below. FIG. 33 is a flow chart of the processing operation for linking and referring by using a laser pointer.

Firstly, a pamphlet is opened at a desired page and placed on the table 11 (Step S81).

Assume that a page identifier or a visual marker showing a page number is attached to each of the pages of the pamphlet. Therefore, as the cameras 18/19 arranged above the table 11 shoot the opened page (Step S82) and the image processing server 20 recognizes the visual marker, the page number of the exposed page can be identified (Step S83).

As a result of recognizing the page number, the page is installed in the information space 1. Therefore, an object aura surrounding the page is projected and displayed (see FIG. 16).

Also assume that the link information that is the data entry including the name of the linked digital object (e.g., the identifier of the object), the page identifier (or the page number) and the coordinates of the spot where the link information is buried is already registered in several data bases. In such a case, at any spot on the page where the link information is buried, the object aura is projected and displayed as visual feedback (Step S84) (see FIG. 18).

Figure 34:
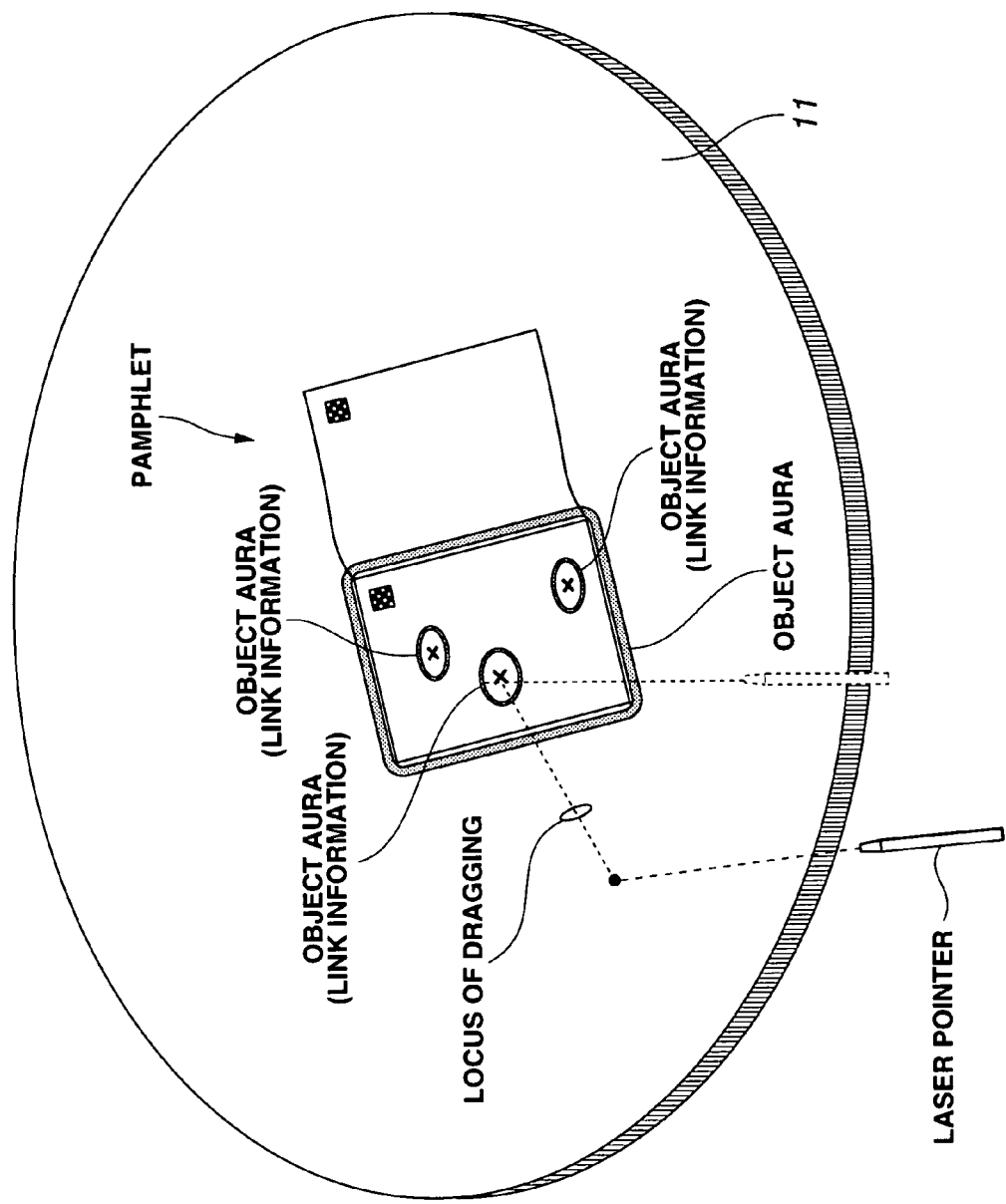
FIG. 34 is a schematic illustration of an operation of referring to the link information on the surface of a physical object by using a laser pointer, where the object aura corresponding to the desire link information on an exposed page is dragged onto a table 11 while being irradiated by the beam of light emitted from the laser pointer.

The user drags the object aura corresponding to the desired link information on the page onto the table 11, irradiating it with the output beam of the laser pointer (Step S85) (see FIG. 34).

The environment type computer recognizes the dragging operation covering the span between the page of the pamphlet and the table 11 carried out by using the laser beam on the basis of the images picked up by the cameras 41 provided with the red filters (Step S86).

Then, the environment type computer transfers the dragged digital object that corresponds to the link information to the computer system 16 controlling the display operation of the LCD projector 13 by way of the network (Step S87).

Figure 35:
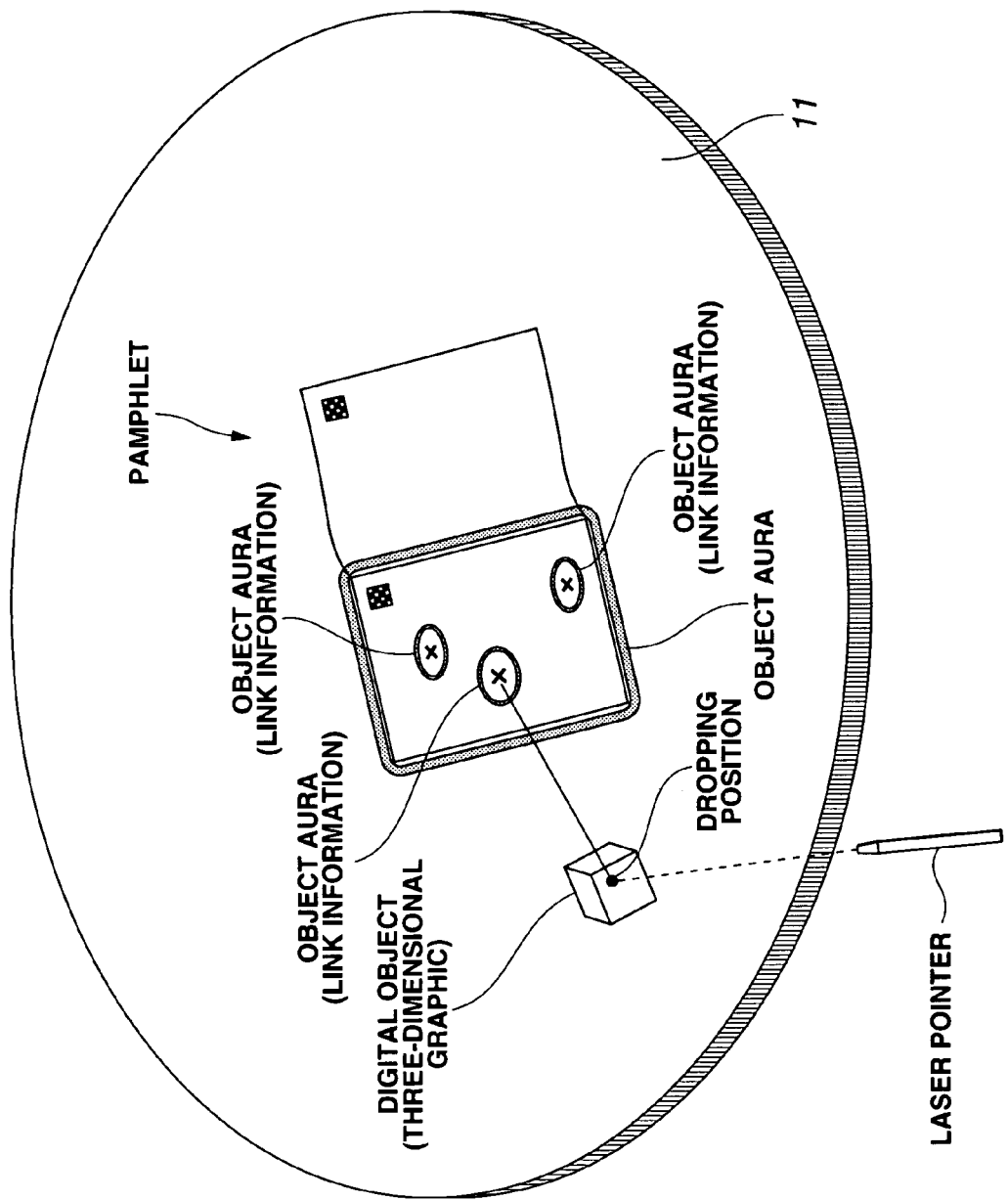
FIG. 35 is a schematic illustration of an operation of referring to the link information on the surface of a physical object by using a laser pointer, where a digital object is projected and displayed as link information at the position on a table 11 where the laser beam of the laser pointer is dropped.

Upon receiving the digital object, the computer system 16 projects and displays the digital object as link information to the place on the table where the laser beam is dropped (Step S88) (see FIG. 35).

Thus, the user can take out the digital object as link information on the table 11 (cause the LCD projector 13 to project and display it on the table 11 to be more accurate) and refer to the link information by applying the drag-and-drop technique to the desired object aura on the page by means of the laser pointer.

For instance, if a digital object describing a piece of information relating to a particular article of the pamphlet is buried in the site on the page where the article is printed, the information can be accessed easily and quickly whenever the pamphlet is read after that time. If a three-dimensional model of a marketed item is buried as link information in the site where the mode number and a photograph of the item are printed, a realistic three-dimensional graphic of the item can be projected onto the expanded disk top display such as the table 11 or the wall 12 by way of an intuitive operation of directly dragging-and-dropping the photograph of the item that is printed on the page. Therefore, the user can refer to the digital object from a predetermined site on the physical object as if he or she were drawing out the linked page from the anchor on the image of a web page.

(2) Taking Out a Three-dimensional Model from a Digital Space

As described earlier, directly interactive techniques developed for GUIs in digital spaces can be extended to real spaces in the information space 1 where digital spaces are deeply fused to spaces in the real world. For instance, it is possible to use the technique of "hyperdragging" that is realized by extending "drag-and-drop" designed for use in a computer display into the real world (see FIG. 11).

The technique of "hyperdragging" can be applied not only to three-dimensional displayed objects such as "icons" representing application programs and files but also to three-dimensional models stored in a user computer (or three-dimensional models automatically generated by operations for processing three-dimensional graphics in a computer).

Figure 36:
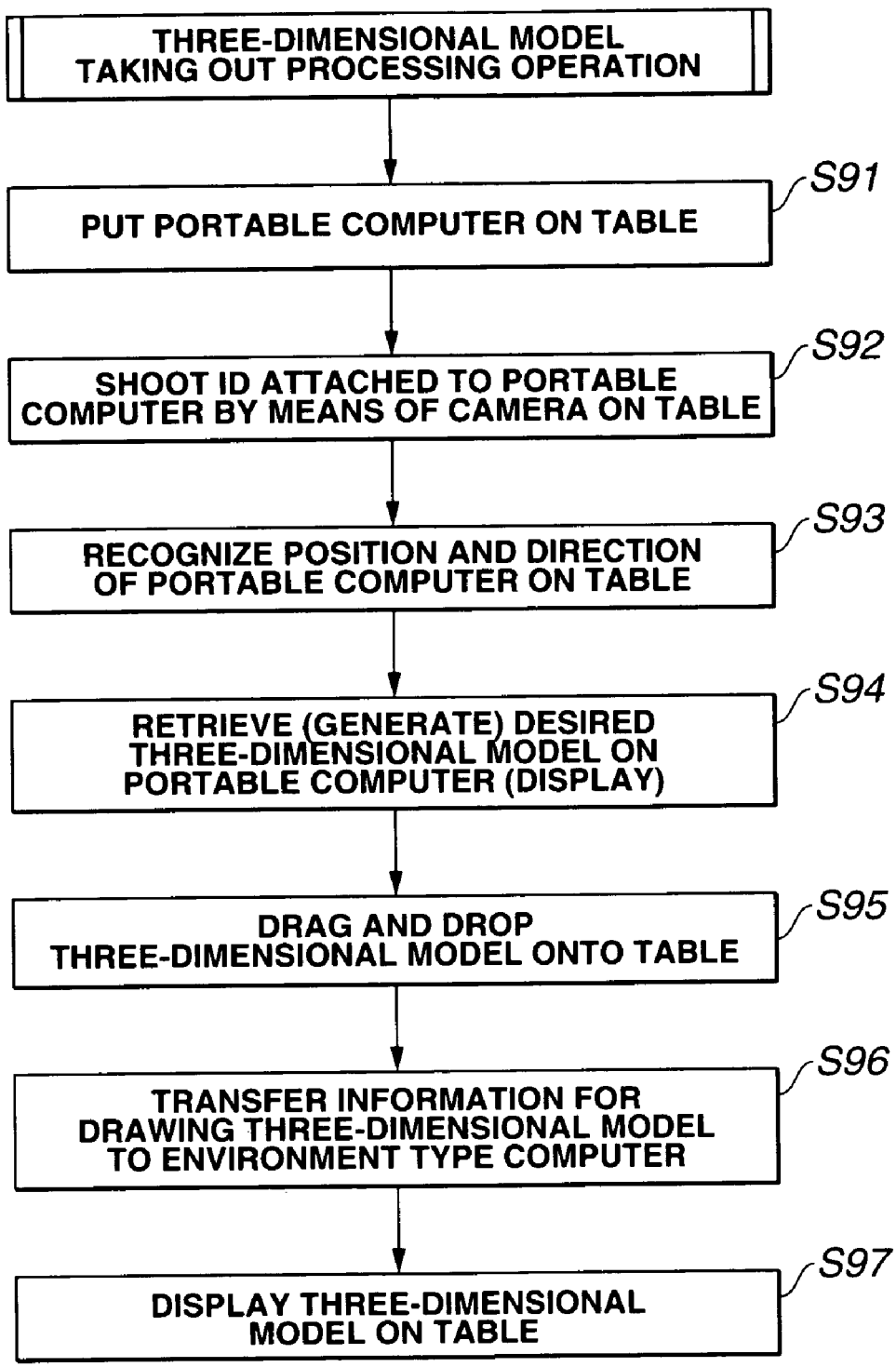
FIG. 36 is a flow chart of the processing operation for taking out a three-dimensional model existing on a user computer into the real world.

FIG. 36 is a flow chart of the processing operation for taking out a three-dimensional model existing on a user computer into the real world. The operation will be described below by referring to the flow chart.

Firstly, the user places his or her own portable computer on the table 11 (Step S91).

A visual marker displaying the identification information of the portable computer is attached to the surface of the computer. Therefore, as the cameras 18/19 arranged above the tape 11 shoot the portable computer (Step S92) and the image processing server 20 recognizes the visual marker, the portable computer can be identified (Step S93).

As a result of recognizing the portable computer, the portable computer is installed in the information space 1. In response to the installation, the object aura surrounding the portable computer may be projected and displayed.

Additionally, since a visual marker can provide not only identification information but also information on the position and the direction of the object carrying the visual marker, it is possible to establish a coordinate system using the visual marker as origin.

Then, the user retrieves a desired three-dimensional model in his or her own portable computer (Step S94). Alternatively, he or she may make the computer automatically generate a desired three-dimensional model by way of an operation for processing a computer graphic.

Then, the user drags-and-drops the detected three-dimensional model onto the table 11 by using a direct interactive technique such as hyperdragging (Step S95).

In response to the operation of dropping the three-dimensional model on the table 11, imaging information on the three-dimensional model is transferred from the portable computer to the environment type computer in the background (Step S96).

Upon receiving the imaging information, the environment type computer drives and controls the LCD projector 13 to cause the latter to project and display the three-dimensional model to the spot on the table where it is dropped (Step S97).

Figure 37:
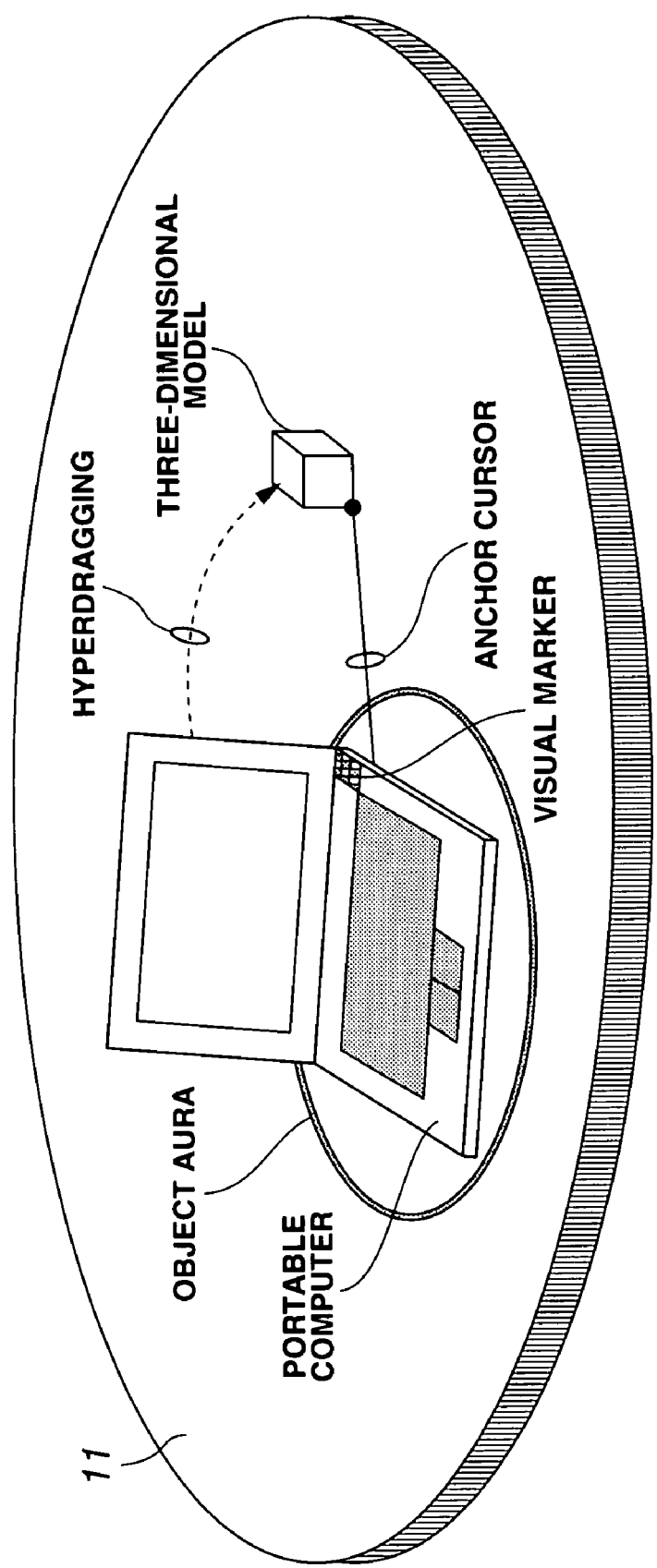
FIG. 37 is a schematic illustration of an operation of projecting and displaying a three-dimensional model taken out of a portable computer onto a table 11.

FIG. 37 is a schematic illustration of an operation of projecting and displaying a three-dimensional model taken out of a portable computer stored in (or generated by) the portable computer onto a table 11. Such an operation of taking out a three-dimensional model from a digital space into the real world can be realized by using direct interactive techniques such as "hyperdragging". The operation of taking out a three-dimensional model will be summarily described below.

(a) The user detects and selects a desired three-dimensional model on the computer display. Then, he or she drags the detected and selected three-dimensional object toward the outer periphery of the display screen by using the mouse/cursor.

(b) As the cursor gets to the outer periphery, the mouse/cursor jumps out of the computer display screen and moves onto the table 11 where the computer is placed.

(c) If the mouse/cursor keeps holding the object, the dragging operation is continued onto the table 11 (and hence the object is hyperdragged onto the table 11) and the three-dimensional model is projected and displayed on the table 11.

(d) An "anchor cursor" may be displayed between the hyperdragged three-dimensional model on the table 11 and the portable computer from which the three-dimensional model originates to visually feed back the source of the three-dimensional model.

(3) Taking Out a Digital Object Out of a Visual Marker

In the information space I of this embodiment, all the digital objects are stored in the environment type computer or the environment type computer can obtain them by data transfer using the network 15.

Additionally, in the information space 1 of this embodiment, any object can be unequivocally identified by the visual marker attached onto it (the identification information that the visual marker contains to be more accurate).

As an extension of the above described techniques, a direct interactive technique of taking out the digital object corresponding to the visual marker read by the ID recognition device 50 as shown in FIG. 21 into a digital space (or hyperdragging the digital object into a digital space) has been developed.

Figure 38:
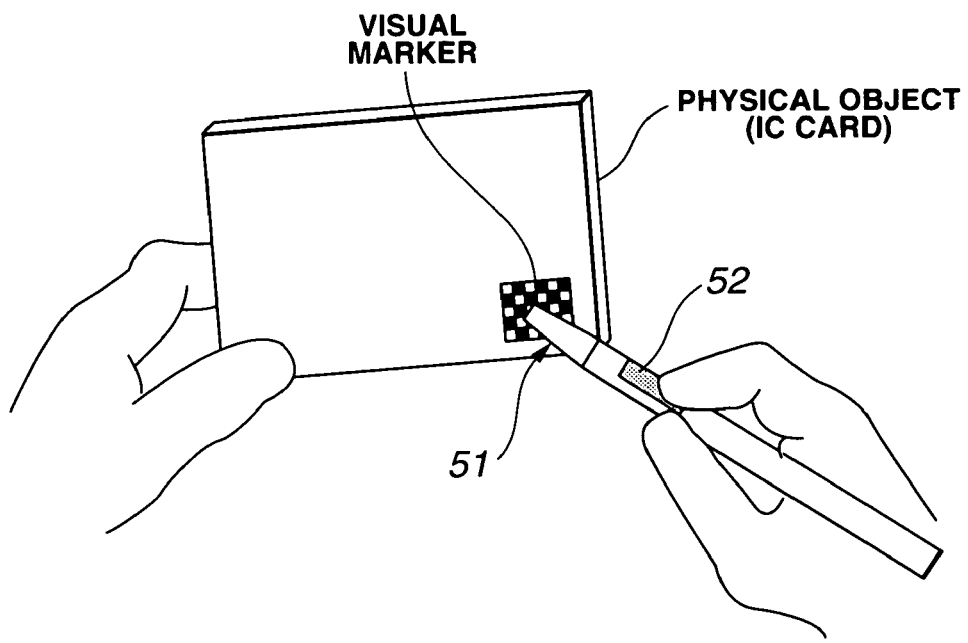
FIG. 38 is a schematic illustration of an operation of hyperdragging a digital object identified by a visual marker into a digital space, where the visual marker on a physical object is recognized by means of an ID recognition device 50.
Figure 39:
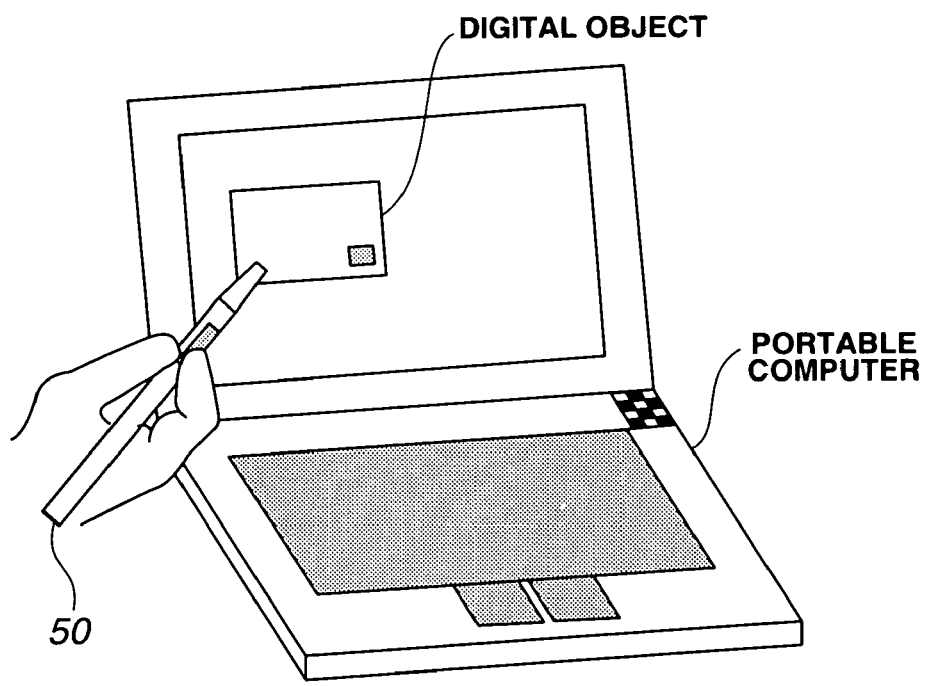
FIG. 39 is a schematic illustration of an operation of hyperdragging a digital object identified by a visual marker into a digital space, where the digital object corresponding to the identification information recognized by an ID recognition device 50 is hyperdragged onto the display screen of a portable computer.

FIGS. 38 and 39 schematically illustrates of an operation of hyperdragging a digital object identified by a visual marker into a digital space.

Firstly, as shown in FIG. 38, the user holds the pen-like ID recognition device 50 at hand and carries out an operation of reading the visual marker attached to the desired physical object, while depressing the operation button 52 and directing the front end (the reading section 51) to the physical object. While the physical object is an IC in the instance of FIG. 38, it may be needless to say that the physical object is by no means limited to an IC card.

The ID recognition device 50 shoots the visual marker and recognizes and identifies the identification information of the source object. The identification information is stored in the ID recognition device 50 as long as the optical button 52 is depressed.

Then, the user directs the front end of the ID recognition device 50 to the display screen of his or her own portable computer, keeping the operation button 52 depressed. Then, as the user releases the operation button 52, the digital object corresponding to the visual marker (or the IC card that is the original physical object) is hyperdragged onto the display screen as shown in FIG. 39. While the digital object corresponding to the IC card is an object representing a front view of the IC card in the instance of FIG. 39, it may be needless to say that the digital object is by no means limited thereto (for example, it may alternatively represent the attribute information of the IC card including the information on the owner of the IC card).

Figure 40:
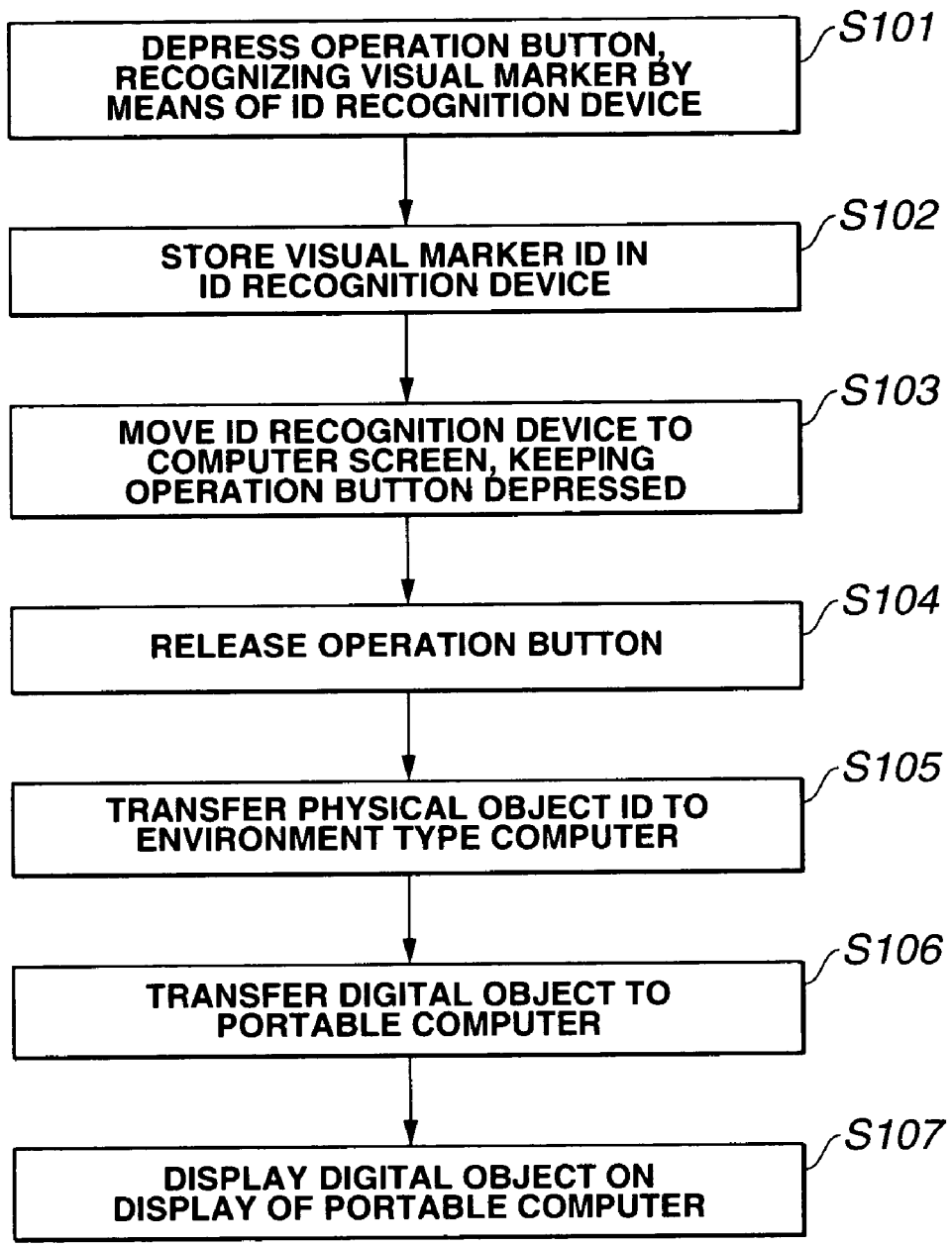
FIG. 40 is a flow chart of the processing operation for hyperdragging a digital object identified by a visual marker into a digital space.

FIG. 40 is a flow chart of the processing operation for hyperdragging a digital object identified by a visual marker into a digital space. Now, the operation will be described by referring to the flow chart.

Firstly, the user depresses the operation button 52 of the ID recognition device 50, directing the front end (the reading section 51) to the visual marker of the physical object (which is the IC card owned by the user in the instance of FIG. 38) (Step S101).

The ID recognition device 50 shoots the visual marker of the source object and recognizes and identifies the identification information (ID) of the physical object (IC card). It also stores the identification information (Step S102).

Then, the user directs the front end (the reading section 51) of the ID recognition device 50 to the surface of the display screen of the portable computer of the user, keeping the operation button 52 depressed (Step S103). It is assumed here that the portable computer of the user is already installed in the information space 1 by following the predetermined processing procedure.

As the user releases the operation button 52 (Step S104), the ID recognition device 50 transfers the identification information of the physical object (the IC card) it stores to the environment type computer arranged in the information space 1 (Step S105).

The environment type computer identifies the digital object specified by the user on the basis of the received identification information and transfers it to the portable computer of the user (Step S106).

Thus, the transferred digital object (the front view of the physical object, or the IC card, in the instance of FIG. 39) is displayed on the display screen of the portable computer (Step S107).

Thus, it will be appreciated that a direct interactive technique of hyperdragging a desired digital object from a physical object to a digital space can be realized by following the above described processing procedure.

(4) Taking an Object in the Real World into a Digital Space

Another interactive technique developed for GUI operations on the desktop display of a computer is scope definition. With this technique, a rectangular area is drawn on a GUI screen by dragging the mouse/cursor and the data or the object within the scope is defined as object to be copied or cut.

In the information space 1 where digital spaces are deeply fused with the real world, it is possible to "define the scope" of an object even on an expanded display extending to the surface of a table 11 and/or a wall 12 in a real space. Furthermore, the defined scope can be shot by cameras 18/19 and an image of the defined scope obtained by the shooting can be taken into a digital space by means of a direct interactive technique such as hyperdragging.

Figure 41:
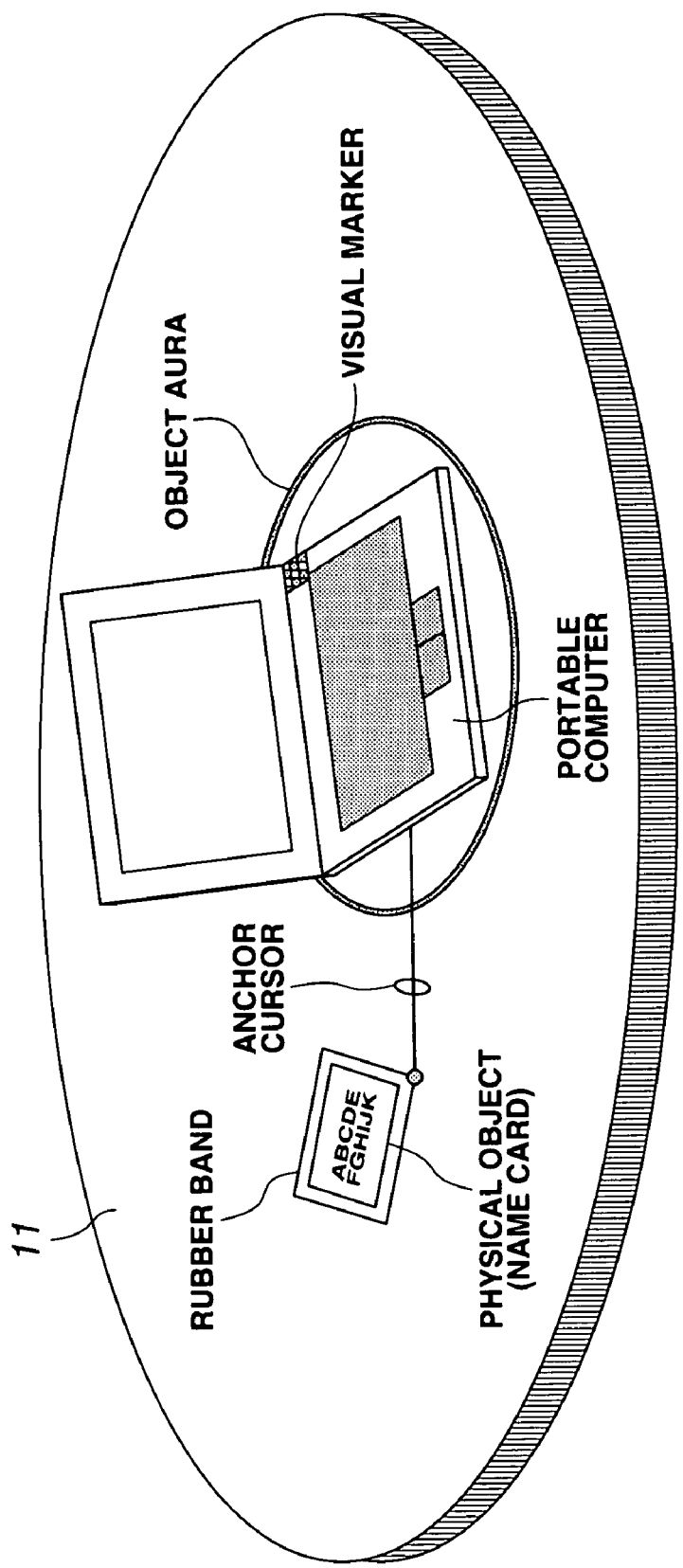
FIG. 41 is a schematic illustration of an operation of taking an object in the real world into a digital space, where the object on a table 11 is defined for its scope by means of a rubber band.
Figure 42:
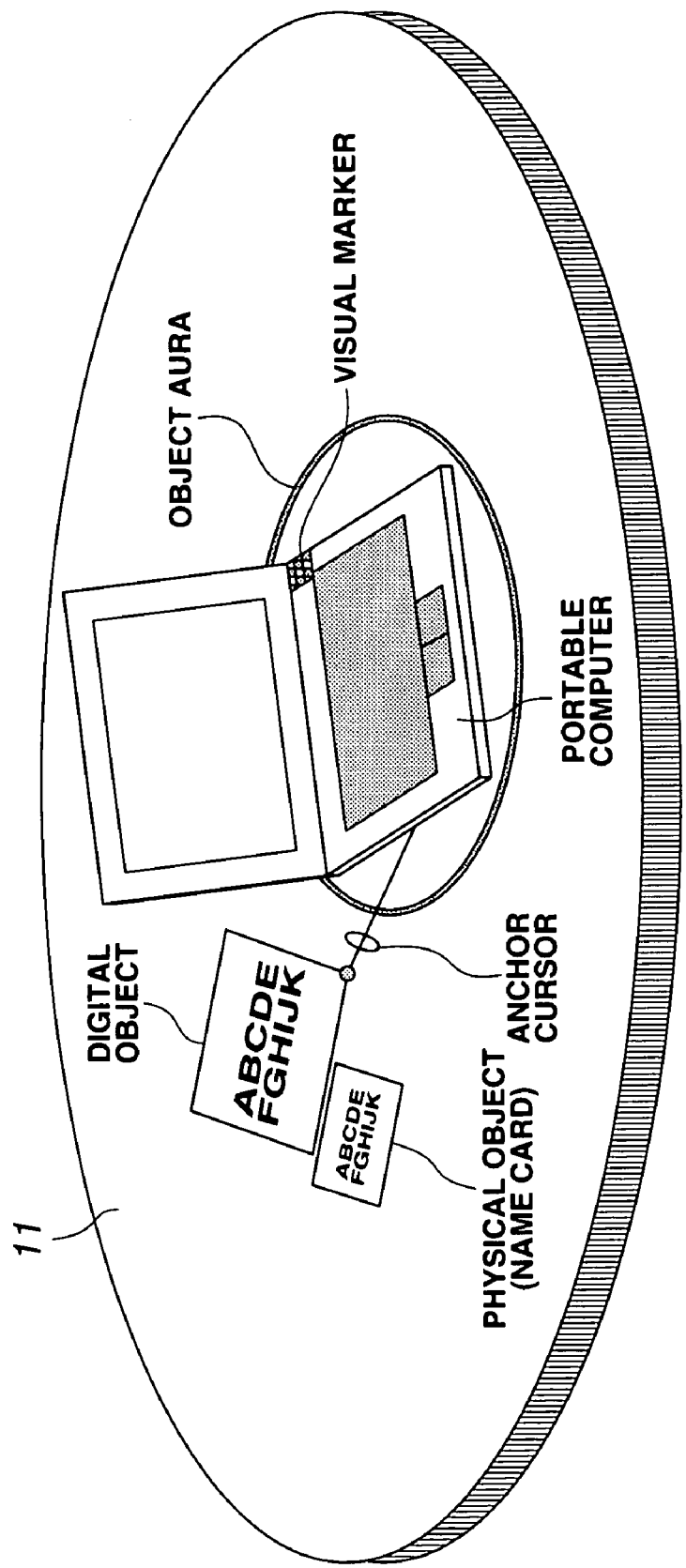
FIG. 42 is a schematic illustration of an operation of taking an object in the real world into a digital space, where the digital object defined for its scope by means of a rubber band is hyperdragged into the real world.
Figure 43:
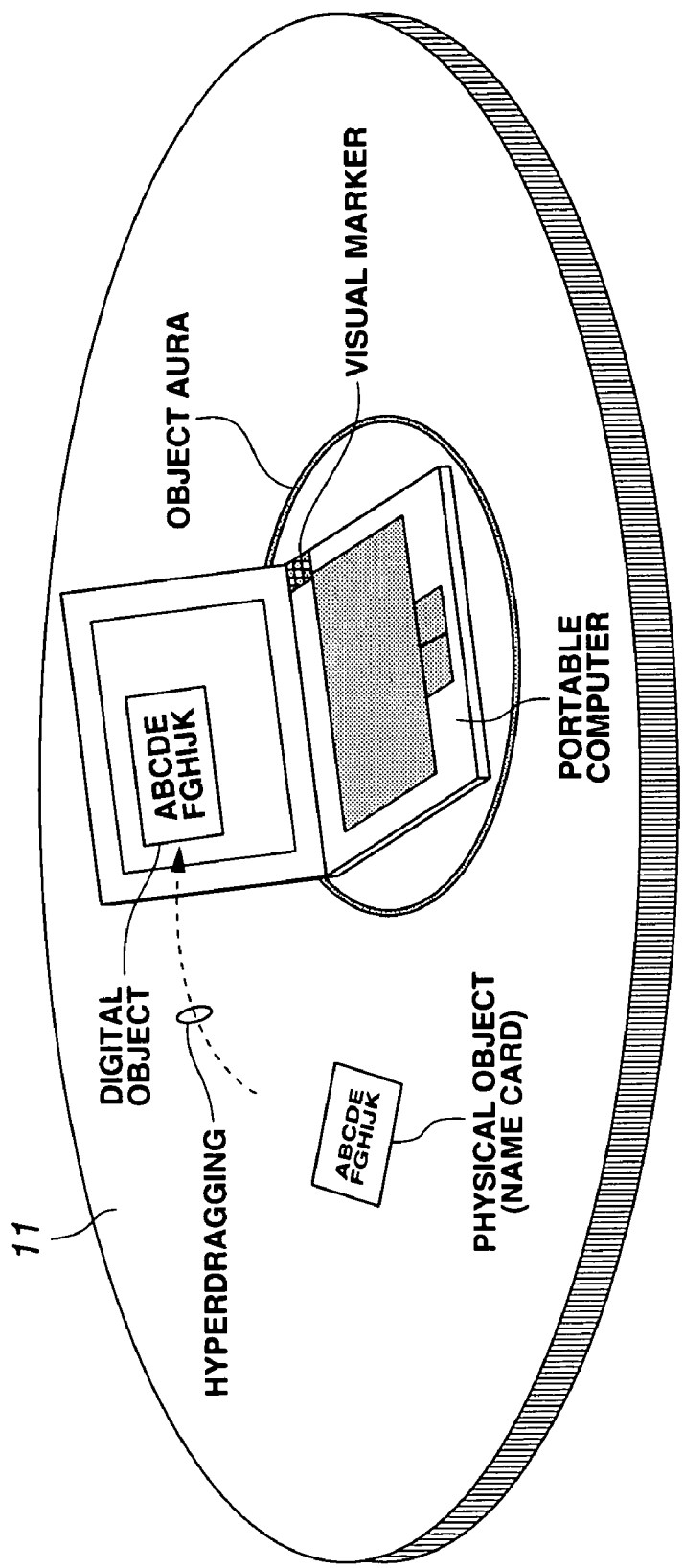
FIG. 43 is a schematic illustration of an operation of taking an object in the real world into a digital space, where the digital object defined for its scope by means of a rubber band is hyperdragged and taken onto the display screen of a portable computer.

FIGS. 41 through 43 schematically illustrate how an object in the real world is taking into a digital space.

Referring to FIG. 41, as the user places his or her own portable computer on the table 11, the cameras 18/19 shoot it and the environment type computer identifies the visual marker attached to it and installs the portable computer in the information space 1. An object aura surrounding the portable computer is projected and displayed.

Then, the user can move the mouse/cursor onto the table, crossing the boundary of the display screen by means of the technique of hyperdragging. Additionally, he or she drags the cursor to surround the predetermined physical object ("the name card" in the instance of FIG. 41) placed on the table.

Since the cameras 18/19 shoot the series of dragging operations, the environment type computer can recognize the scope as defined by the hyperdragging operations. Then, the environment type computer can visually feed back the outcome of the operations to the user by projecting and displaying "a rubber band" surrounding the defined area as recognized by it.

The images of the area surrounded by the rubber band is taken into the information space as digital object. Therefore, the user can hyperdrag any of the images of the rubberanded area (see FIG. 42).

Then, the user can take in the digital object into his or her own portable computer by hyperdragging the rubberbanded image and dropping it onto the display screen of the portable computer of the user. As a result, the digital object is displayed on the display screen (see FIG. 43). Additionally, during the interactive operations, the object entity (information on the image of the name card and other information relating to the name card) is transferred appropriately from the environment type computer to portable computer in the background.

Figure 44:
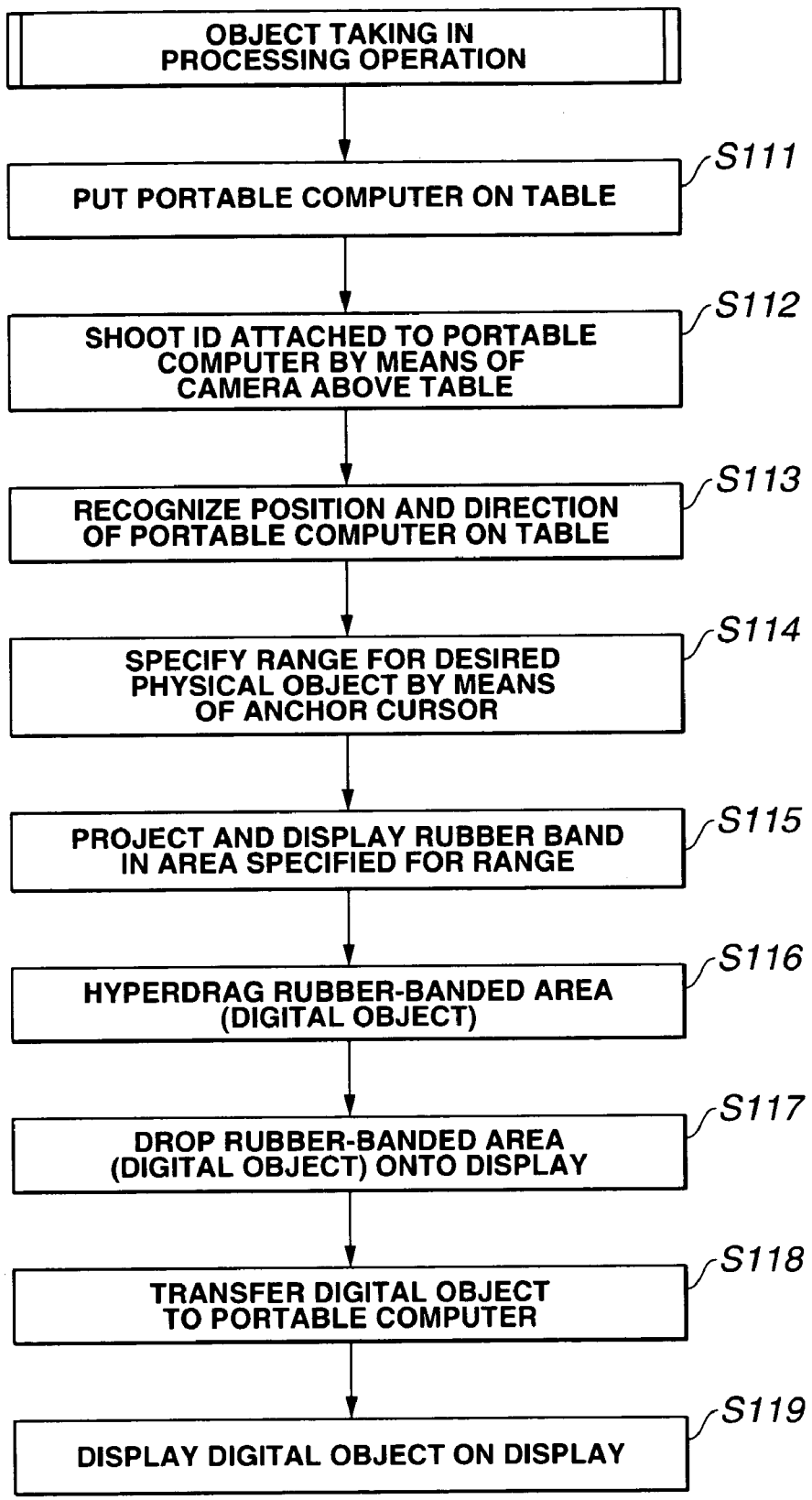
FIG. 44 is a flow chart of the processing operation for taking an object in the real world into a digital space.

FIG. 44 is a flow chart of the processing operation for taking an object in the real world into a digital space. Now, the operation will be described by referring to the flow chart.

Firstly, the user places his or her own portable computer on the table 11 (Step S111).

A visual marker displaying the identification information of the portable computer is attached to the surface of the computer. Therefore, as the cameras 18/19 arranged above the tape 11 shoot the portable computer (Step S112) and the image processing server 20 recognizes the visual marker, the portable computer can be identified (Step S113).

As a result of recognizing the portable computer, the portable computer is installed in the information space 1. In response to the installation, the object aura surrounding the portable computer may be projected and displayed on the table 11.

Additionally, since a visual marker can provide not only identification information but also information on the position and the direction of the object carrying the visual marker, it is possible to establish a coordinate system using the visual marker as origin.

Then, the user can conducts a GUI operation that is a direct interactive technique to be used on the display screen of the portable computer installed in the real world also on an expanded display in the real world. More specifically, it is possible to make the mouse/cursor jump out of the display screen and move into the real world which may be the top surface of the table 11. An anchor cursor is projected and displayed between the portable computer and the mouse/cursor in the real world so that the user is visually fed back.

Then, the user can define the scope of the desired physical object ("the name card" in the instance of FIG. 41) by using the anchor cursor (Step S114).

The user operation on the table is traced by the cameras 18/19 so that the environment type computer can recognize the operation of defining the scope by means of the anchor cursor. Then, the environment type computer uses a rubber band to surround the area within the defined scope on the table 11 ("the name card" in the instance of FIG. 41) and visually feed it back the user (Step S115).

The images taken by the cameras 18/19 of the area surrounded by the rubber band are taken into the information space 1 as digital objects. Therefore, the user can hyperdrag any of the images, or the digital objects, inside the scope as defined by the rubber band (Step S116) ) (see FIG. 42). Since the user operation is shot by the cameras 18/19, the environment type computer can recognize it.

Then, the user hyperdrags the image surrounded by the rubber band and drops it on the display screen of the portable computer (Step S117).

The environment type computer recognizes the dropping operation through the images taken by the cameras 18/19 and transfers the entity of the corresponding digital object (information on the image of the name card and other information relating to the name card) to the portable computer by way of the network 15 (Step S118).

Upon receiving the digital object, the portable computer displays the digital object on the display screen and visually feed it back to the user (Step S119) (see FIG. 44).

(5) Printout

The interactive technique of dropping a data icon on an object iron to apply the processing operation or method that the object has to data is well known as a typical GUI operation on the desktop display of a computer.

For instance, it is possible to issue a job of printing a document by dropping the icon of the document on the printer icon (on the desktop display). Additionally, it is possible to dispose of or erase the document from the local disk by dropping the icon of the document on the dust bin (or shredder) icon.

In the information space 1 where digital spaces are deeply fused with the real world, it is possible to introduce direct interactive techniques that are developed originally for GUIs into the real world.

Figure 45:
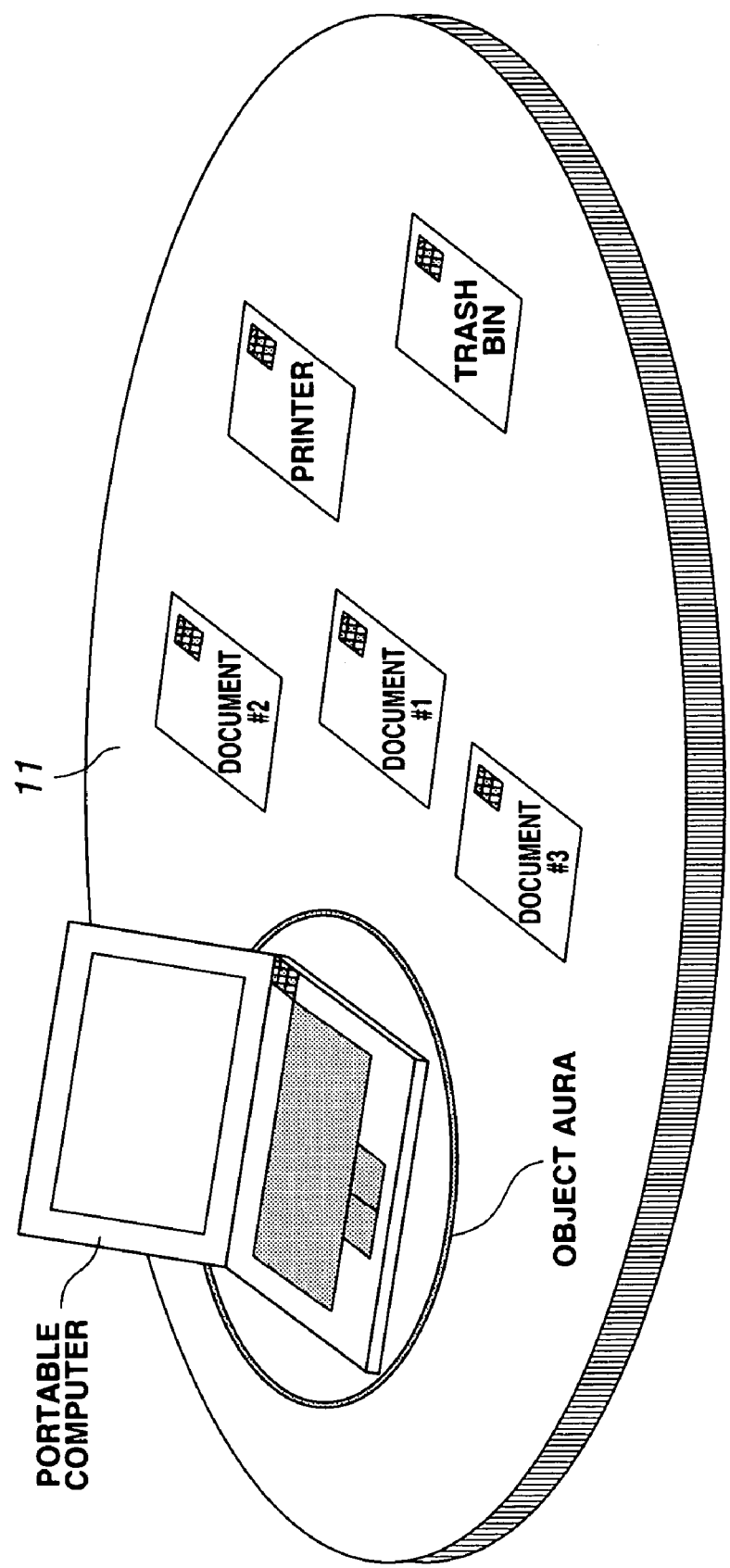
FIG. 45 is a schematic illustration of an operation of applying a processing operation or method to a digital object in the real world; where various physical objects are scatteredly placed on a table 11.

For instance, referring to FIG. 45, assume that the portable computer of the user and sheets of paper corresponding to a printer, a dust bin and various documents are scatteredly arranged on the table 11 as physical objects. Since a visual marker is attached to each of the physical objects, the environment type computer can recognize and identify each of them by way of the cameras 18/19 arranged above the table 11 and install it in the information space 1.

Although not shown in FIG. 45 for the purpose of simplicity, a picture of a printer or a dust bin may be printed on each of the sheets of paper corresponding to a printer or a dust bin, whichever appropriate, in addition to a visual marker in order to visually feed it back to the user. Alternatively, each of the sheets of paper corresponding to a document may carry only a visual marker attached to it or an image of the document itself (or the cover thereof) printed thereon. The sheets of paper corresponding to "a printer" of "a dust bin" are physical objects representing a processing operation or method. On the other hand, the sheets of paper corresponding to "documents" are physical objects representing data to be processed.

Figure 46:
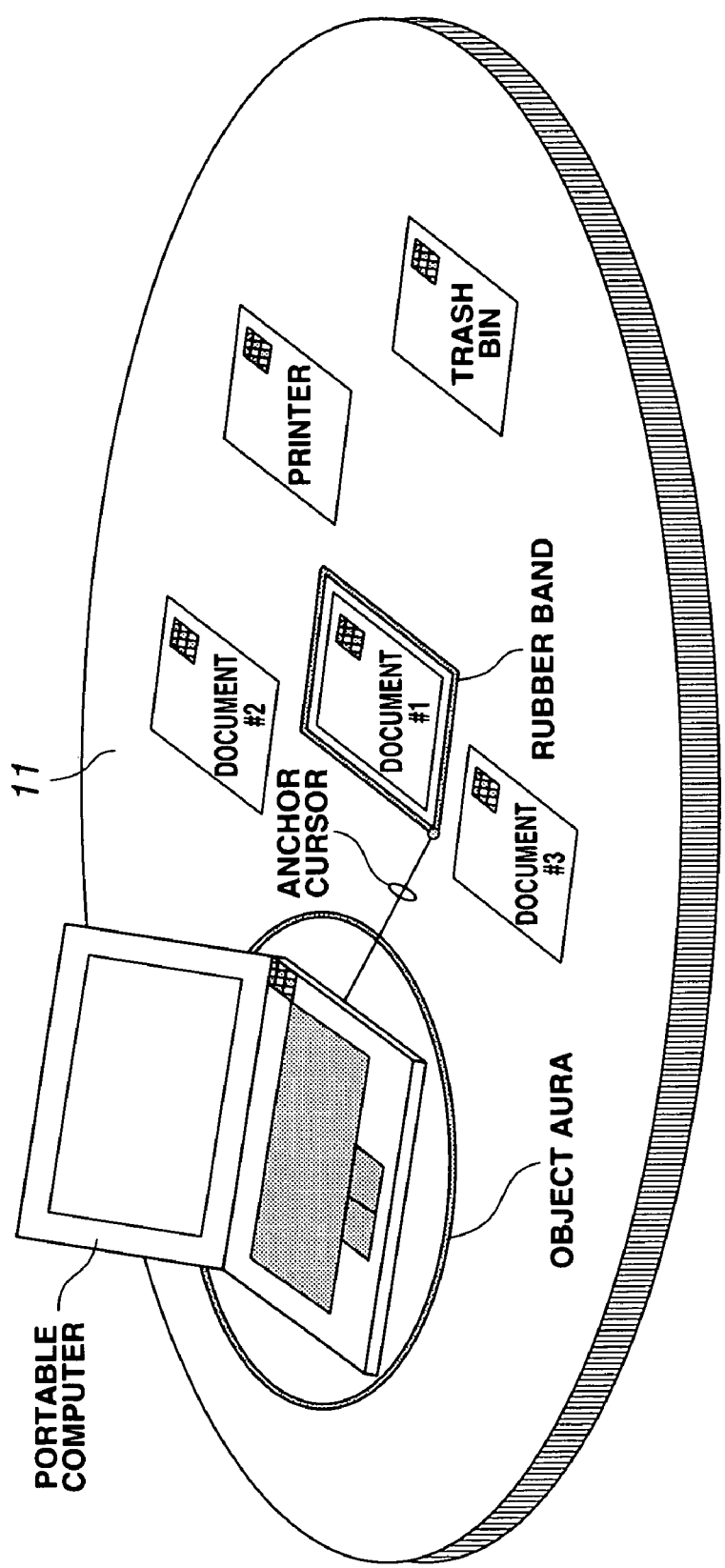
FIG. 46 is a schematic illustration of an operation of applying a processing operation or method to a digital object in the real world; where a desired physical object (document) on a table 11 is defined for its area and visually fed back by means of a rubber band.

As described above, the user of the portable computer can define the scope of a desired document in the real world by using a direct interactive technique of hyperdragging. In the instance of FIG. 46, the user defines the scope of document #1 out of a number of documents scattered arranged on the table. As a result, an image of a rubber band is projected and displayed around the document #1 and visually fed back to the user.

Figure 47:
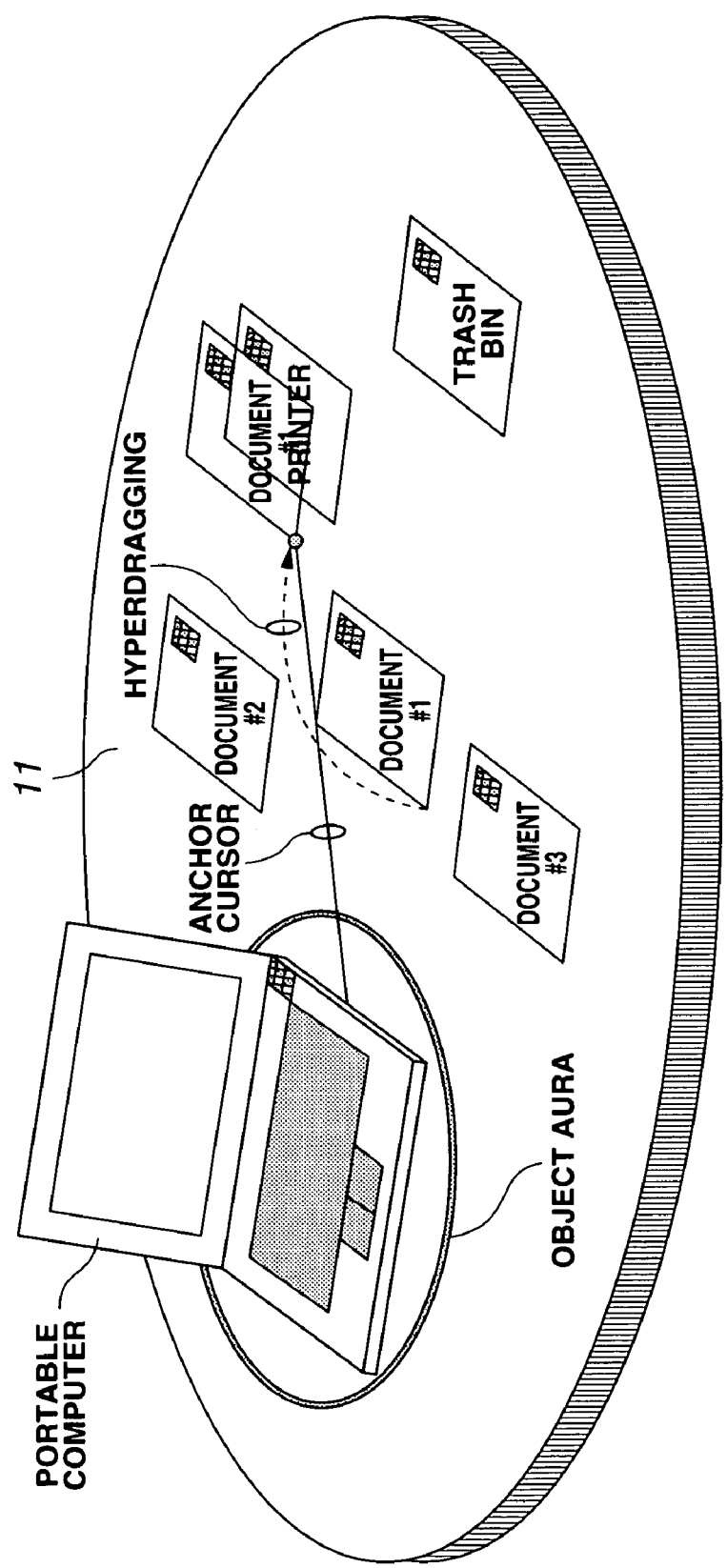
FIG. 47 is a schematic illustration of an operation of applying a processing operation or method to a digital object in the real world; where a digital object defined by means of a rubber band is hyperdragged onto a physical object representing a processing operation or method.

Furthermore, the user can call a desired processing operation or method by hyperdragging the rubberbanded digital object onto the physical object representing the operation or method. For example, as shown in FIG. 47, the user can call a processing operation of printing out the document #1 by hyperdragging the digital object representing the document #1 and dropping it on the physical object representing the printer. Similarly, the user can erase the digital object representing the document from the digital space by hyperdragging it and dropping it on the physical object representing the dust bin.

Figure 48:
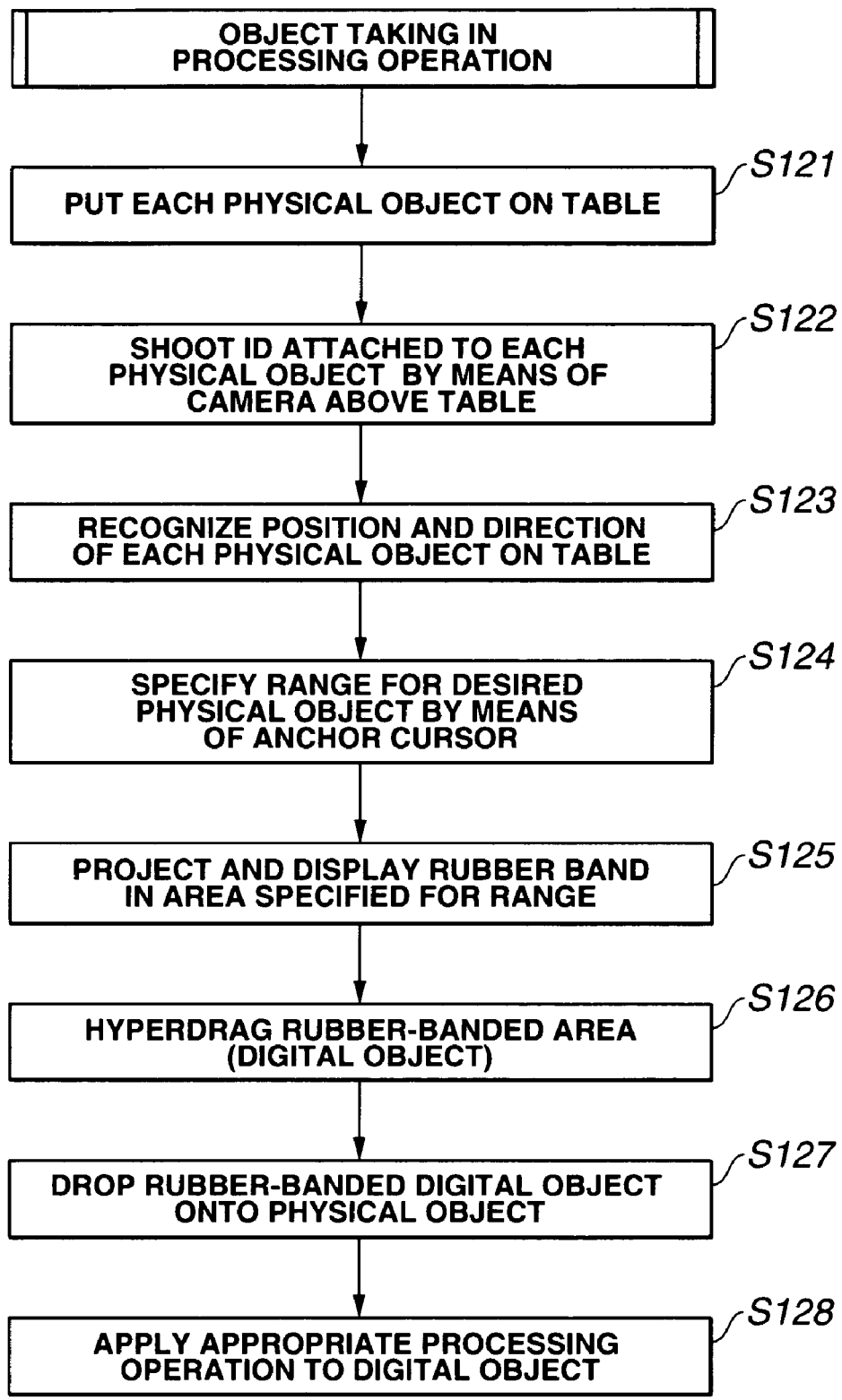
FIG. 48 is a flow chart of the processing operation for applying a processing operation or method to a digital object in the real world.

FIG. 48 is a flow chart of the processing operation for applying a processing operation or method to a digital object in the real world. The operation will be described below by referring to the flow chart.

Firstly, the user places various physical objects including his or her own portable computer on the table 11 (Step S121).

The physical objects as used here refer to sheets of paper corresponding to a printer, a dust bin and various documents (see FIG. 45). The sheets of paper corresponding to "a printer" of "a dust bin" are physical objects representing a processing operation or method. A picture of a printer or a dust bin may be printed on each of the sheets of paper corresponding to a printer or a dust bin, whichever appropriate, in order to visually feed it back to the user. On the other hand, the sheets of paper corresponding to "documents" are physical objects representing data to be processed. Each of the sheets of paper corresponding to a document may carry an image of the document itself (or the cover thereof) printed thereon. The documents may not be physical objects but the documents edited by the user and taken out from the portable computer by hyperdragging, which are therefore digital objects.

A visual marker displaying the identification information is attached to the surface of each of the physical objects. Therefore, as the cameras 18/19 arranged above the table 11 shoot the portable computer (Step S122) and the image processing server 20 recognizes the visual marker, the corresponding physical object can be identified (Step S123).

As a result of recognizing the identification information contained in the visual marker, the portable computer is installed in the information space 1. Additionally, since a visual marker can provide not only identification information but also information on the position and the direction of the object carrying the visual marker, it is possible to establish a coordinate system using the visual marker as origin.

The user can conducts a GUI operation that is a direct interactive technique to be used on the display screen of the portable computer installed in the information space 1 also on an expanded display in the real world. More specifically, it is possible to make the mouse/cursor jump out of the display screen and move into the real world which may be the top surface of the table 11. An anchor cursor is projected and displayed between the portable computer and the mouse/cursor in the real world so that the user is visually fed back.

Then, the user can define the scope of the desired physical object ("the document #1" in the instance of FIG. 46) by using the anchor cursor (Step S124).

The user operation on the table 11 is traced by the cameras 18/19 so that the environment type computer can recognize the operation of defining the scope by means of the anchor cursor. Then, the environment type computer uses a rubber band to surround the area within the defined scope on the table 11 ("the document #1" in the instance of FIG. 46) and visually feed it back to the user (Step S125).

The images taken by the cameras 18/19 of the area surrounded by the rubber band are taken into the information space 1 as digital objects. Therefore, the user can hyperdrag any of the images, or the digital objects on the table 11 in the real world, inside the scope as defined by the rubber band (Step S126) ). Since the user operation is shot by the cameras 18/19, the environment type computer can recognize it.

Then, the user hyperdrags on the table 11 the image surrounded by the rubber band and drops it on the display screen of the physical object of the sheet of paper representing "the printer" (Step S127) (see FIG. 47).

As pointed out above, the printer is a physical object representing a processing operation or method of "printing a document". Therefore, the processing operation of printing out the document #1 can be called by dropping the defined scope on the physical object representing the printer.

In response to the interactive user operation, data are transferred form the environment type computer to the entity of the defined physical object such as a printer in the background.

(6) Mailing

As pointed out above, in the case of the information space 1 where digital spaces are deeply fused with the real world, direct interactive techniques originally developed for GUIs can be introduced into the real world.

Another example of introducing a direct interactive technique into the real world is "mailing".

Figure 49:
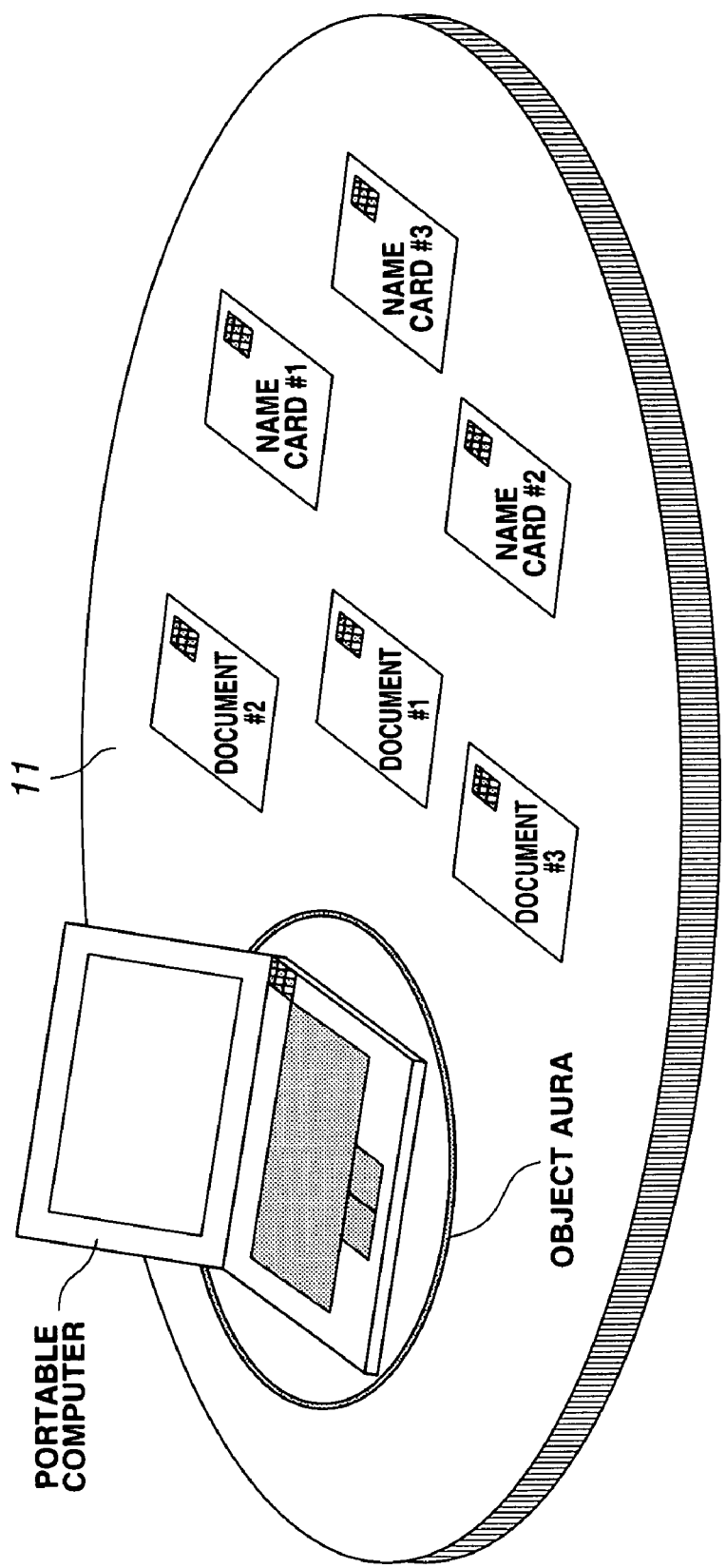
FIG. 49 is a schematic illustration of the processing operation for mailing a desired document in the real world, where objects such as the document to be mailed and a name card showing the address of the destination of the mail are scatteredly placed on a table.

Referring to FIG. 49, assume that objects representing one or more than one "name cards" showing the addresses of the destinations of mailing and documents to be mailed are scatteredly arranged on the table 11 in addition to the portable computer of the user.

Since a visual marker is attached to each of the physical objects, the physical objects can be recognized and identified by way of the cameras 18/19 arranged above the table 11 and installed in the information space 1 by the environment type computer. The objects of the documents may be physical objects or digital objects hyperdragged from the portable computer onto the table 11 (e.g., the documents edited by the user).

Figure 50:
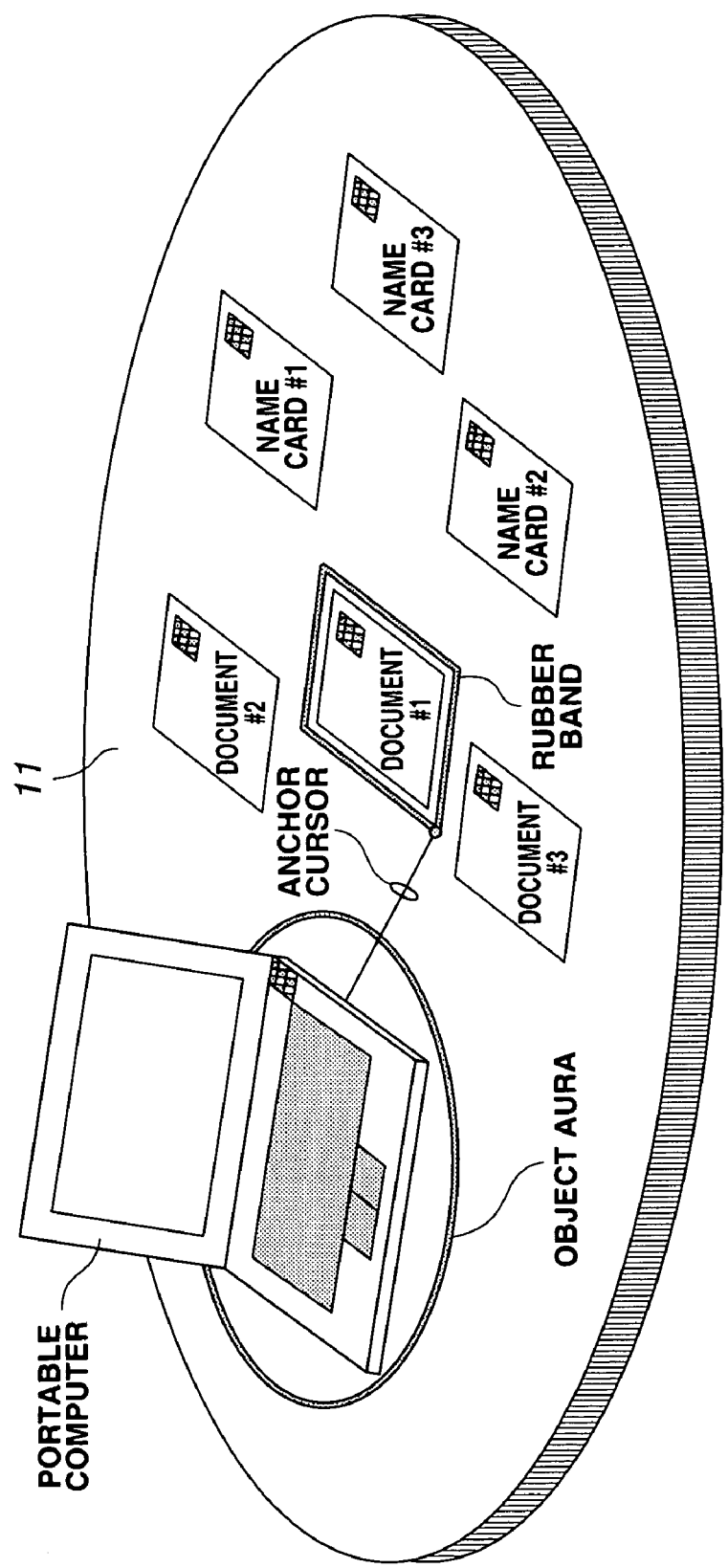
FIG. 50 is a schematic illustration of the processing operation for mailing a desired document in the real world, where the user has selected a document as object to be mailed.

As described above, the user of the portable computer can defined the scope of the desired document by using the direction interactive technique of hyperdragging in the real world. In the instance of FIG. 50, the user defines the scope of the document #1 out of the various documents scatteredly arranged on the table. As a result, a rubber band is projected and displayed around the document #1 that is to be mailed and visually fed back to the user.

Figure 51:
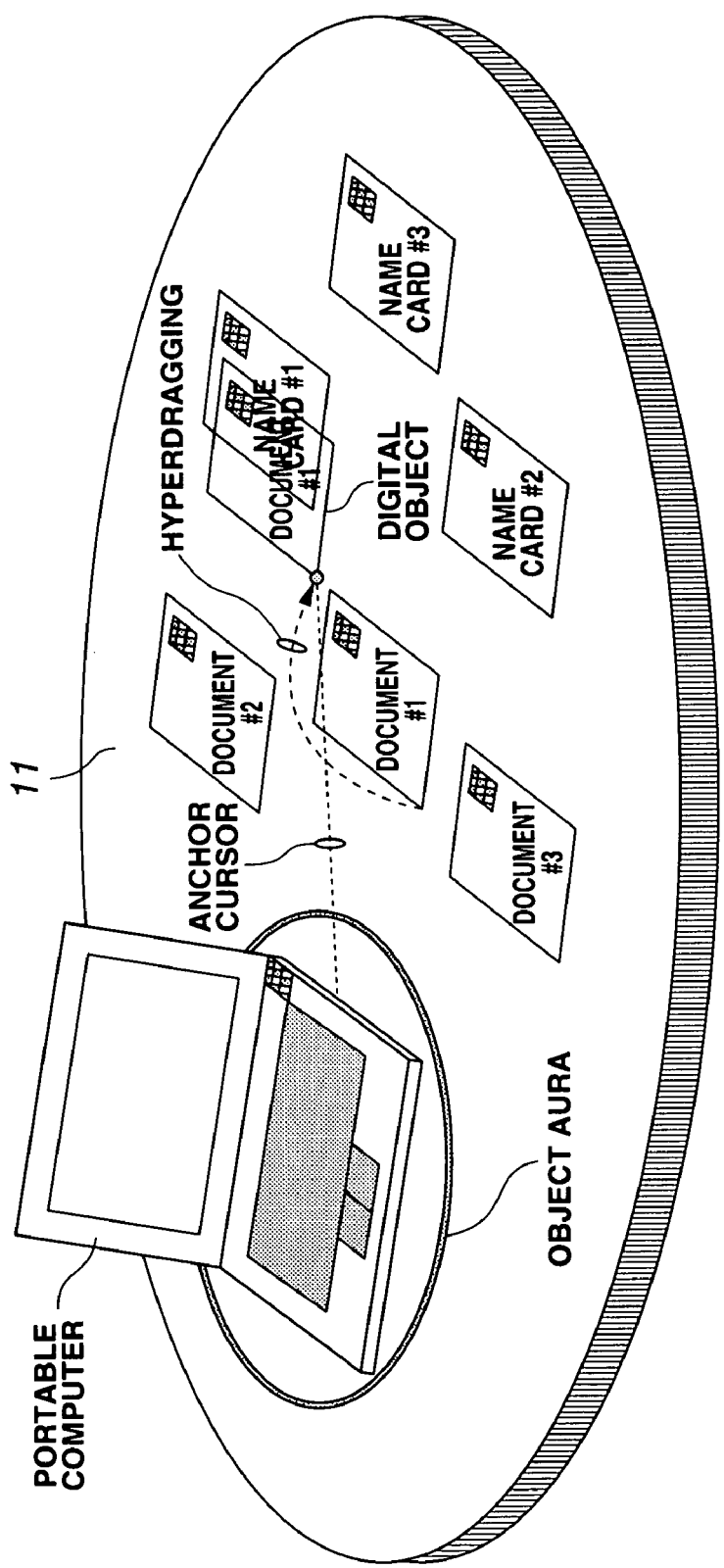
FIG. 51 is a schematic illustration of the processing operation for mailing a desired document in the real world, where the user is hyperdragging a document as object to be mailed onto the name card showing the address of the destination of the mail.

Furthermore, the user can call a desired processing operation or method by hyperdragging the rubberbanded digital object onto the physical object representing the operation or method. For example, as shown in FIG. 51, the user may hyperdrag the digital object representing the document #1 and drop it on "the name card #1" showing the address of the destination of mailing. As a result, a processing operation of mailing the document #1 to the address shown on the name card is called.

Figure 52:
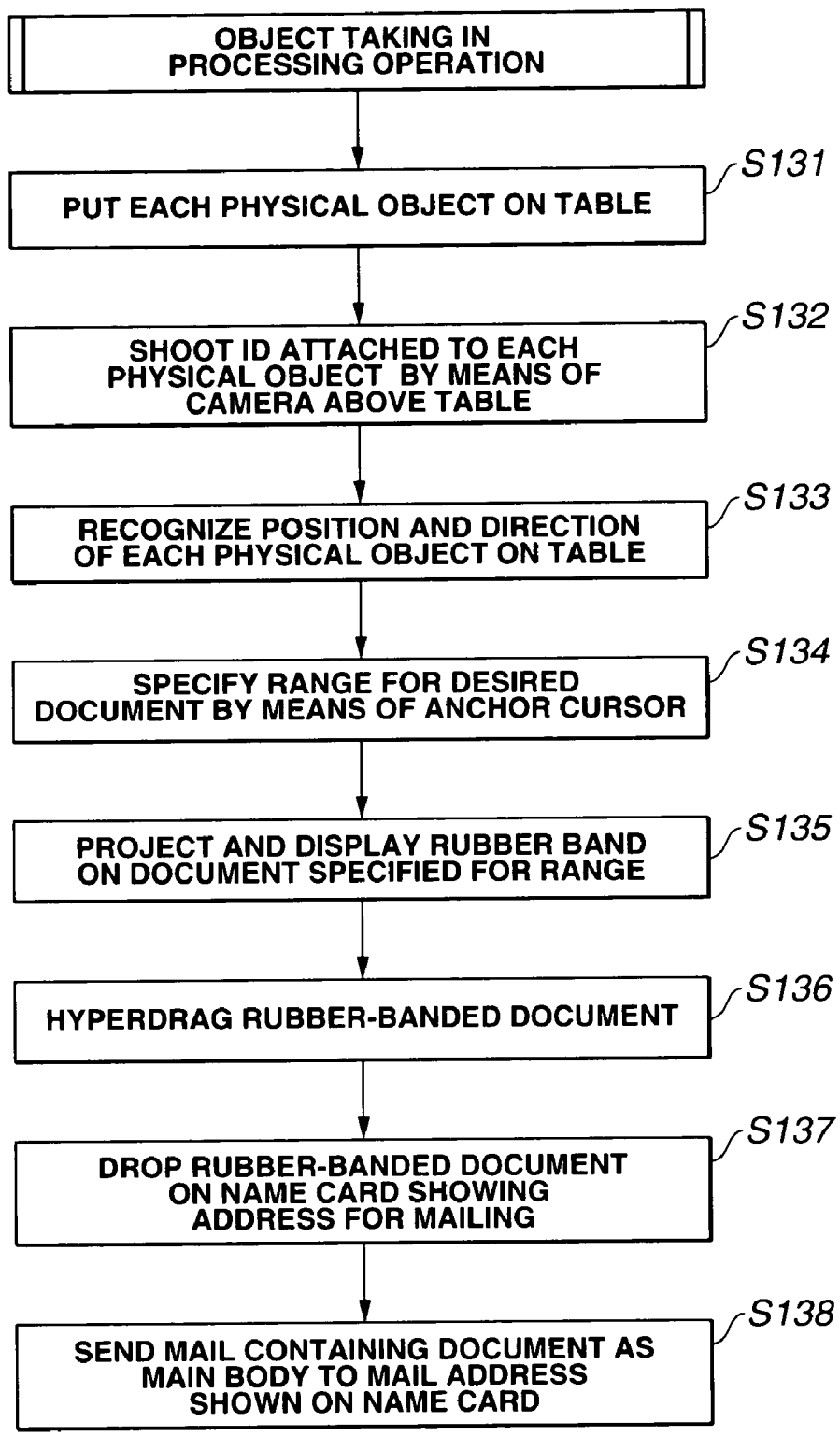
FIG. 52 is a flow chart of the processing operation for mailing a desired document in the real world.

FIG. 52 is a flow chart of the processing operation for applying a processing operation or method to a digital object in the real world. The operation will be described below by referring to the flow chart.

Firstly, the user places various physical objects including his or her own portable computer on the table 11 (Step S131).

The physical objects as used here refer to sheets of paper corresponding to name cards showing the addresses of destinations of mailing and various documents to be mailed (see FIG. 49). It will be appreciated that a name card is a physical object representing the processing operation or method of mailing to the address shown on it. On the other hand, the sheets of paper corresponding to "documents" are physical objects representing data to be processed. Each of the sheets of paper corresponding to a document may carry an image of the document itself (or the cover thereof) printed thereon. The documents may not be physical objects but the documents edited by the user and taken out from the portable computer by hyperdragging, which are therefore digital objects.

A visual marker displaying the identification information is attached to the surface of each of the physical objects. Therefore, as the cameras 18/19 arranged above the table 11 shoot the portable computer (Step S132) and the image processing server 20 recognizes the visual marker, the corresponding physical object can be identified (Step S133).

As a result of recognizing the identification information contained in the visual marker, the portable computer is installed in the information space 1. Additionally, since a visual marker can provide not only identification information but also information on the position and the direction of the object carrying the visual marker, it is possible to establish a coordinate system using the visual marker as origin.

Assume that the environment computer stores a data base containing data entries, each of which is a combination of the identification information of each name card and the address shown on it.

The user can conducts a GUI operation that is a direct interactive technique to be used on the display screen of the portable computer installed in the information space 1 also on an expanded display in the real world. More specifically, it is possible to make the mouse/cursor jump out of the display screen and move into the real world which may be the top surface of the table 11. An anchor cursor is projected and displayed between the portable computer and the mouse/cursor in the real world so that the user is visually fed back.

Then, the user can define the scope of the desired physical object ("the document #1" in the instance of FIG. 50) by using the anchor cursor (Step S134).

The user operation on the table 11 is traced by the cameras 18/19 so that the environment type computer can recognize the operation of defining the scope by means of the anchor cursor. Then, the environment type computer uses a rubber band to surround the area within the defined scope on the table 11 ("the document #1" in the instance of FIG. 50) and visually feed it back to the user (Step S135).

The images taken by the cameras 18/19 of the area surrounded by the rubber band are taken into the information space 1 as digital objects. Therefore, the user can hyperdrag any of the images, or the digital objects on the table 11 in the real world, inside the scope as defined by the rubber band (Step S136) ). Since the user operation is also shot by the cameras 18/19, the environment type computer can recognize it.

Then, the user hyperdrags the image surrounded by the rubber band and drops it on the display screen of the "name cards" corresponding to the desired addresses of the destinations of mailing (Step S137) (see FIG. 51).

In response to the interactive user operation, the entity of the digital object of the document #1 is transferred form the portable computer to the environment type computer by way of the network 15 in the background.

The environment type computer stores a data base containing the data entries, each of which is a combination of the identification information of each name card and the address shown on it. As the environment type computer recognizes that a digital object is dropped on the name card, it retrieves the mail address corresponding to the name card from the data base. Then, it produces the document of the dropped digital object as document to be mailed and sends it to the address (Step S138).

REFERENCES

[1]: http://www.bluetooth.com

[2]: J. Rekimoto, Pick-and-Drop: A Direct Manipulation Technique for Multiple Computer Environment. In UIST '97, pp. 31–39, October 1997.

[3]: J. Rekimoto and M. Saitoh. Augmented Surface: A Spatially Continuous Workspace for Hybrid Computing Environments. In Processing of CHI '99 Conference on Human Factors in Computing Systems, pp. 378–385. ACM, May 1999.

[4]: Pierre Wellner. Interacting with paper on the DigitalDesk. Communication of the ACM. Vol. 36, No. 7, pp. 87–96, August 1993.

[5]: John Underkoffler and Hiroshi Ishii. Illuminating Light: An optical design tool with a luminous-tangible interface. In CHI's 98 Proceedings, pp. 542–549, 1998.

[6]: Jun Rekimoto. Matrix: A realtime object identification and registration method for augmented reality. In Proc. Of Asia Pacific Computer Human Interaction (APCHI '98), July 1998.

(Cybercodes are also disclosed Japanese Patent Application No. 10-184350 ("Image Processing Apparatus and Image Processing Method as well as Provided Medium") assigned to the applicant of the present patent application.)

[7]: Itiro Siio. InfoBinder: a pointing device for a virtual desktop system. In $6^{th}$ International Conference on Human-Computer Interaction (HCI International '95), pp. 261–264, July 1995.

[8]: Brygg Ullmer, Hiroshi Ishii and Dylan Glas. MediaBlocks: Physical Containers, Transports and Controls for Online Media. In SIGGRAPH '98 Proceedings, pp. 379–386. 1998.

[9]: Torsten Holmer, Norbert A. Streitz, Jorg Geisler. Roomware for cooperative buildings: Integrated design of architectural spaces and information spaces. In Norberts A. Streitz and Shin'ichi Konomi, editors, Cooperative Buildings—Integrating Information, Organization and Architecture, 1998.

SUPPLEMENT

The present invention is described in detail by way of specific embodiments. However, it is obvious that those who are skilled in the art can modify or alter the embodiments without departing from the scope of the invention. Therefore, the above described embodiments are simply non-limitative examples and the scope of the present invention is limited only by the claims that follow.

What is claimed is:

1. An information input/output system to be used for user operations relating to an object in an information space realized by expanding a digital space of a computer into the real world, said system comprising:

one or more than one operation surfaces arranged in said information space;

a display means for displaying an image on said operation surfaces;

an imaging means for picking up an image of said operation surfaces;

a stationary environment type computer arranged in said information space; and one or more than one physical objects mounted on said operation surfaces and containing a visually identifiable visual marker on the surface thereof, said visual marker including identification information and position information for said physical objects;

said environment type computer being adapted to execute;

a processing operation of recognizing the identification information and the position information of each of said physical objects by indentifying the visual marker on the surface of each of said physical objects;

a processing operation of recognizing a digital object dropped to a site on the surface of each of said physical objects; and a processing operation of forming link information for linking the digital object to the dropped site on the surface for each of said physical objects.

2. The information input/output system according to claim 1, wherein at least one of said physical objects is a portable computer capable of being moved in said information space and exchanging digital objects with other computers.

3. The information input/output system according to claim 1, wherein at least one of said physical objects is a portable computer capable of being moved in said information space and exchanging digital objects with other computers; and
  said environment type computer can expand a mouse/cursor operation on the installed portable computer onto said operation surfaces.

4. The information input/output system according to claim 1, wherein
  said imaging means can identify the position indicated by an optical pointer for indicating a specific position by irradiating a beam of light with a predetermined wavelength; and
  the user is allowed to indicate a position in said information space by means of coordinates and the optical pointer.

5. The information input/output system according to claim 1, wherein said environment type computer executes a processing operation of calling the linked digital object and/or displaying the digital object to the user in response to a user operation applied to the site of forming the link information on the surface of each of the physical objects on the basis of the image picked up by said imaging means.

6. An information input/output system to be used for user operations relating to an object in an information space realized by expanding a digital space of a computer into the real world, said system comprising:
  one or more than one operation surfaces arranged in said information space;
  a display means for displaying an image on said operation surfaces;
  an imaging means for picking up an image of said operation surfaces;
  a stationary environment type computer arranged in said information space;
  one or more than one physical objects mounted on said operation surfaces and containing a visually identifiable visual marker on the surface thereof, said visual marker including identification information and position information for said physical objects; and
  a portable ID recognition device adapted to recognize/identify the visual marker on the surface of each of said physical objects.

7. The information input/output system according to claim 6, wherein
  said environmental type computer is adapted to execute;
  a processing operation of receiving the identification information of the source object and that of the destination object from said ID recognition device; and
  a processing operation of applying an action specified on the basis of the combination of the type of the source object and that of the destination object.

8. The information input/output system according to claim 6, wherein
  at least one of said physical objects is a portable computer capable of being moved in said information space and exchanging digital objects with other computers.

9. An information input/output system to be used for user operations relating to an object in an information space realized by expanding a digital space of a computer into the real world, said system comprising:
  one or more than one operation surfaces arranged in said information space;
  a display means for displaying an image on said operation surfaces;
  an imaging means for picking up an image of said operation surfaces;
  a stationary environment type computer arranged in said information space; and
  one or more than one physical objects mounted on said operation surfaces and containing a visually identifiable visual marker on the surface thereof, said visual marker including identification information and position information for said physical objects;
  at least one of said physical objects being a virtual camera having a virtual imaging direction as specified by the position information contained in the visual marker.

10. The information input/output system according to claim 9, wherein
  said environment type computer is adapted to execute;
  a processing operation of recognizing/identifying said virtual camera and identifying the position information and the virtual imaging direction;
  a processing operation of generating a virtual picked up image according to the position information and the virtual imaging direction; and a processing operation of displaying the virtual picked up image to the user.

11. The information input/output system according to claim 9, wherein at least one of said physical objects is a portable computer that can move in said information space and exchange digital objects with another computer.

12. An information input/output system to be used for user operations relating to an object in an information space realized by expanding a digital space of a computer into the real world, said system comprising:
  one or more than one operation surfaces arranged in said information space;
  a display means for displaying an image on said operation surfaces;
  an imaging means for picking up an image of said operation surfaces;
  a stationary environment type computer arranged in said information space;
  one or more than one physical objects mounted on said operation surfaces and containing a visually identifiable visual marker on the surface thereof, said visual marker including identification information and position information for said physical objects; and
  an optical pointer adapted to point a specific position by irradiating a beam of light with a predetermined wavelength, wherein said imaging means is capable of identifying the position pointed to by said optical pointer.

13. The information input/output system according to claim 12, wherein said environment type computer executes on the basis of the image picked up by said imaging means;
  a processing operation of recognizing the user operation on said operation surfaces, using said optical pointer; and
  a processing operation of controlling the display of the digital object by said display means according to the result of the recognition.

14. An information input/output system to be used for user operations relating to an object in an information space realized by expanding a digital space of a computer into the real world, said system comprising:
  one or more than one operation surfaces arranged in said information space;
  a display means for displaying an image on said operation surfaces;
  an imaging means for picking up an image of said operation surfaces;

a stationary environment type computer arranged in said information space;

one or more than one portable computers capable of exchanging digital objects with other computers;

one or more than one physical objects mounted on said operation surfaces and containing a visually identifiable visual marker on the surface thereof, said visual marker including identification information and position information for said physical objects; and a portable ID recognition device adapted to recognize the visual marker on the surface of each of said physical objects and being capable of holding or releasing the recognized identification information.

15. The information input/output system according to claim 14, wherein said environment type computer executes;

a processing operation of obtaining a digital object corresponding to the held identification information in response to the holding operation of said ID recognition device; and a processing operation of transferring a digital object corresponding to the held identification information to a nearby physical object in response to the releasing operation of said ID recognition device.

16. An information input/output system to be used for user operations relating to an object in an information space realized by expanding a digital space of a computer into the real world, said system comprising:

one or more than one operation surfaces arranged in said information space;

a display means for displaying an image on said operation surfaces;

an imaging means for picking up an image of said operation surfaces;

a stationary environment type computer arranged in said information space;

one or more than one portable computers capable of exchanging digital objects with other computers; and one or more than one physical objects mounted on said operation surfaces and containing a visually identifiable visual marker on the surface thereof, said visual marker including identification information and position information for said physical objects;

said environment type computer being adapted to allow mouse/cursor operations on said portable computers to extend to said operation surfaces and display a rubber band as visual feedback according to the area on said operation surfaces as defined by means of said mouse/cursor.

17. The information input/output system according to claim 16, wherein said environment type computer is adapted to pick up an image of the area defined by the rubber band by means of said imaging means and take the picked up image in said information space as digital object.

18. The information input/output system according to claim 16, wherein another object can apply a process or a method it possesses to the rubber-banded original digital object in response to an action of said original object of being dropped on said another object.

19. The information input/output system according to claim 18, wherein said another object is a physical object possessing a process or a method for printing a document.

20. The information input/output system according to claim 18, wherein said another object is a name card possessing a process or a method for mailing a document to the mail address corresponding to the name on it.

21. An information input/output method to be used for user operations relating to an object in an information space realized by expanding a digital space of a computer into the real world, said method comprising:

providing an information input/output system having one or more than one operation surfaces arranged in said information space, a display means for displaying an image on said operation surfaces, an imaging means for picking up an image of said operation surfaces, a stationary environment type computer in said information space and one or more than one physical objects mounted on said operation surfaces and containing a visually identifiable visual marker on the surface thereof, said visual marker including identification information and position information for said physical objects;

a step of firstly recognizing the identification information and the position information of each of said physical objects from the visual marker including on the surface of each of said physical objects;

a step of secondly recognizing the digital object dropped to a site on the surface of each of said physical objects; and a step of forming link information for linking the digital object to the dropped site on the surface for each of said physical objects.

22. The information input/output method according to claim 21, wherein at least one of said physical objects is a portable computer capable of being moved in said information space and exchanging digital objects with other computers; and said environment type computer can expand a mouse/cursor operation on the installed portable computer onto said operation surfaces in said second recognition step.

23. The information input/output method according to claim 21, wherein said imaging means can identify the position indicated by an optical pointer for indicating a specific position by irradiating a beam of light with a predetermined wavelength; and the user is allowed to indicate a position in said information space by means of coordinates and the optical pointer.

24. The information input/output method according to claim 21, further comprising:

a step of calling the linked digital object and/or displaying the digital object to the user in response to a user operation applied to the site of forming the link information on the surface of each of the physical objects.

25. An information input/output method to be used for user operations relating to an object in an information space realized by expanding a digital space of a computer into the real world, said method comprising:

providing an information input/output system having one or more than one operation surfaces arranged in said information space, a display means for displaying an image on said operation surfaces, an imaging means for picking up an image of said operation surfaces, a stationary environment type computer arranged in said information space, one or more than one physical objects mounted on said operation surfaces and containing a visually identifiable visual marker on the surface thereof, where the visual marker includes identification information and position information for the physical objects; and a portable ID recognition device adapted to recognize/identify the visual marker on the surface of each of said physical objects;

a step of receiving the identification information of the source object and that of the destination object from said ID recognition device; and a step of applying an action specified on the basis of the combination of the type of the source object and that of the destination object.

26. An information input/output method to be used for user operations relating to an object in an information space realized by expanding a digital space of a computer into the real world, said method comprising:

providing an information input/output system having one or more than one operation surfaces arranged in said information space, a display means for displaying an image on said operation surfaces, an imaging means for picking up an image of said operation surfaces, a stationary environment type computer in said information space and one or more than one physical objects mounted on said operation surfaces and containing a visually identifiable visual marker on the surface thereof, where the visual marker includes identification information and position information for the physical objects, at least one of said physical objects being a virtual camera having a virtual imaging direction as specified by the position information contained in the visual marker;

a step of recognizing/identifying said virtual camera and identifying the position information and the virtual imaging direction;

a step of generating a virtual picked up image according to the position information and the virtual imaging direction; and a step of displaying the virtual picked up image to the user.

27. An information input/output method to be used for user operations relating to an object in an information space realized by expanding a digital space of a computer into the real world, said method comprising:

providing an information input/output system having one or more than one operation surfaces arranged in said information space, a display means for displaying an imaging on said operation surfaces, an imaging means for picking up an image of said operation surfaces, a stationary environment type computer arranged in said information space, one or more than one physical objects mounted on said operation surfaces and containing a visually identifiable visual marker on the surface thereof, where the visual marker includes identification information and position information for the physical objects, and an optical pointer adapted to point a specific position by irradiating a beam of light with a predetermined wavelength, said imaging means being capable of identifying the position pointed by said optical pointer;

a step of recognizing the user operation on said operation surfaces, using said optical pointer; and a step of controlling the display of the digital object by said display means according to the result of the recognition.

28. An information input/output method to be used for user operations relating to an object in an information space realized by expanding a digital space of a computer into the real world, said method comprising:

providing an information input/output system having one or more than one operation surfaces arranged in said information space, a display means for displaying an image on said operation surfaces, an imaging means for picking up an image of said operation surfaces, a stationary environment type computer arranged in said information space and one or more than one portable computer capable of exchanging digital objects with other computers, one or more than one physical objects mounted on said operation surfaces and containing a visually identifiable visual marker on the surface thereof, where the visual marker includes identification information and position information for the physical objects, and a portable ID recognition device adapted to recognize the visual marker on the surface of each of said physical objects and being capable of holding or releasing the recognized identification information;

a step of obtaining a digital object corresponding to the held identification information in response to the holding operation of said ID recognition device; and a step of transferring a digital object corresponding to the identification information to a nearby physical object in response to the releasing operation of said ID recognition device.

29. An information input/output method to be used for user operations relating to an object in an information space realized by expanding a digital space of a computer into the real world, said method comprising:

providing an information input/output system having one or more than one operation surfaces arranged in said information space, a display means for displaying an image on said operation surfaces, an imaging means for picking up an image of said operation surfaces, a stationary environment type computer arranged in said information space, one or more than one portable computers capable of exchanging digital objects with other computers and one or more than one physical objects mounted on said operation surfaces and containing a visually identifiable visual marker on the surface thereof, where the visual marker includes identification information and position information for the physical objects;

a step of allowing mouse/cursor operations on said portable computers to extend to said operation surfaces; and a step of displaying a rubber band as visual feedback according to the scope on said operation surfaces as defined by means of said mouse/cursor.

30. The information input/output method according to claim 29, further comprising:

a step of picking up an image of the scope defined by the rubber band by means of said imaging means and taking the picked up image in said information space as digital object.

31. The information input/output method according to claim 29, further comprising:

a step of applying a process or a method possessed by said another object to the rubber-banded original digital object in response to an action of said original object of being dropped on said another object.

32. The information input/output method according to claim 31, wherein said another object is a physical object possessing a process or a method for printing a document.

33. The information input/output method according to claim 31, wherein said another object is name card possessing a process or a method for mailing a document to the mail address corresponding to the name on it.

* * * * *